(12) United States Patent  
Thomas et al.

(10) Patent No.: US 11,789,284 B2  
(45) Date of Patent: Oct. 17, 2023

(54) OPTICAL LAYERED COMPOSITE HAVING A COATING THICKNESS BELOW A THRESHOLD AND ITS APPLICATION IN AUGMENTED REALITY

(71) Applicant: Schott AG, Mainz (DE)

(72) Inventors: Jens Ulrich Thomas, Mainz (DE); Thorsten Damm, Eltville am Rhein (DE); Frank-Thomas Lentes, Bingen (DE); Kurt Nattermann, Ockenheim (DE)

(73) Assignee: Schott AG, Heidenheim (DE)

( * ) Notice: Subject to any disclaimer, the term of this patent is extended or adjusted under 35 U.S.C. 154(b) by 532 days.

(21) Appl. No.: 16/529,271

(22) Filed: Aug. 1, 2019

(65) Prior Publication Data  
US 2020/0041804 A1    Feb. 6, 2020

(30) Foreign Application Priority Data  
Aug. 1, 2018  (EP) .................................... 18186912

(51) Int. Cl.  
*G02B 27/14* (2006.01)  
*G02B 27/01* (2006.01)  
(Continued)

(52) U.S. Cl.  
CPC ....... *G02B 27/142* (2013.01); *G02B 27/0172* (2013.01); *G02B 27/095* (2013.01); *G02B 27/1073* (2013.01); *G02B 2027/0178* (2013.01)

(58) Field of Classification Search  
CPC .............. G02B 27/142; G02B 27/0172; G02B 27/095; G02B 27/1073; G02B 2027/0178  
(Continued)

(56) References Cited

U.S. PATENT DOCUMENTS 3,934,961 A   1/1976   Itoh et al.  
6,066,401 A   5/2000   Stilburn  
(Continued)

FOREIGN PATENT DOCUMENTS

CN   101858994 A   10/2010  
CN   107305264 A   10/2017  
(Continued)

OTHER PUBLICATIONS

ASTM F 534-02, "Standard Test Method for Bow of Silicon Wafers", downloaded from www.astm.org, Jan. 16, 2018 (3 pages).  
(Continued)

*Primary Examiner* — Joseph P Martinez  
*Assistant Examiner* — Mitchell T Oestreich  
(74) *Attorney, Agent, or Firm* — Taylor IP, P.C.

(57) ABSTRACT

An optical layered composite includes: a substrate having a front face, a back face, a thickness $d_s$ between the front face and the back face and a refractive index $n_s$; and a coating applied to the front face. The coating comprises one or more coating layers. For at least one wavelength $\lambda_g$ in the range from 390 nm to 700 nm, the coating satisfies one of the following criterion: $n_c < n_s$; or $n_c > n_s$, and $$d_c < \frac{k}{\sqrt{n_c^2 - n_s^2}} \cdot \arctan\sqrt{\frac{n_s^2 - 1}{n_c^2 - n_s^2}}\;;$$

$n_c$ is a mean refractive index of the coating layers, weighted by thickness; do is a total thickness of the coating; thicknesses are determined in a direction perpendicular to the front face; and $k=\lambda_g/4\pi$.

13 Claims, 11 Drawing Sheets

(51) Int. Cl.
  *G02B 27/09* (2006.01)
  *G02B 27/10* (2006.01)
(58) Field of Classification Search
  USPC .......................................................... 359/629
  See application file for complete search history.

(56) References Cited

U.S. PATENT DOCUMENTS

| | | | |
|---|---|---|---|
| 2007/0008624 | A1 | 1/2007 | Hirayama |
| 2007/0070859 | A1 | 3/2007 | Hirayama |
| 2008/0002260 | A1 | 1/2008 | Arrouy et al. |
| 2012/0075705 | A1 | 3/2012 | Beinat et al. |
| 2013/0201562 | A1 | 8/2013 | Kawagishi et al. |
| 2013/0279007 | A1 | 10/2013 | Kawi et al. |
| 2014/0016201 | A1 | 1/2014 | Lee et al. |
| 2015/0132554 | A1 | 5/2015 | Yamaguchi |
| 2015/0235370 | A1 | 8/2015 | Abovitz et al. |
| 2015/0322270 | A1 | 11/2015 | Amin et al. |
| 2015/0355382 | A1 | 12/2015 | Henn et al. |
| 2016/0231568 | A1 | 8/2016 | Saarikko et al. |
| 2016/0277718 | A1 | 9/2016 | Teramoto et al. |
| 2017/0212348 | A1 | 7/2017 | Fu et al. |
| 2017/0235142 | A1 | 8/2017 | Wall et al. |
| 2017/0283305 | A1 | 10/2017 | Brocheton |
| 2017/0363870 | A1 | 12/2017 | Cakmakci et al. |
| 2018/0029337 | A1 | 2/2018 | Wilson et al. |
| 2018/0095284 | A1 | 4/2018 | Welch et al. |
| 2018/0127310 | A1 | 5/2018 | Keech et al. |
| 2018/0141851 | A1 | 5/2018 | Amma et al. |
| 2018/0259682 | A1 | 9/2018 | Scherschlicht et al. |
| 2018/0313981 | A1 | 11/2018 | Cobb et al. |
| 2020/0041698 | A1 | 2/2020 | Damm et al. |
| 2020/0041794 | A1 | 2/2020 | Damm |
| 2020/0041804 | A1 | 2/2020 | Thomas et al. |
| 2020/0123044 | A1 | 4/2020 | Amma et al. |
| 2020/0192095 | A1 | 6/2020 | Puetz et al. |
| 2020/0209434 | A1* | 7/2020 | Nakano ................. G02B 15/163 |
| 2020/0346973 | A1 | 11/2020 | Akao et al. |
| 2021/0341738 | A1 | 11/2021 | Dong et al. |

FOREIGN PATENT DOCUMENTS

| | | |
|---|---|---|
| DE | 10 2007 022 048 A1 | 11/2008 |
| WO | 2016/075596 A1 | 5/2016 |
| WO | 2017/176861 A1 | 10/2017 |

OTHER PUBLICATIONS

ASTM F 657-92, "Standard Test Method for Measuring Warp and Total Thickness Variation on Silicon Wafers by Noncontact Scanning", downloaded from www.astm.org, Jan. 16, 2018 (10 pages).
U.S. Office Action dated Feb. 2, 2021 for U.S. Appl. No. 16/529,377 (19 page).
P. King and L. B. Lockhart "Experimental and Theoretical Results in Two-Layer Low Reflecting Coatings for Glass", Journal of the Optical Society of Amercia, vol. 36. No. 9, Sep. 1946, pp. 513-517 (5 pages).
Chinese Office Action, including an English translation, dated Jan. 17, 2022 for Chinese Patent Application No. 201910708704.7 (25 pages).
Chinese Office Action, including an English translation, dated Jan. 18, 2022 for Chinese Patent Application No. 201910709157.4 (23 pages).
Chinese Office Action, including an English translation, dated Jul. 5, 2022 for Chinese Patent Application No. 201910708620.3 (18 pages).
United States Office Action dated Jun. 3, 2022 for U.S. Appl. No. 16/529,377 (32 pages).
Office Action dated Oct. 13, 2022 for U.S. Appl. No. 16/529,377 (21 pages).
Translation to English for CN 107305264 A via espacenet acessed Oct. 6, 2022 (Year 2017) (11 pages).
Office Action dated Oct. 31, 2022 for U.S. Appl. No. 16/529,192 (16 pages).
English translation of Chinese Office Action dated May 27, 2023 for Chinese Patent Application No. 201910708620.3 (7 pages).
U.S. Office Action dated Jul. 19, 2023 for U.S. Appl. No. 16/529,192 (21 pages).
Spectral Thin Film Reflectance Calculator for Thin-Film Stacks (https://www.filmetrics.com/reflectance-calcluator) (Year: 2023).

\* cited by examiner

OPTICAL LAYERED COMPOSITE HAVING A COATING THICKNESS BELOW A THRESHOLD AND ITS APPLICATION IN AUGMENTED REALITY

BACKGROUND OF THE INVENTION

1. Field of the Invention

In general, the present invention relates to an optical layered composite, in particular for use in an augmented reality device. In particular, the present invention relates to an optical layered composite and a process for its preparation, a device comprising the optical layered composite and a process for its preparation, and the use of an optical layered composite in an augmented reality device.

2. Description of the Related Art

Augmented reality is a high activity technological area serving a range of use areas, such as entertainment, medical, educational, construction and transport, to name just a few examples. By contrast to the related area of virtual reality, augmented reality centers on a close integration of multimedia information with real world sensory input, typically by selectively over-laying a digital image onto a spectacle window. Technical challenges arise from the simultaneous requirements of a good real world image, a good overlaid image along with good wear-ability. Once approach to an augmented reality device is presented in International patent application number WO 2017/176861A1. That document teaches a system in which an over-laid image is coupled into a wearable screen and propagated in a transverse direction. A requirement still exists for improved devices for augmented reality.

SUMMARY OF THE INVENTION

Exemplary embodiments disclosed herein overcome at least one of the challenges encountered in the state of the art in relation to augmented reality devices, in particular in relation to propagation of an image in an optical body.

Some exemplary embodiments disclosed herein improve the field of view in an augmented reality device.

Some exemplary embodiments disclosed herein increase transmission of an image when propagated in a transverse direction in an optical body.

Some exemplary embodiments disclosed herein improve color fidelity in an augmented reality device.

Some exemplary embodiments disclosed herein provide a device in which transverse propagation of an image is improved whilst simultaneously achieving good anti-reflect properties for longitudinally incident light.

Some exemplary embodiments disclosed herein provide an augmented reality device with a reduced weight and good optical properties.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
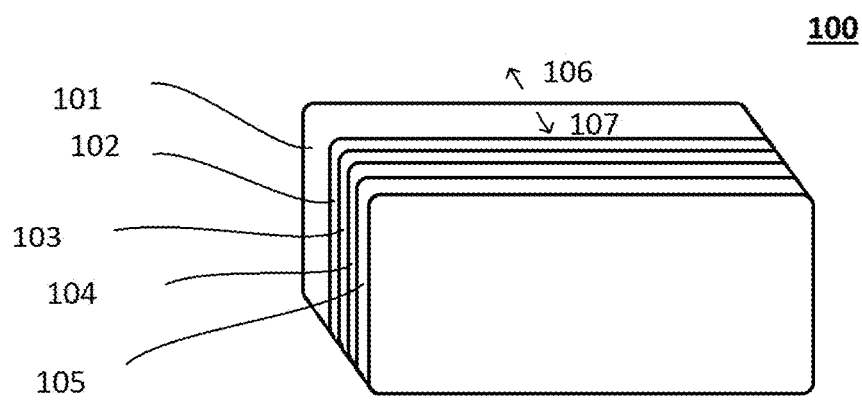
FIG. 1 illustrates an exemplary embodiment of an optical layered composite provided according to the present invention having a substrate and 4 coating layers.

Exemplary embodiments provided according to the present invention are described further herein.

In some exemplary embodiments provided according to the present invention, an optical layered composite includes: a substrate having a front face, a back face, a thickness $d_s$ between the front face and the back face and a refractive index $n_s$; and a coating applied to the front face, the coating comprising one or more coating layers. For at least one wavelength $\lambda_g$ in the range from 390 nm to 700 nm, the coating satisfies the following criterion either:

$$n_c < n_s; \text{ or} \qquad \text{i.)}$$

$$n_c > n_s, \text{ and } d_c < \frac{k}{\sqrt{n_c^2 - n_s^2}} \cdot \arctan\sqrt{\frac{n_s^2 - 1}{n_c^2 - n_s^2}} \qquad \text{ii.)}$$

wherein $n_c$ is a mean refractive index of the coating layers, weighted by thickness;
wherein $d_c$ is a total thickness of the coating;
wherein thicknesses are determined in a direction perpendicular to the front face;
wherein $k = \lambda_g/4\pi$.

In some embodiments, sub-criterion i.) is satisfied for at least one wavelength $\lambda_g$ in the range from 390 nm to 700 nm.

In some embodiments, sub-criterion ii.) is satisfied for at least one wavelength $\lambda_g$ in the range from 390 nm to 700 nm.

In some embodiments, for at least one wavelength $\lambda_g$ in the range from 390 nm to 700 nm, the coating satisfies the following criterion either:

$$n_c < n_s; \text{ or} \qquad \text{ib.)}$$

$$n_c > n_s, \text{ and } 50 \text{ nm} + d_c < \frac{k}{\sqrt{n_c^2 - n_s^2}} \cdot \arctan\sqrt{\frac{n_s^2 - 1}{n_c^2 - n_s^2}} \qquad \text{iib.)}$$

wherein $n_c$ is the mean refractive index of the coating layers, weighted by thickness;
wherein $d_c$ is the total thickness of the coating;
wherein thicknesses are determined in a direction perpendicular to the front face;
wherein $k = \lambda_g/4\pi$.

In some embodiments, sub-criterion ib.) is satisfied for at least one wavelength $\lambda_g$ in the range from 390 nm to 700 nm. In some embodiments, sub-criterion iib.) is satisfied for at least one wavelength $\lambda_g$ in the range from 390 nm to 700 nm.

In some embodiments, for at least one wavelength $\lambda_g$ in the range from 390 nm to 700 nm, the coating satisfies the following criterion either:

$$n_c < n_s; \text{ or} \qquad \text{ic.)}$$

$$n_c > n_s, \text{ and } 100 \text{ nm} + d_c < \frac{k}{\sqrt{n_c^2 - n_s^2}} \cdot \arctan\sqrt{\frac{n_s^2 - 1}{n_c^2 - n_s^2}} \qquad \text{iic.)}$$

wherein $n_c$ is the mean refractive index of the coating layers, weighted by thickness;
wherein $d_c$ is the total thickness of the coating;
wherein thicknesses are determined in a direction perpendicular to the front face;
wherein $k = \lambda_g/4\pi$.

In some embodiments, sub-criterion ic.) is satisfied for at least one wavelength $\lambda_g$ in the range from 390 nm to 700 nm. In some embodiments, sub-criterion iic.) is satisfied for at least one wavelength $\lambda_g$ in the range from 390 nm to 700 nm.

In some embodiments, at each of the wavelengths $\lambda_g=450$ nm, 550 nm and 650 nm, the criterion is satisfied. In some embodiments, sub-criterion i.) is satisfied at each of the wavelengths $\lambda_g=450$ nm, 550 nm and 650 nm. In some embodiments, sub-criterion ii.) is satisfied at each of the wavelengths $\lambda_g=450$ nm, 550 nm and 650 nm.

In some embodiments, at each of the wavelengths $\lambda_g=450$ nm, 550 nm and 650 nm, the criterion is satisfied. In some embodiments, sub-criterion ib.) is satisfied at each of the wavelengths $\lambda_g=450$ nm, 550 nm and 650 nm. In some embodiments, sub-criterion iib.) is satisfied at each of the wavelengths $\lambda_g=450$ nm, 550 nm and 650 nm.

In some embodiments, at each of the wavelengths $\lambda_g=450$ nm, 550 nm and 650 nm, the criterion is satisfied. In some embodiments, sub-criterion ic.) is satisfied at each of the wavelengths $\lambda_g=450$ nm, 550 nm and 650 nm. In some embodiments, sub-criterion iic.) is satisfied at each of the wavelengths $\lambda_g=450$ nm, 550 nm and 650 nm.

In some embodiments, at every wavelength $\lambda_g$ in the range from 390 nm to 700 nm, the criterion is satisfied. In some embodiments, sub-criterion i.) is satisfied at every wavelength $\lambda_g$ in the range from 390 nm to 700 nm. In some embodiments, sub-criterion ii.) is satisfied at every wavelength $\lambda_g$ in the range from 390 nm to 700 nm.

In some embodiments, at every wavelength $\lambda_g$ in the range from 390 nm to 700 nm, the criterion is satisfied. In some embodiments, sub-criterion ib.) is satisfied at every wavelength $\lambda_g$ in the range from 390 nm to 700 nm. In some embodiments, sub-criterion iib.) is satisfied at every wavelength $\lambda_g$ in the range from 390 nm to 700 nm.

In some embodiments, at every wavelength $\lambda_g$ in the range from 390 nm to 700 nm, the criterion is satisfied. In some embodiments, sub-criterion ic.) is satisfied at every wavelength $\lambda_g$ in the range from 390 nm to 700 nm. In some embodiments, sub-criterion iic.) is satisfied at every wavelength $\lambda_g$ in the range from 390 nm to 700 nm.

In some embodiments, the coating has 2 to 10 coating layers, such as 3 to 9 or 4 to 8. In some embodiments, the optical layered composite comprises or has 2 to 10 coating layers each having a thickness of above 5 nm, such as 3 to 9 coating layers each having a thickness of above 5 nm or 4 to 8 coating layers each having a thickness of above 5 nm. In addition to coating layers each having a thickness of above 5 nm, the layered composition may further comprise one or more coating having a thickness of 5 nm or less.

In some embodiments, the coating has 2 or more coating layers, such as 3 or more or 4 or more. In some embodiments, the optical layered composite comprises or has 2 or more coating layers each having a thickness of above 5 nm, such as 3 or more coating layers each having a thickness of above 5 nm or 4 or more coating layers each having a thickness of above 5 nm. In addition to coating layers each having a thickness of above 5 nm, the layered composition may further comprise one or more coating having a thickness of 5 nm or less.

In some embodiments, the coating has up to 10 coating layers, such as up to 9 or up to 8. In some embodiments, the optical layered composite comprises or has up to 10 coating layers each having a thickness of above 5 nm, such as up to 9 coating layers each having a thickness of above 5 nm or up to 8 coating layers each having a thickness of above 5 nm. In addition to coating layers each having a thickness of above 5 nm, the layered composition may further comprise one or more coating having a thickness of 5 nm or less.

In some embodiments, the coating comprises a coating layer with a thickness in the range from 1 to 600 nm, such as in the range from 5 to 400 nm, in the range from 8 to 300 nm, or in the range from 10 to 200 nm.

In some embodiments, the coating comprises a coating layer with a thickness of up to 600 nm, such as up to 400 nm, up to 300 nm, or up to 200 nm.

In some embodiments, the coating comprises a coating layer with a thickness of at least 1 nm, such as at least 5 nm, at least 8 nm, or at least 10 nm.

In some embodiments, the coating comprises a group A of one or more coating layers having a refractive index of at least 1.7 and a group B of one or more coating layers having a refractive index below 1.7.

In some embodiments, the coating is made up of alternating coating regions of a type A and a type B. A coating region of type A has a thickness of from 10 to 300 nm and is made up of one or more coating layers, each of which satisfies one or both of the criteria i.) & ii.):

i.) a thickness of 5 nm or less,
ii.) the coating layer is of group A.

A coating region of type B has a thickness of from 10 to 300 nm and is made up of one or more coating layers, each of which satisfies one or both of the criteria iii.) & iv.):

iii.) a thickness of 5 nm or less,
iv.) the coating layer is of group B.

In some embodiments, the coating region furthest from the substrate is of type B. In some embodiments, the layer furthest from the substrate may be a coating layer of group A having a thickness of 5 nm or less.

In some embodiments, the coating has an even total number of coating regions and the coating region closest coating layer closest to the substrate is of type A.

In some embodiments, the coating has an odd number of coating regions and the coating region closest to the substrate is of type B.

In some embodiments, the coating layer having a thickness of above 5 nm furthest from the substrate is of the group B.

In some embodiments, the substrate has a refractive index of 1.6 or more, such as 1.65 or more or 1.7 or more. In some embodiments, the substrate has a refractive index in the range from 1.6 to 2.4, such as in the range from 1.65 to 2.35 or in the range from 1.7 to 2.3. In some embodiments, the substrate has a refractive index of at most 2.4, such as at most 2.35 or at most 2.3.

In some embodiments, one or more of the following is satisfied:
  i.) the thickness $d_s$ is in the range from 10 to 1500 µm, such as in the range from 10 to 1000 µm, in the range from 10 to 500 µm, in the range from 20 to 450 µm, or in the range from 30 to 400 µm; or
    the thickness $d_s$ is at least 10 µm, such as at least 20 µm or at least 30 µm; or
    the thickness $d_s$ is up to 1500 µm, such as up to 1000 µm, up to 500 µm, up to 450 µm, or up to 400 µm; or
  ii.) a radius of curvature greater than 600 mm, such as greater than 800 mm or greater than 1100 mm;
  iii.) an in-plane optical loss measured perpendicular to the front face of at most 20%, such as at most 15% or at most 10%;
  iv.) a surface roughness of the substrate of less than 5 nm, such as less than 3 nm or less than 2 nm;
  v.) a surface roughness of the coating of less than 5 nm, such as less than 3 nm or less than 2 nm;
  vi.) a total thickness variation of less than 5 µm, such as less than 4 µm, less than 3 µm, or less than 2 µm;
  vii.) a maximum local thickness variation over 75% of the front face of less than 5 µm, such as less than 4 µm, less than 3 µm, or less than 2 µm;
  viii.) a warp of less than 350 µm, such as less than 300 µm or less than 250 µm;
  ix.) a bow of less than 300 µm, such as less than 250 µm or less than 200 µm.

In some embodiments, at least the following combinations of the immediately previous features are fulfilled:
ix.)+viii.)+vii.)+vi.)+v.)+iv.)+iii.)+ii.)+i.), ix.)+viii.)+vii.)+vi.)+v.)+iv.)+iii.)+ii.), ix.)+viii.)+vii.)+vi.)+v.)+iv.)+iii.)+i.), ix.)+viii.)+vii.)+vi.)+v.)+iv.)+iii.), ix.)+viii.)+vii.)+vi.)+v.)+iv.)+ii.)+i.), ix.)+viii.)+vii.)+vi.)+v.)+iv.)+ii.), ix.)+viii.)+vii.)+vi.)+v.)+iv.)+i.), ix.)+viii.)+vii.)+vi.)+v.)+iv.), ix.)+viii.)+vii.)+vi.)+v.)+iii.)+ii.)+i.), ix.)+viii.)+vii.)+vi.)+v.)+iii.)+ii.), ix.)+viii.)+vii.)+vi.)+v.)+iii.)+i.), ix.)+viii.)+vii.)+vi.)+v.)+iii.), ix.)+viii.)+vii.)+vi.)+v.)+ii.)+i.), ix.)+viii.)+vii.)+vi.)+v.)+ii.), ix.)+viii.)+vii.)+vi.)+v.)+i.), ix.)+viii.)+vii.)+vi.)+v.), ix.)+viii.)+vii.)+vi.)+iv.)+iii.)+ii.)+i.), ix.)+viii.)+vii.)+vi.)+iv.)+iii.)+ii.), ix.)+viii.)+vii.)+vi.)+iv.)+iii.)+i.), ix.)+viii.)+vii.)+vi.)+iv.)+iii.), ix.)+viii.)+vii.)+vi.)+iv.)+ii.)+i.), ix.)+viii.)+vii.)+vi.)+iv.)+ii.), ix.)+viii.)+vii.)+vi.)+iv.)+i.), ix.)+viii.)+vii.)+vi.)+iv.), ix.)+viii.)+vii.)+vi.)+iii.)+ii.)+i.), ix.)+viii.)+vii.)+vi.)+iii.)+ii.), ix.)+viii.)+vii.)+vi.)+iii.)+i.), ix.)+viii.)+vii.)+vi.)+iii.), ix.)+viii.)+vii.)+vi.)+ii.)+i.), ix.)+viii.)+vii.)+vi.)+ii.), ix.)+viii.)+vii.)+vi.)+i.), ix.)+viii.)+vii.)+vi.), ix.)+viii.)+vii.)+v.)+iv.)+iii.)+ii.)+i.), ix.)+viii.)+vii.)+v.)+iv.)+iii.)+ii.), ix.)+viii.)+vii.)+v.)+iv.)+iii.)+i.), ix.)+viii.)+vii.)+v.)+iv.)+iii.), ix.)+viii.)+vii.)+v.)+iv.)+ii.)+i.), ix.)+viii.)+vii.)+v.)+iv.)+ii.), ix.)+viii.)+vii.)+v.)+iv.)+i.), ix.)+viii.)+vii.)+v.)+iv.), ix.)+viii.)+vii.)+v.)+iii.)+ii.)+i.), ix.)+viii.)+vii.)+v.)+iii.)+ii.), ix.)+viii.)+vii.)+v.)+iii.)+i.), ix.)+viii.)+vii.)+v.)+iii.), ix.)+viii.)+vii.)+v.)+ii.)+i.), ix.)+viii.)+vii.)+v.)+ii.), ix.)+viii.)+vii.)+v.)+i.), ix.)+viii.)+vii.)+v.), ix.)+viii.)+vii.)+iv.)+iii.)+ii.)+i.), ix.)+viii.)+vii.)+iv.)+iii.)+ii.), ix.)+viii.)+vii.)+iv.)+iii.)+i.), ix.)+viii.)+vii.)+iv.)+iii.), ix.)+viii.)+vii.)+iv.)+ii.)+i.), ix.)+viii.)+vii.)+iv.)+ii.), ix.)+viii.)+vii.)+iv.)+i.), ix.)+viii.)+vii.)+iv.), ix.)+viii.)+vii.)+iii.)+ii.)+i.), ix.)+viii.)+vii.)+iii.)+ii.), ix.)+viii.)+vii.)+iii.)+i.), ix.)+viii.)+vii.)+iii.), ix.)+viii.)+vii.)+ii.)+i.), ix.)+viii.)+vii.)+ii.), ix.)+viii.)+vii.)+i.), ix.)+viii.)+vii.), ix.)+viii.)+vi.)+v.)+iv.)+iii.)+ii.)+i.), ix.)+viii.)+vi.)+v.)+iv.)+iii.)+ii.), ix.)+viii.)+vi.)+v.)+iv.)+iii.)+i.), ix.)+viii.)+vi.)+v.)+iv.)+iii.), ix.)+viii.)+vi.)+v.)+iv.)+ii.)+i.), ix.)+viii.)+vi.)+v.)+iv.)+ii.), ix.)+viii.)+vi.)+v.)+iv.)+i.), ix.)+viii.)+vi.)+v.)+iv.), ix.)+viii.)+vi.)+v.)+iii.)+ii.)+i.), ix.)+viii.)+vi.)+v.)+iii.)+ii.), ix.)+viii.)+vi.)+v.)+iii.)+i.), ix.)+viii.)+vi.)+v.)+iii.), ix.)+viii.)+vi.)+v.)+ii.)+i.), ix.)+viii.)+vi.)+v.)+ii.), ix.)+viii.)+vi.)+v.)+i.), ix.)+viii.)+vi.)+v.), ix.)+viii.)+vi.)+iv.)+iii.)+ii.)+i.), ix.)+viii.)+vi.)+iv.)+iii.)+ii.), ix.)+viii.)+vi.)+iv.)+iii.)+i.), ix.)+viii.)+vi.)+iv.)+iii.), ix.)+viii.)+vi.)+iv.)+ii.)+i.), ix.)+viii.)+vi.)+iv.)+ii.), ix.)+viii.)+vi.)+iv.)+i.), ix.)+viii.)+vi.)+iv.), ix.)+viii.)+vi.)+iii.)+ii.)+i.), ix.)+viii.)+vi.)+iii.)+ii.), ix.)+viii.)+vi.)+iii.)+i.), ix.)+viii.)+vi.)+iii.), ix.)+viii.)+vi.)+ii.)+i.), ix.)+viii.)+vi.)+ii.), ix.)+viii.)+vi.)+i.), ix.)+viii.)+vi.), ix.)+viii.)+v.)+iv.)+iii.)+ii.)+i.), ix.)+viii.)+v.)+iv.)+iii.)+ii.), ix.)+viii.)+v.)+iv.)+iii.)+i.), ix.)+viii.)+v.)+iv.)+iii.), ix.)+viii.)+v.)+iv.)+ii.)+i.), ix.)+viii.)+v.)+iv.)+ii.), ix.)+viii.)+v.)+iv.)+i.), ix.)+viii.)+v.)+iv.), ix.)+viii.)+v.)+iii.)+ii.)+i.), ix.)+viii.)+v.)+iii.)+ii.), ix.)+viii.)+v.)+iii.)+i.), ix.)+viii.)+v.)+iii.), ix.)+viii.)+v.)+ii.)+i.), ix.)+viii.)+v.)+ii.), ix.)+viii.)+v.)+i.), ix.)+viii.)+v.), ix.)+viii.)+iv.)+iii.)+ii.)+i.), ix.)+viii.)+iv.)+iii.)+ii.), ix.)+viii.)+iv.)+iii.)+i.), ix.)+viii.)+iv.)+iii.), ix.)+viii.)+iv.)+ii.)+i.), ix.)+viii.)+iv.)+ii.), ix.)+viii.)+iv.)+i.), ix.)+viii.)+iv.), ix.)+viii.)+iii.)+ii.)+i.), ix.)+viii.)+iii.)+ii.), ix.)+viii.)+iii.)+i.), ix.)+viii.)+iii.), ix.)+viii.)+ii.)+i.), ix.)+viii.)+ii.), ix.)+viii.)+i.), ix.)+viii.), ix.)+vii.)+vi.)+v.)+iv.)+iii.)+ii.)+i.), ix.)+vii.)+vi.)+v.)+iv.)+iii.)+ii.), ix.)+vii.)+vi.)+v.)+iv.)+iii.)+i.), ix.)+vii.)+vi.)+v.)+iv.)+iii.), ix.)+vii.)+vi.)+v.)+iv.)+ii.)+i.), ix.)+vii.)+vi.)+v.)+iv.)+ii.), ix.)+vii.)+vi.)+v.)+iv.)+i.), ix.)+vii.)+vi.)+v.)+iv.), ix.)+vii.)+vi.)+v.)+iii.)+ii.)+i.), ix.)+vii.)+vi.)+v.)+iii.)+ii.), ix.)+vii.)+vi.)+v.)+iii.)+i.), ix.)+vii.)+vi.)+v.)+iii.), ix.)+vii.)+vi.)+v.)+ii.)+i.), ix.)+vii.)+vi.)+v.)+ii.), ix.)+vii.)+vi.)+v.)+i.), ix.)+vii.)+vi.)+v.), ix.)+vii.)+vi.)+iv.)+iii.)+ii.)+i.), ix.)+vii.)+vi.)+iv.)+iii.)+ii.), ix.)+vii.)+vi.)+iv.)+iii.)+i.), ix.)+vii.)+vi.)+iv.)+iii.), ix.)+vii.)+vi.)+iv.)+ii.)+i.), ix.)+vii.)+vi.)+iv.)+ii.), ix.)+vii.)+vi.)+iv.)+i.), ix.)+vii.)+vi.)+iv.), ix.)+vii.)+vi.)+iii.)+ii.)+i.), ix.)+vii.)+vi.)+iii.)+ii.), ix.)+vii.)+vi.)+iii.)+i.), ix.)+vii.)+vi.)+iii.), ix.)+vii.)+vi.)+ii.)+i.), ix.)+vii.)+vi.)+ii.), ix.)+vii.)+vi.)+i.), ix.)+vii.)+vi.), ix.)+vii.)+v.)+iv.)+iii.)+ii.)+i.), ix.)+vii.)+v.)+iv.)+iii.)+ii.), ix.)+vii.)+v.)+iv.)+iii.)+i.), ix.)+vii.)+v.)+iv.)+iii.), ix.)+vii.)+v.)+iv.)+ii.)+i.), ix.)+vii.)+v.)+iv.)+ii.), ix.)+vii.)+v.)+iv.)+i.), ix.)+vii.)+v.)+iv.), ix.)+vii.)+v.)+iii.)+ii.)+i.), ix.)+vii.)+v.)+iii.)+ii.), ix.)+vii.)+v.)+iii.)+i.), ix.)+vii.)+v.)+iii.), ix.)+vii.)+v.)+ii.)+i.), ix.)+vii.)+v.)+ii.), ix.)+vii.)+v.)+i.), ix.)+vii.)+v.), ix.)+vii.)+iv.)+iii.)+ii.)+i.), ix.)+vii.)+iv.)+iii.)+ii.), ix.)+vii.)+iv.)+iii.)+i.), ix.)+vii.)+iv.)+iii.), ix.)+vii.)+iv.)+ii.)+i.), ix.)+vii.)+iv.)+ii.), ix.)+vii.)+iv.)+i.), ix.)+vii.)+iv.), ix.)+vii.)+iii.)+ii.)+i.), ix.)+vii.)+iii.)+ii.), ix.)+vii.)+iii.)+i.), ix.)+vii.)+iii.), ix.)+vii.)+ii.)+i.), ix.)+vii.)+ii.), ix.)+vii.)+i.), ix.)+vii.), ix.)+vi.)+v.)+iv.)+iii.)+ii.)+i.), ix.)+vi.)+v.)+iv.)+iii.)+ii.), ix.)+vi.)+v.)+iv.)+iii.)+i.), ix.)+vi.)+v.)+iv.)+iii.), ix.)+vi.)+v.)+iv.)+ii.)+i.), ix.)+v.)+.)+iv.)+ii.), ix.)+vi.)+v.)+iv.)+i.), ix.)+vi.)+v.)+iv.), ix.)+vi.)+v.)+iii.)+ii.)+i.), ix.)+vi.)+v.)+iii.)+ii.), ix.)+vi.)+v.)+iii.)+i.), ix.)+vi.)+v.)+iii.), ix.)+vi.)+v.)+ii.)+i.), ix.)+vi.)+v.)+ii.), ix.)+vi.)+v.)+i.), ix.)+vi.)+v.), ix.)+vi.)+iv.)+iii.)+ii.)+i.), ix.)+vi.)+iv.)+iii.)+ii.), ix.)+vi.)+iv.)+iii.)+i.), ix.)+vi.)+iv.)+iii.), ix.)+vi.)+iv.)+ii.)+i.), ix.)+vi.)+iv.)+ii.), ix.)+vi.)+iv.)+i.), ix.)+vi.)+iv.), ix.)+vi.)+iii.)+ii.)+i.), ix.)+vi.)+iii.)+ii.), ix.)+vi.)+iii.)+i.), ix.)+vi.)+iii.), ix.)+vi.)+ii.)+i.), ix.)+vi.)+ii.), ix.)+vi.)+i.), ix.)+vi.), ix.)+v.)+iv.)+iii.)+ii.)+i.), ix.)+v.)+iv.)+iii.)+ii.), ix.)+v.)+iv.)+iii.)+i.), ix.)+v.)+iv.)+iii.), ix.)+v.)+iv.)+ii.)+i.), ix.)+v.)+iv.)+ii.), ix.)+v.)+iv.)+i.), ix.)+v.)+iv.), ix.)+v.)+iii.)+ii.)+i.), ix.)+v.)+iii.)+ii.), ix.)+v.)+iii.)+i.), ix.)+v.)+iii.), ix.)+v.)+ii.)+i.), ix.)+v.)+ii.), ix.)+v.)+i.), ix.)+v.), ix.)+iv.)+iii.)+ii.)+i.), ix.)+i.)+i.), ix.)+ii.), ix.)+i.), ix.), v+iii.)+vi.)+vi.)+v.)+iii.), ix.)+i.)+ii.)+i.), viii.)+vii.)+vi.)+v.)+iv.)+iii.)+ii.), viii.)+vii.)+vi.)+v.)+iv.)+iii.)+i.), viii.)+vii.)+vi.)+v.)+iv.)+iii.), viii.)+vii.)+vii.), ix.)+ii.),)+iv.)+ii.)+i.), viii.)+vii.)+vi.)+v.)+iv.)+ii.), viii.)+vii.)+vi.)+v.)+iv.)+i.), viii.)+vii.)+vi.)+v.)+iv.), viii.)+vii.)+vi.)+v.)+iii.)+ii.)+i.), viii.)+vii.)+vi.)+v.)+iii.)+ii.), viii.)+vii.)+vi.)+v.)+iii.)+i.), viii.)+vii.)+vi.)+v.)+iii.), viii.)+vii.)+vi.)+v.)+ii.)+i.), viii.)+vii.)+vi.)+v.)+ii.), viii.)+vii.)+vi.)+v.)+i.), viii.)+vii.)+vi.)+v.), viii.)+ii.), vii.)+vi.)+iv.)+iii.)+ii.)+i.), viii.)+vii.)+vi.)+iv.)+iii.)+ii.), viii.)+vii.)+vi.)+iv.)+iii.)+i.), viii.)+vii.)+vi.)+iv.)+iii.), viii.)+vii.)+vi.)+iv.)+ii.)+i.), viii.)+vii.)+vi.)+iv.)+ii.), viii.)+vii.)+vi.)+iv.)+i.), viii.)+vii.)+vi.)+iv.), viii.)+vii.)+vi.)+iii.)+ii.)+i.), viii.)+vii.)+vi.)+iii.)+ii.), viii.)+vii.)+vi.)+iii.)+i.), viii.)+vii.)+vi.)+iii.), viii.)+vii.)+vi.)+ii.)+i.), viii.)+vii.)+vi.)+ii.), viii.)+vii.)+vi.)+i.), viii.)+vii.)+vi.), viii.)+vii.)+v.)+iv.)+iii.)+ii.)+i.), viii.)+vii.)+v.)+iv.)+iii.)+ii.), viii.)+vii.)+v.)+iv.)+ii)+i.), viii.)+vii.)+v.)+iv.)+iii.), viii.)+vii.)+v.)+iv.)+ii.)+i.), viii.)+vii.)+v.)+iv.)+ii.), viii.)+vii.)+v.)+iv.)+i.), viii.)+vii.)+v.)+iv.), viii.)+vii.)+v.)+iii.)+ii.)+i.), viii.)+vii.)+v.)+iii.)+ii.), viii.)+vii.)+v.)+iii.)+i.), viii.)+vii.)+v.)+iii.), viii.)+vii.)+v.)+ii.)+i.), viii.)+vii.)+v.)+ii.), viii.)+vii.)+v.)+i.), viii.)+vii.)+v.), viii.)+vii.)+iv.)+iii.)+ii.)+i.), viii.)+vii.)+iv.)+iii.)+ii.), viii.)+vii.)+iv.)+ii.)+i.), viii.)+vii.)+iv.)+iii.), viii.)+vii.)+iv.)+ii.)+i.), viii.)+vii.)+iv.)+ii.), viii.)+vii.)+iv.)+i.), viii.)+vii.)+iv.), viii.)+vii.)+iii.)+ii.)+i.), viii.)+vii.)+iii.)+ii.), viii.)+vii.)+iii.)+i.), viii.)+vii.)+iii.), viii.)+vii.)+ii.)+i.), viii.)+vii.)+ii.), viii.)+vii.)+i.), viii.)+vii.), viii.)+vi.)+v.)+iv.)+iii.)+ii.)+i.), viii.)+vi.)+v.)+iv.)+iii.)+ii.), viii.)+vi.)+v.)+iv.)+iii.)+i.), viii.)+vi.)+v.)+iv.)+iii.), viii.)+vi.)+v.)+iv.)+ii.)+i.), viii.)+vi.)+v.)+iv.)+ii.), viii.)+vi.)+v.)+iv.)+i.), viii.)+vi.)+v.)+iv.), viii.)+vi.)+v.)+iii.)+ii.)+i.), viii.)+vi.)+v.)+iii.)+ii.), viii.)+vi.)+v.)+iii.)+i.), viii.)+vi.)+v.)+iii.), viii.)+vi.)+v.)+ii.)+i.), viii.)+vi.)+v.)+ii.), viii.)+vi.)+v.)+i.), viii.)+vi.)+v.), viii.)+vi.)+iv.)+iii.)+ii.)+i.), viii.)+vi.)+iv.)+iii.)+i.), viii.)+vi.)+iv.)+iii.), viii.)+vi.)+iv.)+ii.)+i.), viii.)+vi.)+iv.)+ii.), viii.)+vi.)+iv.)+i.), viii.)+vi.)+iv.), viii.)+vi.)+iii.)+ii.)+i.), viii.)+vi.)+iii.)+ii.), viii.)+vi.)+iii.)+i.), viii.)+vi.)+iii.), viii.)+vi.)+ii.)+i.), viii.)+vi.)+ii.), viii.)+vi.)+i.), viii.)+vi.), viii.)+v.)+iv.)+iii.)+ii.)+i.), viii.)+v.)+iv.)+iii.)+ii.), viii.)+v.)+iv.)+iii.)+i.), viii.)+v.)+iv.)+iii.), viii.)+v.)+iv.)+ii.)+i.), viii.)+v.)+iv.)+ii.), viii.)+v.)+iv.)+i.), viii.)+v.)+iv.), viii.)+v.)+iii.)+ii.)+i.), viii.)+v.)+iii.)+ii.), viii.)+v.)+iii.)+i.), viii.)+v.)+iii.), viii.)+v.)+ii.)+i.), viii.)+v.)+ii.), viii.)+v.)+i.), viii.)+v.), viii.)+iv.)+iii.)+ii.)+i.), viii.)+iv.)+iii.)+ii.), viii.)+iv.)+iii.)+i.), viii.)+iv.)+iii.), viii.)+iv.)+ii.)+i.), viii.)+iv.)+ii.), viii.)+iv.)+i.), viii.)+iv.), viii.)+iii.)+ii.)+i.), viii.)+iii.)+ii.), viii.)+iii.)+i.), viii.)+iii.), viii.)+ii.)+i.), viii.)+ii.), viii.)+i.), viii.), vii.)+vi.)+v.)+iv.)+iii.)+ii.)+i.), vii.)+vi.)+v.)+iv.)+iii.)+ii.), vii.)+vi.)+v.)+iv.)+iii.)+i.), vii.)+vi.)+v.)+iv.)+iii.), vii.)+vi.)+v.)+iv.)+ii.)+i.), vii.)+vi.)+v.)+iv.)+ii.), vii.)+vi.)+v.)+iv.)+i.), vii.)+vi.)+v.)+iv.), vii.)+vi.)+v.)+iii.)+ii.)+i.), vii.)+vi.)+v.)+iii.)+ii.), vii.)+vi.)+v.)+iii.)+i.), vii.)+vi.)+v.)+iii.), vii.)+vi.)+v.)+ii.)+i.), vii.)+vi.)+v.)+ii.), vii.)+vi.)+v.)+i.), vii.)+vi.)+v.), vii.)+vi.)+iv.)+iii.)+ii.)+i.), vii.)+vi.)+iv.)+iii.)+ii.), vii.)+vi.)+iv.)+iii.)+i.), vii.)+vi.)+iv.)+iii.), vii.)+vi.)+iv.)+ii.)+i.), vii.)+vi.)+iv.)+ii.), vii.)+vi.)+iv.)+i.), vii.)+vi.)+iv.), vii.)+vi.)+iii.)+ii.)+i.), vii.)+vi.)+iii.)+ii.), vii.)+vi.)+iii.)+i.), vii.)+vi.)+iii.), vii.)+vi.)+ii.)+i.), vii.)+vi.)+ii.), vii.)+vi.)+i.), vii.)+vi.), vii.)+v.)+iv.)+iii.)+ii.)+i.), vii.)+v.)+iv.)+iii.)+ii.), vii.)+v.)+iv.)+iii.)+i.), vii.)+v.)+iv.)+iii.), vii.)+v.)+iv.)+ii.)+i.), vii.)+v.)+iv.)+ii.), vii.)+v.)+iv.)+i.), vii.)+v.)+iv.), vii.)+v.)+iii.)+ii.)+i.), vii.)+v.)+iii.)+ii.), vii.)+v.)+iii.)+i.), vii.)+v.)+iii.), vii.)+v.)+ii.)+i.), vii.)+v.)+ii.), vii.)+v.)+i.), vii.)+v.), vii.)+iv.)+iii.)+ii.)+i.), vii.)+iv.)+iii.)+ii.), vii.)+iv.)+iii.)+i.), vii.)+iv.)+iii.), vii.)+iv.)+ii.)+i.), vii.)+iv.)+ii.), vii.)+iv.)+i.), vii.)+iv.), vii.)+iii.)+ii.)+i.), vii.)+iii.)+ii.), vii.)+iii.)+i.), vii.)+iii.), vii.)+ii.)+i.), vii.)+ii.), vii.)+i.), vii.), vi.)+v.)+iv.)+iii.)+ii.)+i.), vi.)+v.)+iv.)+iii.)+ii.), vi.)+v.)+iv.)+iii.)+i.), vi.)+v.)+iv.)+iii.), vi.)+v.)+iv.)+ii.)+i.), vi.)+v.)+iv.)+ii.), vi.)+v.)+iv.)+i.), vi.)+v.)+iv.), vi.)+v.)+iii.)+ii.)+i.), vi.)+v.)+iii.)+ii.), vi.)+v.)+iii.)+i.), vi.)+v.)+iii.), vi.)+v.)+ii.)+i.), vi.)+v.)+ii.), vi.)+v.)+i.), vi.)+v.), vi.)+iv.)+iii.)+ii.)+i.), vi.)+iv.)+iii.)+ii.), vi.)+iv.)+iii.)+i.), vi.)+iv.)+iii.), vi.)+iv.)+ii.)+i.), vi.)+iv.)+ii.), vi.)+iv.)+i), vi.)+iv.)+i.), vi.)+iv.), vi.)+iii.)+ii.)+i.), vi.)+iii.)+ii.), vi.)+iii.)+i.), vi.)+iii.), vi.)+ii.)+i.), vi.)+ii.), vi.)+i.), vi.), v.)+iv.)+iii.)+ii.)+i.), v.)+iv.)+iii.)+ii.), v.)+iv.)+iii.)+i.), v.)+iv.)+iii.), v.)+iv.)+ii.)+i.), v.)+iv.)+ii.), v.)+iv.)+i.), v.)+iv.), v.)+iii.)+ii.)+i.), v.)+iii.)+ii.), v.)+iii.)+i.), v.)+iii.), v.)+ii.)+i.), v.)+ii.), v.)+i.), v.), iv.)+iii.)+ii.)+i.), iv.)+iii.)+ii.), iv.)+iii.)+i.), iv.)+iii.), iv.)+ii.)+i.), iv.)+ii.), iv.)+i.), iv.), iii.)+ii.)+i.), iii.)+ii.), iii.)+i.), iii.), ii.)+i.), ii.), i.).

In some embodiments, the coating comprises a coating layer having a refractive index in the range from 1.70 to 2.60, such as in the range from 1.80 to 2.60, from 1.90 to 2.50, ory from 1.95 to 2.45.

In some embodiments, the coating comprises a coating layer having a refractive index of at least 1.70, such as at least 1.80, at least 1.90, or at least 1.95.

In some embodiments, the coating comprises a coating layer having a refractive index of up to 2.60, such as up to 2.50, or up to 2.45.

In some embodiments, the coating comprises a coating layer having a refractive index in the range from 1.37 to 1.60, such as from 1.37 to 1.55 or from 1.38 to 1.50.

In some embodiments, the coating comprises a coating layer having a refractive index of at least 1.37, such as at least 1.38.

In some embodiments, the coating comprises a coating layer having a refractive index of up to 1.60, such as up to 1.55 or up to 1.50.

In some embodiments, the coating comprises a coating layer made of an inorganic material.

In some embodiments, the inorganic material comprises a first element having an electronegativity below 2, above 1.2, and a further element having an electronegativity above 2.

Electronegativity may be according to the Pauling method.

In some embodiments, the coating comprises a coating layer made of a material selected from the group consisting of: $SiO_2$, $MgF_2$ and a mixed oxide comprising $SiO_2$ and a further oxide. An exemplary mixed oxide in this context comprises $SiO_2$ and $Al_2O_3$. An exemplary mixed oxide in this context comprises $SiO_2$ in the range from 50 to 98 wt.

%, such as from 60 to 95 wt. % or from 70 to 93 wt. %. An exemplary mixed oxide in this context comprises $SiO_2$ up to 98 wt. %, such as up to 95 wt. % or up to 93 wt. %. An exemplary mixed oxide in this context comprises at least 50 wt. % $SiO_2$, such as at least 60 wt. % or at least 70 wt. %. An exemplary mixed oxide in this context is comprises $SiO_2$ in the range from 50 to 98 wt. %, such as from 60 to 95 wt. % or from 70 to 93 wt. % and $Al_2O_3$ in the range from 2 to 50 wt. %, such as from 5 to 40 wt. % or from 7 to 30 wt. %.

In some embodiments, the coating comprises a coating layer made of a material selected from the group consisting of: $Si_3N_4$, $ZrO_2$, $Ta_2O_5$, $HfO_2$, $Nb_2O_5$, $TiO_2$, $SnO_2$, indium tin oxide, $ZnO_2$, AlN, a mixed oxide comprising at least one thereof, a mixed nitride comprising at least one thereof and a mixed oxynitride comprising at least one thereof; such as made of a material selected from the group consisting of $ZrO_2$, $Ta_2O_5$, $HfO_2$, $Nb_2O_5$, $TiO_2$. and a mixed oxide comprising at least one thereof. In some embodiments, the coating layer is made of $ZrO_2$, or $HfO_2$. In some embodiments, the coating layer is made of $ZrO_2$, $TiO_2$ or $Nb_2O_5$. Exemplary mixed oxides are $TiO_2/SiO_2$; $Nb_2O_5/SiO_2$ and $ZrO_2/Y_2O_3$. An exemplary mixed nitride is AlSiN. An exemplary mixed oxynitride is AlSiON.

In some embodiments, the substrate is selected from glass, polymer, optoceramics or crystals.

In some embodiments, the substrate is selected form the group consisting of: a niobium phosphate glass, a lanthanum borate glass, a bismuth oxide glass, a silicate based glass.

In some embodiments, the optical layered composite comprises a device for coupling light into or decoupling light out of the optical layered composite.

In some embodiments, the device for coupling light in has a coupling surface area in the range from 1 $mm^2$ to 100 $mm^2$, such as in the range from 5 to 80 $mm^2$ or in the range from 10 to 60 $mm^2$.

In some embodiments, the device for coupling light in has a coupling surface area of at least 1 $mm^2$, such as at least 5 $mm^2$ or at least 10 $mm^2$.

In some embodiments, the device for coupling light in has a coupling surface area of up to 100 $mm^2$, such as up to 80 $mm^2$ or up to 60 $mm^2$.

In some embodiments, the device for coupling in is arranged and adjusted to couple light into the optical layered composite to propagate transverse to a normal vector to the front face.

In some embodiments, the coupling device is arranged and adjusted to deviate light by an angle of at least 30°, or at least 90°, or at least 135°. This angle may be up to 180°.

In some embodiments, the optical layered composite comprises a device for coupling light in and a device for decoupling light out, wherein the angle between the direction of travel of the light coupled in and the light coupled out is at least 30°, or at least 90°, or at least 135°. This angle may be up to 180°.

In some embodiments, the optical layered composite comprises a device for coupling light in over a first surface area and a device for decoupling light out over a further surface area, wherein the first surface area is less than the further surface area. The further surface area may be at least 2 times the first surface area, such as at least 5 times or at least 10 times.

In some embodiments, the optical layered composite is a wafer.

In some embodiments, at least one of the following criteria is satisfied:
i.) the front face has a surface area in the range from 0.010 to 0.500 $m^2$, such as in the range 0.013 to 0.200 $m^2$ or in the range from 0.017 to 0.100 $m^2$; or
the front face has a surface area of at least 0.010 $m^2$, such as at least 0.013 $m^2$ or at least 0.017 $m^2$; or
the front face has a surface area of up to 0.500 $m^2$, such as up to 0.200 $m^2$ or up to 0.100 $m^2$;
ii.) the thickness $d_s$ is in the range from 10 to 1500 µm, such as in the range from 10 to 1000 µm, in the range from 10 to 500 µm, in the range from 20 to 450 µm, or in the range from 30 to 400 µm;
iii.) the thickness $d_s$ is in the range from 10 to 1500 µm, such as in the range from 10 to 1000 µm, in the range from 10 to 500 µm, in the range from 20 to 450 µm, or in the range from 30 to 400 µm; or
the thickness $d_s$ is at least 10 µm, such as at least 20 µm or at least 30 µm;
the thickness $d_s$ is up to 1500 µm, such as up to 1000 µm, up to 500 µm, up to 450 µm, or up to 400 µm;
iv.) a radius of curvature greater than 600 mm, such as greater than 800 mm or greater than 1100 mm;
v.) an in-plane optical loss measured perpendicular to the front face of at most 20%, such as at most 15% or at most 10%;
vi.) a surface roughness of the substrate of less than 5 nm, such as less than 3 nm or less than 2 nm;
vii.) a surface roughness of the coating of less than 5 nm, such as less than 3 nm or less than 2 nm;
viii.) a total thickness variation of less than 5 µm, such as less than 4 µm, less than 3 µm, or less than 2 µm;
ix.) a maximum local thickness variation over 75% of the front face of less than 5 µm, such as less than 4 µm, less than 3 µm, or less than 2 µm;
x.) a warp of less than 350 µm, such as less than 300 µm or less than 250 µm;
xi.) a bow of less than 300 µm, such as less than 250 µm or less than 200 µm; or
xii.) a circular shape.

In some embodiments, at least the following combinations of the immediately previous features are fulfilled: ix.)+viii.)+vii.)+vi.)+v.)+iv.)+iii.)+ii.)+i.), ix.)+viii.)+vii.)+vi.)+v.)+iv.)+iii.)+ii.), ix.)+viii.)+vii.)+vi.)+v.)+iv.)+iii.)+i.), ix.)+viii.)+vii.)+vi.)+v.)+iv.)+iii.), ix.)+viii.)+vii.)+vi.)+v.)+iv.)+ii.)+i.), ix.)+viii.)+vii.)+vi.)+v.)+iv.)+ii.), ix.)+viii.)+vii.)+vi.)+v.)+iv.)+i.), ix.)+viii.)+vii.)+vi.)+v.)+iv.), ix.)+viii.)+vii.)+vi.)+v.)+iii.)+ii.)+i.), ix.)+viii.)+vii.)+vi.)+v.)+iii.)+ii.), ix.)+viii.)+vii.)+vi.)+v.)+iii.)+i.), ix.)+viii.)+vii.)+vi.)+v.)+iii.), ix.)+viii.)+vii.)+vi.)+v.)+ii.)+i.), ix.)+viii.)+vii.)+vi.)+v.)+ii.), ix.)+viii.)+vii.)+vi.)+v.)+i.), ix.)+viii.)+vii.)+vi.)+v.), ix.)+viii.)+vii.)+vi.)+iv.)+iii.)+ii.)+i.), ix.)+viii.)+vii.)+vi.)+iv.)+iii.)+ii.), ix.)+viii.)+vii.)+vi.)+iv.)+iii.)+i.), ix.)+viii.)+vii.)+vi.)+iv.)+iii.), ix.)+viii.)+vii.)+vi.)+iv.)+ii.)+i.), ix.)+viii.)+vii.)+vi.)+iv.)+ii.), ix.)+viii.)+vii.)+vi.)+iv.)+i.), ix.)+viii.)+vii.)+vi.)+iv.), ix.)+viii.)+vii.)+vi.)+iii.)+ii.)+i.), ix.)+viii.)+vii.)+vi.)+iii.)+ii.), ix.)+viii.)+vii.)+vi.)+iii.)+i.), ix.)+viii.)+vii.)+vi.)+iii.), ix.)+viii.)+vii.)+vi.)+ii.)+i.), ix.)+viii.)+vii.)+vi.)+ii.), ix.)+viii.)+vii.)+vi.)+i.), ix.)+viii.)+vii.)+vi.), ix.)+viii.)+vii.)+v.)+iv.)+iii.)+ii.)+i.), ix.)+viii.)+vii.)+v.)+iv.)+iii.)+ii.), ix.)+viii.)+vii.)+v.)+iv.)+iii.)+i.), ix.)+viii.)+vii.)+v.)+iv.)+iii.), ix.)+viii.)+vii.)+v.)+iv.)+ii.)+i.), ix.)+viii.)+vii.)+v.)+iv.)+ii.), ix.)+viii.)+vii.)+v.)+iv.)+i.), ix.)+viii.)+vii.)+v.)+iv.), ix.)+viii.)+vii.)+v.)+iii.)+ii.)+i.), ix.)+viii.)+vii.)+v.)+iii.)+ii.), ix.)+viii.)+vii.)+v.)+iii.)+i.), ix.)+viii.)+vii.)+v.)+iii.), ix.)+viii.)+vii.)+v.)+ii.)+i.), ix.)+viii.)+vii.)+v.)+ii.), ix.)+viii.)+vii.)+v.)+i.), ix.)+viii.)+vii.)+v.), ix.)+viii.)+vii.)+iv.)+iii.)+ii.)+i.), ix.)+viii.)+vii.)+iv.)+iii.)+ii.), ix.)+viii.)+vii.)+iv.)+iii.)+i.), ix.)+ viii.)+vii.)+iv.)+iii.), ix.)+viii.)+vii.)+iv.)+i.), ix.)+viii.)+vii.)+iv.)+ii.), ix.)+viii.)+vii.)+iv.)+i.), ix.)+viii.)+vii.)+iv.), ix.)+viii.)+vii.)+iii.)+ii.)+i.), ix.)+viii.)+vii.)+iii.)+ii.), ix.)+viii.)+vii.)+iii.)+i.), ix.)+viii.)+vii.)+iii.), ix.)+viii.)+vii.)+ii.)+i.), ix.)+viii.)+vii.)+ii.), ix.)+viii.)+vii.)+i.), ix.)+viii.)+vii.), ix.)+viii.)+vi.)+v.)+iv.)+iii.)+ii.)+i.), ix.)+viii.)+vi.)+v.)+iv.)+iii.)+ii.), ix.)+viii.)+vi.)+v.)+iv.)+iii.)+i.), ix.)+viii.)+vi.)+v.)+iv.)+iii.), ix.)+viii.)+vi.)+v.)+iv.)+ii.)+i.), ix.)+viii.)+vi.)+v.)+iv.)+ii.), ix.)+viii.)+vi.)+v.)+iv.)+i.), ix.)+viii.)+vi.)+v.)+iv.), ix.)+viii.)+vi.)+v.)+iii.)+ii.)+i.), ix.)+viii.)+vi.)+v.)+iii.)+ii.), ix.)+viii.)+vi.)+v.)+iii.)+i.), ix.)+viii.)+vi.)+v.)+iii.), ix.)+viii.)+vi.)+v.)+ii.)+i.), ix.)+viii.)+vi.)+v.)+ii.), ix.)+viii.)+vi.)+v.)+i.), ix.)+viii.)+vi.)+v.), ix.)+viii.)+vi.)+iv.)+iii.)+ii.)+i.), ix.)+viii.)+vi.)+iv.)+iii.)+ii.), ix.)+viii.)+vi.)+iv.)+iii.)+i.), ix.)+viii.)+vi.)+iv.)+iii.), ix.)+viii.)+vi.)+iv.)+ii.)+i.), ix.)+viii.)+vi.)+iv.)+ii.), ix.)+viii.)+vi.)+iv.)+i.), ix.)+viii.)+vi.)+iv.), ix.)+viii.)+vi.)+iii.)+ii.)+i.), ix.)+viii.)+vi.)+iii.)+ii.), ix.)+viii.)+vi.)+iii.)+i.), ix.)+viii.)+vi.)+iii.), ix.)+viii.)+vi.)+ii.)+i.), ix.)+viii.)+vi.)+ii.), ix.)+viii.)+vi.)+i.), ix.)+viii.)+vi.), ix.)+viii.)+v.)+iv.)+iii.)+ii.)+i.), ix.)+viii.)+v.)+iv.)+iii.)+ii.), ix.)+viii.)+v.)+iv.)+iii.)+i.), ix.)+viii.)+v.)+iv.)+iii.), ix.)+viii.)+v.)+iv.)+ii.)+i.), ix.)+viii.)+v.)+iv.)+ii.), ix.)+viii.)+v.)+iv.)+i.), ix.)+viii.)+v.)+iv.), ix.)+viii.)+v.)+iii.)+ii.)+i.), ix.)+viii.)+v.)+iii.)+ii.), ix.)+viii.)+v.)+iii.)+i.), ix.)+viii.)+v.)+iii.), ix.)+viii.)+v.)+ii.)+i.), ix.)+viii.)+v.)+ii.), ix.)+viii.)+v.)+i.), ix.)+viii.)+v.), ix.)+viii.)+iv.)+iii.)+ii.)+i.), ix.)+viii.)+iv.)+iii.)+ii.), ix.)+viii.)+iv.)+iii.)+i.), ix.)+viii.)+iv.)+iii.), ix.)+viii.)+iv.)+ii.)+i.), ix.)+viii.)+iv.)+ii.), ix.)+viii.)+iv.)+i.), ix.)+viii.)+iv.), ix.)+viii.)+iii.)+ii.)+i.), ix.)+viii.)+iii.)+ii.), ix.)+viii.)+iii.)+i.), ix.)+viii.)+iii.), ix.)+viii.)+ii.)+i.), ix.)+viii.)+ii.), ix.)+viii.)+i.), ix.)+viii.), ix.)+vii.)+vi.)+v.)+iv.)+iii.)+ii.)+i.), ix.)+vii.)+vi.)+v.)+iv.)+iii.)+ii.), ix.)+vii.)+vi.)+v.)+iv.)+iii.)+i.), ix.)+vii.)+vi.)+v.)+iv.)+iii.), ix.)+vii.)+vi.)+v.)+iv.)+ii.)+i.), ix.)+vii.)+vi.)+v.)+iv.)+ii.), ix.)+vii.)+vi.)+v.)+iv.)+i.), ix.)+vii.)+vi.)+v.)+iv.), ix.)+vii.)+vi.)+v.)+iii.)+ii.)+i.), ix.)+vii.)+vi.)+v.)+iii.)+ii.), ix.)+vii.)+vi.)+v.)+iii.)+i.), ix.)+vii.)+vi.)+v.)+iii.), ix.)+vii.)+vi.)+v.)+ii.)+i.), ix.)+vii.)+vi.)+v.)+ii.), ix.)+vii.)+vi.)+v.)+i.), ix.)+vii.)+vi.)+v.), ix.)+vii.)+vi.)+iv.)+iii.)+ii.)+i.), ix.)+vii.)+vi.)+iv.)+iii.)+ii.), ix.)+vii.)+vi.)+iv.)+iii.)+i.), ix.)+vii.)+vi.)+iv.)+iii.), ix.)+vii.)+vi.)+iv.)+ii.)+i.), ix.)+vii.)+vi.)+iv.)+ii.), ix.)+vii.)+vi.)+iv.)+i.), ix.)+vii.)+vi.)+iv.), ix.)+vii.)+vi.)+iii.)+ii.)+i.), ix.)+vii.)+vi.)+iii.)+ii.), ix.)+vii.)+vi.)+iii.)+i.), ix.)+vii.)+vi.)+iii.), ix.)+vii.)+vi.)+ii.)+i.), ix.)+vii.)+vi.)+ii.), ix.)+vii.)+vi.)+i.), ix.)+vii.)+vi.), ix.)+vii.)+v.)+iv.)+iii.)+ii.)+i.), ix.)+vii.)+v.)+iv.)+iii.)+ii.), ix.)+vii.)+v.)+iv.)+iii.)+i.), ix.)+vii.)+v.)+iv.)+iii.), ix.)+vii.)+v.)+iv.)+ii.)+i.), ix.)+vii.)+v.)+iv.)+ii.), ix.)+vii.)+v.)+iv.)+i.), ix.)+vii.)+v.)+iv.), ix.)+vii.)+v.)+iii.)+ii.)+i.), ix.)+vii.)+v.)+iii.)+ii.), ix.)+vii.)+v.)+iii.)+i.), ix.)+vii.)+v.)+iii.), ix.)+vii.)+v.)+ii.)+i.), ix.)+vii.)+v.)+ii.), ix.)+vii.)+v.)+i.), ix.)+vii.)+v.), ix.)+vii.)+iv.)+iii.)+ii.)+i.), ix.)+ii.)+i.)+iii.)+ii.), ix.)+vii.) iv.)+iii.)+i.), ix.)+ii.)+iv.)+iii.), ix.)+vi i.)+iv.)+ii.)+i.), ix.)+vii.)+iv.) ix.)+vii.)+iii.)+i.), ix.)+vii.)+iii.), ix.)+vii.)+ii.)+i.), ix.)+vii.)+ii.), ix.)+vii.)+i.), ix.)+vii.), ix.)+vi.)+v.)+iv.)+iii.)+ii i.)+ii i.), ix.)+vi.)+v.)+iv.)+iii.)+ii.)+i.) ix.)+v.)+iv.)+iii.)+i.), ix.)+vi.)+v.)+iv.)+iii.), ix.)+vi.)+v.)+iv.)+ii.)+i.), ix.)+vi.)+v.)+iv.)+ii.), ix.)+vi.)+v.)+iv.)+i.), ix.)+vi.)+v.)+iv.), ix.)+vi.)+v.)+iii.)+ii.)+i.), ix.)+vi.)+v.)+iii.)+ii.), ix.)+vi.)+v.)+iii.)+i.), ix.)+vi.)+v.)+iii.), ix.)+vi.)+v.)+ii.)+i.), ix.)+vi.)+v.)+ii.), ix.)+vi.)+v.)+i.), ix.)+vi.)+v.), ix.)+vi.)+iv.)+iii.)+ii.)+i.), ix.)+vi.)+iv.)+iii.)+ii.), ix.)+vi.)+iv.)+iii.)+i.), ix.)+vi.)+iv.)+iii.), ix.)+vi.)+iv.)+ii.)+i.), ix.)+vi.)+iv.)+ii.), ix.)+vi.)+iv.)+i.), ix.)+vi.)+iv.), ix.)+vi.)+iii.)+ii.)+i.), ix.)+vi.)+iii.)+ii.), ix.)+vi.)+iii.)+i.), ix.)+vi.)+iii.), ix.)+vi.)+ii.)+i.), ix.)+vi.)+ii.), ix.)+vi.)+i.), ix.)+vi.), ix.)+v.)+iv.)+iii.)+ii.)+i.), ix.)+ v.)+iv.)+iii.)+ii.), ix.)+v.)+iv.)+iii.)+i.), ix.)+v.)+iv.)+iii.), ix.)+v.)+iv.)+ii.)+i.), ix.)+v.)+iv.)+ii.), ix.)+v.)+iv.)+i.), ix.)+v.)+iv.), ix.)+v.)+iii.)+ii.)+i.), ix.)+v.)+iii.)+ii.), ix.)+v.)+iii.)+i.), ix.)+v.)+iii.), ix.)+v.)+ii.)+i.), ix.)+v.)+ii.), ix.)+v.)+i.), ix.)+v.), ix.)+iv.)+iii.)+ii.)+i.), ix.)+iv.)+iii.)+ii.), ix.)+iv.)+iii.)+i.), ix.)+iv.)+iii.), ix.)+iv.)+ii.)+i.), ix.)+iv.)+ii.), ix.)+iv.)+i.), ix.)+iv.), ix.)+iii.)+ii.)+i.), ix.)+iii.)+ii.), ix.)+iii.)+i.), ix.)+iii.), ix.)+ii.)+i.), ix.)+ii.), ix.)+i.), ix.), viii.)+vii.)+vi.)+v.)+iv.)+iii.)+ii.)+i.), viii.)+vii.)+vi.)+v.)+iv.)+iii.)+ii.), viii.)+vii.)+vi.)+v.)+iv.)+iii.)+i.), viii.)+vii.)+vi.)+v.)+iv.)+iii.), viii.)+vii.)+vi.)+v.)+iv.)+ii.)+i.), viii.)+vii.)+vi.)+v.)+iv.)+ii.), viii.)+vii.)+vi.)+v.)+iv.)+i.), viii.)+vii.)+vi.)+v.)+iv.), viii.)+vii.)+vi.)+v.)+iii.)+ii.)+i.), viii.)+vii.)+vi.)+v.)+iii.)+ii.), viii.)+vii.)+vi.)+v.)+iii.)+i.), viii.)+vii.)+vi.)+v.)+iii.), viii.)+vii.)+vi.)+v.)+ii.)+i.), viii.)+vii.)+vi.)+v.)+ii.), viii.)+vii.)+vi.)+v.)+i.), viii.)+vii.)+vi.)+v.), viii.)+vii.)+vi.)+iv.)+iii.)+ii.)+i.), viii.)+vii.)+vi.)+iv.)+iii.)+ii.), viii.)+vii.)+vi.)+iv.)+iii.)+i.), viii.)+vii.)+vi.)+iv.)+iii.), viii.)+vii.)+vi.)+iv.)+ii.)+i.), viii.)+vii.)+vi.)+iv.)+ii.), viii.)+vii.)+vi.)+iv.)+i.), viii.)+vii.)+vi.)+iv.), viii.)+vii.)+vi.)+iii.)+ii.)+i.), viii.)+vii.)+vi.)+iii.)+ii.), viii.)+vii.)+vi.)+iii.)+i.), viii.)+vii.)+vi.)+iii.), viii.)+vii.)+vi.)+ii.)+i.), viii.)+vii.)+vi.)+ii.), viii.)+vii.)+vi.)+i.), viii.)+vii.)+vi.), viii.)+vii.)+v.)+iv.)+iii.)+ii.)+i.), viii.)+vii.)+v.)+iv.)+iii.)+ii.), viii.)+vii.)+v.)+iv.)+iii.)+i.), viii.)+vii.)+v.)+iv.)+iii.), viii.)+vii.)+v.)+iv.)+ii.)+i.), viii.)+vii.)+v.)+iv.)+ii.), viii.)+vii.)+v.)+iv.)+i.), viii.)+vii.)+v.)+iv.), viii.)+vii.)+v.)+iii.)+ii.)+i.), viii.)+vii.)+v.)+iii.)+ii.), viii.)+vii.)+v.)+iii.)+i.), viii.)+vii.)+v.)+iii.), viii.)+vii.)+v.)+ii.)+i.), viii.)+vii.)+v.)+ii.), viii.)+vii.)+v.)+i.), viii.)+vii.)+v.), viii.)+vii.)+iv.)+iii.)+ii.)+i.), viii.)+vii.)+iv.)+iii.)+ii.), viii.)+vii.)+iv.)+iii.)+i.), viii.)+vii.)+iv.)+iii.), viii.)+vii.)+iv.)+ii.)+i.), viii.)+vii.)+iv.)+ii.), viii.)+vii.)+iv.)+i.), viii.)+vii.)+iv.), viii.)+vii.)+iii.)+ii.)+i.), viii.)+vii.)+iii.)+ii.), viii.)+vii.)+iii.)+i.), viii.)+vii.)+iii.), viii.)+vii.)+ii.)+i.), viii.)+vii.)+ii.), viii.)+vii.)+i.), viii.)+vii.), viii.)+vi.)+v.)+iv.)+iii.)+ii.)+i.), viii.)+vi.)+v.)+iv.)+iii.)+ii.), viii.)+vi.)+v.)+iv.)+iii.)+i.), viii.)+vi.)+v.)+iv.)+iii.), viii.)+vi.)+v.)+iv.)+ii.)+i.), viii.)+vi.)+v.)+iv.)+ii.), viii.)+vi.)+v.)+iv.)+i.), viii.)+vi.)+v.)+iv.), viii.)+vi.)+v.)+iii.)+ii.)+i.), viii.)+vi.)+v.)+iii.)+ii.), viii.)+vi.)+v.)+iii.)+i.), viii.)+vi.)+v.)+iii.), viii.)+vi.)+v.)+ii.)+i.), viii.)+vi.)+v.)+ii.), viii.)+vi.)+v.)+i.), viii.)+vi.)+v.), viii.)+vi.)+iv.)+iii.)+ii.)+i.), viii.)+vi.)+iv.)+iii.)+ii.), viii.)+vi.)+iv.)+iii.)+i.), viii.)+vi.)+iv.)+iii.), viii.)+vi.)+iv.)+ii.)+i.), viii.)+vi.)+iv.)+ii.), viii.)+vi.)+iv.)+i.), viii.)+vi.)+iv.), viii.)+vi.)+iii.)+ii.)+i.), viii.)+vi.)+iii.)+ii.), viii.)+vi.)+iii.)+i.), viii.)+vi.)+iii.), viii.)+vi.)+ii.)+i.), viii.)+vi.)+ii.), viii.)+vi.)+i.), viii.)+vi.), viii.)+v.)+iv.)+iii.)+ii.)+i.), viii.)+v.)+iv.)+iii.)+ii.), viii.)+v.)+iv.)+iii.)+i.), viii.)+v.)+iv.)+iii.), viii.)+v.)+iv.)+ii.)+i.), viii.)+v.)+iv.)+ii.), viii.)+v.)+iv.)+i.), viii.)+v.)+iv.), viii.)+v.)+iii.)+ii.)+i.), viii.)+v.)+iii.)+ii.), viii.)+v.)+iii.)+i.), viii.)+v.)+iii.), viii.)+v.)+ii.)+i.), viii.)+v.)+ii.), viii.)+v.)+i.), viii.)+v.), viii.)+iv.)+iii.)+ii.)+i.), viii.)+iv.)+iii.)+ii.), viii.)+iv.)+iii.)+i.), viii.)+iv.)+iii.), viii.)+iv.)+ii.)+i.), viii.)+iv.)+ii.), viii.)+iv.)+i.), viii.)+iv.), viii.)+iii.)+ii.)+i.), viii.)+iii.)+ii.), viii.)+iii.)+i.), viii.)+iii.), viii.)+ii.)+i.), viii.)+ii.), viii.)+i.), viii.), vii.)+vi.)+v.)+iv.)+iii.)+ii.)+i.), vii.)+vi.)+v.)+iv.)+iii.)+ii.), vii.)+vi.)+v.)+iv.)+iii.)+i.), vii.)+vi.)+v.)+iv.)+iii.), vii.)+vi.)+v.)+iv.)+ii.)+i.), vii.)+vi.)+v.)+iv.)+ii.), vii.)+vi.)+v.)+iv.)+i.), vii.)+vi.)+v.)+iv.), vii.)+vi.)+v.)+iii.)+ii.)+i.), vii.)+vi.)+v.)+iii.)+ii.), vii.)+vi.)+v.)+iii.)+i.), vii.)+vi.)+v.)+iii.), vii.)+vi.)+v.)+ii.)+i.), vii.)+vi.)+v.)+ii.), vii.)+vi.)+v.)+i.), vii.)+vi.)+v.), vii.)+vi.)+iv.)+iii.)+ii.)+i.), vii.)+vi.)+iv.)+iii.)+ii.), vii.)+vi.)+iv.)+iii.)+i.), vii.)+vi.)+iv.)+iii.), vii.)+vi.)+iv.)+ii.)+i.), vii.)+vi.)+iv.)+ii.), vii.)+vi.)+iv.)+i.), vii.)+vi.)+iv.), vii.)+vi.)+iii.)+ii.)+i.), vii.)+vi.)+iii.)+ii.), vii.)+vi.)+iii.)+i.), vii.)+vi.)+iii.), vii.)+vi.)+ii.)+i.), vii.)+vi.)+ii.), vii.)+vi.)+i.), vii.)+vi.), vii.)+v.)+iv.)+iii.)+ii.)+i.), vii.)+v.)+iv.)+iii.)+ii.), vii.)+v.)+iv.)+iii.)+i.), vii.)+v.)+iv.)+iii.), vii.)+v.)+iv.)+ii.)+i.), vii.)+v.)+iv.)+ii.), vii.)+v.)+iv.)+i.), vii.)+v.)+iv.), vii.)+v.)+iii.)+ii.)+i.), vii.)+v.)+iii.)+ii.), vii.)+v.)+iii.)+i.), vii.)+v.)+iii.), vii.)+v.)+ii.)+i.), vii.)+v.)+ii.), vii.)+v.)+i.), vii.)+v.), vii.)+iv.)+iii.)+ii.)+i.), vii.)+iv.)+iii.)+ii.), vii.)+iv.)+iii.)+i.), vii.)+iv.)+iii.), vii.)+iv.)+ii.)+i.), vii.)+iv.)+ii.), vii.)+iv.)+i.), vii.)+, vii.)+iii.)+ii.)+i.), vii.)+iii.)+ii.), vii.)+iii.)+i.), vii.)+iii.), vii.)+ii.)+i.), vii.)+ii.), vii.)+i.), vii.)+ vi.)+ii.), vii.)+vi.)+i.), vii.)+vi.), vii.)+v.)+iv.)+iii.)+ii.)+i.), vii.)+v.)+iv.)+iii.)+ii.), vii.)+v.)+iv.)+iii.)+i.), vii.)+v.)+iv.)+iii.), vii.)+v.)+iv.)+ii.)+i.), vii.)+v.)+iv.)+ii.), vii.)+v.)+iv.)+i.), vii.)+v.)+iv.), vii.)+v.)+iii.)+ii.)+i.), vii.)+v.)+iii.)+ii.), vii.)+v.)+iii.)+i.), vii.)+v.)+iii.), vii.)+v.)+ii.)+i.), vii.)+v.)+ii.), vii.)+v.)+i.), vii.)+v.), vii.)+iv.)+iii.)+ii.)+i.), vii.)+iv.)+iii.)+ii.), vii.)+iv.)+iii.)+i.), vii.)+iv.)+iii.), vii.)+iv.)+ii.)+i.), vii.)+iv.)+ii.), vii.)+iv.)+i.), vii.)+iv.), vii.)+iii.)+ii.)+i.), vii.)+iii.)+ii.), vii.)+iii.)+i.), vii.)+iii.), vii.)+ii.)+i.), vii.)+ii.), vii.)+i.), vii.), vi.)+v.)+iv.)+iii.)+ii.)+i.), vi.)+v.)+iv.)+iii.)+ii.), vi.)+v.)+iv.)+iii.)+i.), vi.)+v.)+iv.)+iii.), vi.)+v.)+iv.)+ii.)+i.), vi.)+v.)+iv.)+ii.), vi.)+v.)+iv.)+i.), vi.)+v.) vi.)+v.)+iii.)+i.), vi.)+v.)+iii.), vi.)+v.)+ii.)+i.), vi.)+v.)+ii.), vi.)+v.)+i.), vi.)+v.), vi.)+iv.)+iii.)+ii.)+i.), vi.)+iv.)+iii.)+ii.), vi.)+iv.)+iii.)+i.), vi.)+iv.)+iii.), vi.)+iv.)+ii.)+i.), vi.)+iv.)+ii.), vi.)+iv.)+i.), vi.)+iv.), vi.)+iii.)+ii.)+i.), vi.)+iii.)+ii.), vi.)+iii.)+i.), vi.)+iii.), vi.)+ii.)+i.), vi.)+ii.), vi.)+i.), vi.), v.)+iv.)+iii.)+ii.)+i.), v.)+iv.)+iii.)+ii.), v.)+iv.)+iii.)+i.), v.)+iv.)+iii.), v.)+iv.)+ii.)+i.), v.)+iv.)+ii.), v.)+iv.)+i.), v.)+iv.), v.)+iii.)+ii.)+i.), v.)+iii.)+ii.), v.)+iii.)+i.), v.)+iii.), v.)+ii.)+i.), v.)+ii.), v.)+i.), v.), iv.)+iii.)+ii.)+i.), iv.)+iii.)+ii.), iv.)+iii.)+i.), iv.)+iii.), iv.)+ii.)+i.), iv.)+ii.), iv.)+i.), iv.), iii.)+ii.)+i.), iii.)+ii.), iii.)+i.), iii.), ii.)+i.), ii.), i.), x.)+ix.)+viii.)+vii.)+vi.)+v.)+iv.)+iii.)+ii.)+i.), x.)+ix.)+viii.)+vii.)+vi.)+v.)+iv.)+iii.)+ii.), x.)+ix.)+viii.)+vii.)+vi.)+v.)+iv.)+iii.)+i.), x.)+ix.)+viii.)+vii.)+vi.)+v.)+iv.)+iii.), x.)+ix.)+viii.)+vii.)+vi.)+v.)+iv.)+ii.)+i.), x.)+ix.)+viii.)+vii.)+vi.)+v.)+iv.)+ii.), x.)+ix.)+viii.)+vii.)+vi.)+v.)+iv.)+i.), x.)+ix.)+viii.)+vii.)+vi.)+v.)+iv.), x.)+ix.)+viii.)+vii.)+vi.)+v.)+iii.)+ii.), x.)+ix.)+viii.)+vii.)+vi.)+v.)+iii.)+i.), x.)+ix.)+viii.)+vii.)+vi.)+v.)+iii.), x.)+ix.)+viii.)+vii.)+vi.)+v.)+ii.)+i.), x.)+ix.)+viii.)+vii.)+vi.)+v.)+ii.), x.)+ix.)+viii.)+vii.)+vi.)+v.)+i.), x.)+ix.)+viii.)+vii.)+vi.)+v.)+iii.), x.)+ix.)+viii.)+vii.)+vi.)+iv.)+iii.)+ii.)+i.), x.)+ix.)+viii.)+vii.)+vi.)+iv.)+iii.)+ii.), x.)+ix.)+viii.)+vii.)+vi.)+iv.)+iii.)+i.), x.)+ix.)+viii.)+vii.)+vi.)+iv.)+iii.), x.)+ix.)+viii.)+vii.)+vi.)+iv.)+ii.)+i.), x.)+ix.)+viii.)+vii.)+vi.)+iv.)+ii.), x.)+ix.)+viii.)+vii.)+vi.)+iv.)+i.), x.)+ix.)+viii.)+vii.)+vi.)+iv.), x.)+ix.)+viii.)+vii.)+vi.)+iii.)+ii.)+i.), x.)+ix.)+viii.)+vii.)+vi.)+iii.)+ii.), x.)+ix.)+viii.)+vii.)+vi.)+iii.)+i.), x.)+ix.)+viii.)+vii.)+vi.)+iii.), x.)+ix.)+viii.)+vii.)+vi.)+ii.)+i.), x.)+ix.)+viii.)+vii.)+vi.)+ii.), x.)+ix.)+viii.)+vii.)+vi.)+i.), x.)+ix.)+viii.)+vii.)+vi.), x.)+ix.)+viii.)+vii.)+v.)+iv.)+iii.)+ii.)+i.), x.)+ix.)+viii.)+vii.)+v.)+iv.)+iii.)+ii.), x.)+ix.)+viii.)+vii.)+v.)+iv.)+iii.)+i.), x.)+ix.)+viii.)+vii.)+v.)+iv.)+iii.), x.)+ix.)+viii.)+vii.)+v.)+iv.)+ii.)+i.), x.)+ix.)+viii.)+vii.)+v.)+iv.)+ii.), x.)+ix.)+viii.)+vii.)+v.)+iv.)+i.), x.)+ix.)+viii.)+vii.)+v.)+iv.), x.)+ix.)+viii.)+vii.)+v.)+iii.)+ii.)+i.), x.)+ix.)+viii.)+vii.)+v.)+iii.)+ii.), x.)+ix.)+viii.)+vii.)+v.)+iii.)+i.), x.)+ix.)+viii.)+vii.)+v.)+iii.), x.)+ix.)+viii.)+vii.)+v.)+ii.)+i.), x.)+ix.)+viii.)+vii.)+v.)+ii.), x.)+ix.)+viii.)+vii.)+v.)+i.), x.)+ix.)+viii.)+vii.)+v.), x.)+ix.)+viii.)+vii.)+iv.)+iii.)+ii.)+i.), x.)+ix.)+viii.)+vii.)+iv.)+iii.)+ii.), x.)+ix.)+viii.)+vii.)+iv.)+iii.)+i.), x.)+ix.)+viii.)+vii.)+iv.)+iii.), x.)+ix.)+viii.)+vii.)+iv.)+ii.)+i.), x.)+ix.)+viii.)+vii.)+iv.)+ii.), x.)+ix.)+viii.)+vii.)+iv.)+i.), x.)+ix.)+viii.)+vii.)+iv.), x.)+ix.)+viii.)+vii.)+iii.)+ii.)+i.), x.)+ix.)+viii.)+vii.)+iii.)+ii.), x.)+ix.)+viii.)+vii.)+iii.)+i.), x.)+ix.)+viii.)+vii.)+iii.), x.)+ix.)+viii.)+vii.)+ii.)+i.), x.)+ix.)+viii.)+vii.)+ii.), x.)+ix.)+viii.)+vii.)+i.), x.)+ix.)+viii.)+vii.), x.)+ix.)+viii.)+vi.)+v.)+iv.)+iii.)+ii.)+i.), x.)+ix.)+viii.)+vi.)+v.)+iv.)+iii.)+ii.), x.)+ix.)+viii.)+vi.)+v.)+iv.)+iii.)+i.), x.)+ix.)+viii.)+vi.)+v.)+iv.)+iii.), x.)+ix.)+viii.)+vi.)+v.)+iv.)+ii.)+i.), x.)+ix.)+viii.)+vi.)+v.)+iv.)+ii.), x.)+ix.)+viii.)+vi.)+v.)+iv.)+i.), x.)+ix.)+viii.)+vi.)+v.)+iv.), x.)+ix.)+viii.)+vi.)+v.)+iii.)+ii.)+i.), x.)+ix.)+viii.)+vi.)+v.)+iii.)+ii.), x.)+ix.)+viii.)+vi.)+v.)+iii.)+i.), x.)+ix.)+viii.)+vi.)+v.)+iii.), x.)+ix.)+viii.)+vi.)+v.)+ii.)+i.), x.)+ix.)+viii.)+vi.)+v.)+ii.), x.)+ix.)+viii.)+vi.)+v.)+i.), x.)+ix.)+viii.)+vi.)+v.), x.)+ix.)+viii.)+vi.)+iv.)+iii.)+ii.)+i.), x.)+ix.)+viii.)+vi.)+iv.)+iii.)+ii.), x.)+ix.)+viii.)+vi.)+iv.)+iii.)+i.), x.)+ix.)+viii.)+vi.)+iv.)+iii.), x.)+ix.)+viii.)+vi.)+iv.)+ii.)+i.), x.)+ix.)+viii.)+vi.)+iv.)+ii.), x.)+ix.)+viii.)+vi.)+iv.)+i.), x.)+ix.)+viii.)+vi.)+iv.), x.)+ix.)+viii.)+vi.)+iii.)+ii.)+i.), x.)+ix.)+viii.)+vi.)+iii.)+ii.), x.)+ix.)+viii.)+vi.)+iii.)+i.), x.)+ix.)+viii.)+vi.)+iii.), x.)+ix.)+viii.)+vi.)+ii.)+i.), x.)+ix.)+viii.)+vi.)+ii.), x.)+ix.)+viii.)+vi.)+i.), x.)+ix.)+viii.)+vi.), x.)+ix.)+viii.)+v.)+iv.)+iii.)+ii.)+i.), x.)+ix.)+viii.)+v.)+iv.)+iii.)+ii.), x.)+ix.)+viii.)+v.)+iv.)+iii.)+i.), x.)+ix.)+viii.)+v.)+iv.)+iii.), x.)+ix.)+viii.)+v.)+iv.)+ii.)+i.), x.)+ix.)+viii.)+v.)+iv.)+ii.), x.)+ix.)+viii.)+v.)+iv.)+i.), x.)+ix.)+viii.)+v.)+iv.), x.)+ix.)+viii.)+v.)+iii.)+ii.)+i.), x.)+ix.)+viii.)+v.)+iii.)+ii.), x.)+ix.)+viii.)+v.)+iii.)+i.), x.)+ix.)+viii.)+v.)+iii.), x.)+ix.)+viii.)+v.)+ii.)+i.), x.)+ix.)+viii.)+v.)+ii.), x.)+ix.)+viii.)+v.)+i.), x.)+ix.)+viii.)+v.), x.)+ix.)+viii.)+iv.)+iii.)+ii.)+i.), x.)+ix.)+viii.)+iv.)+iii.)+ii.), x.)+ix.)+viii.)+iv.)+iii.)+i.), x.)+ix.)+viii.)+iv.)+iii.), x.)+ix.)+viii.)+iv.)+ii.)+i.), x.)+ix.)+viii.)+iv.)+ii.), x.)+ix.)+viii.)+iv.)+i.), x.)+ix.)+viii.)+iv.), x.)+ix.)+viii.)+iii.)+ii.)+i.), x.)+ix.)+viii.)+iii.)+ii.), x.)+ix.)+viii.)+iii.)+i.), x.)+ix.)+viii.)+iii.), x.)+ix.)+viii.)+ii.)+i.), x.)+ix.)+viii.)+ii.), x.)+ix.)+viii.)+i.), x.)+ix.)+viii.), x.)+ix.)+vii.)+vi.)+v.)+iv.)+iii.)+ii.)+i.), x.)+ix.)+vii.)+vi.)+v.)+iv.)+iii.)+ii.), x.)+ix.)+vii.)+vi.)+v.)+iv.)+iii.)+i.), x.)+ix.)+vii.)+vi.)+v.)+iv.)+iii.), x.)+ix.)+vii.)+vi.)+v.)+iv.)+ii.)+i.), xi.)+vii.)+vi.)+v.)+iv.)+i.), x.)+ix.)+vii.)+vi.)+v.)+iv.), x.)+ix.)+vii.)+vi.)+v.)+iii.)+ii.)+i.), x.)+ix.)+vii.)+vi.)+v.)+iii.)+ii.), x.)+ix.)+vii.)+vi.)+v.)+iii.)+i.), x.)+ix.)+vii.)+vi.)+v.)+iii.), x.)+ix.)+vii.)+vi.)+v.)+ii.)+i.), x.)+ix.)+vii.)+vi.)+v.)+ii.), x.)+ix.)+vii.)+vi.)+v.)+i.), x.)+ix.)+vii.)+vi.)+v.), x.)+ix.)+vii.)+vi.)+iv.)+iii.)+ii.)+i.), x.)+ix.)+vii.)+vi.)+iv.)+iii.)+ii.), x.)+ix.)+vii.)+vi.)+iv.)+iii.)+i.), x.)+ix.)+vii.)+vi.)+iv.)+iii.), x.)+ix.)+vii.)+vi.)+iv.)+ii.)+i.), x.)+ix.)+vii.)+vi.)+iv.)+ii.), x.)+ix.)+vii.)+vi.)+iv.)+i.), x.)+ix.)+vii.)+vi.)+iv.), x.)+ix.)+vii.)+vi.)+iii.)+ii.)+i.), x.)+ix.)+vii.)+vi.)+iii.)+ii.), x.)+ix.)+vii.)+vi.)+iii.)+i.), x.)+ix.)+vii.)+vi.)+iii.), x.)+ix.)+vii.)+vi.)+ii.)+i.), x.)+ix.)+vii.)+vi.)+ii.), x.)+ix.)+vii.)+vi.)+i.), x.)+ix.)+vii.)+vi.), x.)+ix.)+vii.)+v.)+iv.)+iii.)+ii.)+i.), x.)+ix.)+vii.)+v.)+iv.)+iii.)+ii.), x.)+ix.)+vii.)+v.)+iv.)+iii.)+i.), x.)+ix.)+vii.)+v.)+iv.)+iii.), x.)+ix.)+vii.)+v.)+iv.)+ii.)+i.), x.)+ix.)+vii.)+v.)+iv.)+ii.), x.)+ix.)+vii.)+v.)+iv.)+i.), x.)+ix.)+vii.)+v.)+iv.), x.)+ix.)+vii.)+v.)+iii.)+ii.)+i.), x.)+ix.)+vii.)+v.)+iii.)+ii.), x.)+ix.)+vii.)+v.)+iii.)+i.), x.)+ix.)+vii.)+v.)+iii.), x.)+ix.)+vii.)+v.)+ii.)+i.), x.)+ix.)+vii.)+v.)+ii.), x.)+ix.)+vii.)+v.)+i.), x.)+ix.)+vii.)+v.), x.)+ix.)+vii.)+iv.)+iii.)+ii.)+i.), x.)+ix.)+vii.)+iv.)+iii.)+ii.), x.)+ix.)+vii.)+iv.)+iii.)+i.), x.)+ix.)+vii.)+iv.)+iii.), x.)+ix.)+vii.)+iv.)+ii.)+i.), x.)+ix.)+vii.)+iv.)+ii.), x.)+ix.)+vii.)+iv.)+i.), x.)+ix.)+vii.)+iv.), x.)+ix.)+vii.)+iii.)+ii.)+i.), x.)+ix.)+vii.)+iii.)+ii.), x.)+ix.)+vii.)+iii.)+i.), x.)+ix.)+vii.)+iii.), x.)+ix.)+vii.)+ii.)+i.), x.)+ix.)+vii.)+ii.), x.)+ix.)+vii.)+i.), x.)+ix.)+vii.), x.)+ix.)+vi.)+v.)+iv.)+iii.)+ii.)+i.), x.)+ix.)+vi.)+v.)+iv.)+iii.)+ii.), x.)+ix.)+vi.)+v.)+iv.)+iii.)+i.), x.)+ix.)+vi.)+v.)+iv.)+iii.), x.)+ix.)+vi.)+v.)+iv.)+ii.)+i.), x.)+ix.)+vi.)+v.)+iv.)+ii.), x.)+ix.)+vi.)+v.)+iv.)+i.), x.)+ix.)+vi.)+v.)+iv.), x.)+ix.)+vi.)+v.)+iii.)+ii.)+i.), x.)+ix.)+vi.)+v.)+iii.)+ii.), x.)+ix.)+vi.)+v.)+iii.)+i.), x.)+ix.)+vi.)+v.)+iii.), x.)+ix.)+vi.)+v.)+ii.)+i.), x.)+ix.)+vi.)+v.)+ii.), x.)+ix.)+vi.)+v.)+i.), x.)+ix.)+vi.)+v.), x.)+ix.)+vi.)+iv.)+iii.)+ii.)+i.), x.)+ix.)+vi.)+iv.)+iii.)+ii.), x.)+ix.)+vi.)+iv.)+iii.)+i.), x.)+ix.)+vi.)+iv.)+iii.), x.)+ix.)+vi.)+iv.)+ii.)+i.), x.)+ix.)+vi.)+iv.)+ii.), x.)+ix.)+vi.)+iv.)+i.), x.)+ix.)+vi.)+iv.), x.)+ix.)+vi.)+iii.)+ii.)+i.), x.)+ix.)+vi.)+iii.)+ii.), x.)+ix.)+vi.)+iii.)+i.), x.)+ix.)+vi.)+iii.), x.)+ix.)+vi.)+ii.)+i.), x.)+ix.)+vi.)+ii.), x.)+ix.)+vi.)+i.), x.)+ix.)+vi.), x.)+ix.)+v.)+iv.)+iii.)+ii.)+i.), x.)+ix.)+v.)+iv.)+iii.)+ii.), x.)+ix.)+v.)+iv.)+iii.)+i.), x.)+ix.)+v.)+iv.)+iii.), x.)+ix.)+v.)+iv.)+ii.)+i.), x.)+ix.)+v.)+iv.)+ii.), x.)+ix.)+v.)+iv.)+i.), x.)+ix.)+v.)+iv.), iii.)+ii.), x.)+ix.)+ v.)+iv.)+iii.)+i.), x.)+ix.)+v.)+iv.)+iii.), x.)+ix.)+v.)+iv.)+ii.)+i.), x.)+ix.)+v.)+iv.)+ii.), x.)+ix.)+v.)+iv.)+i.), x.)+ix.)+v.)+iv.), x.)+ix.)+v.)+iii.)+ii.)+i.), x.)+ix.)+v.)+iii.)+ii.), x.)+ix.)+v.)+iii.)+i.), x.)+ix.)+v.)+iii.), x.)+ix.)+v.)+ii.)+i.), x.)+ix.)+v.)+ii.), x.)+ix.)+v.)+i.), x.)+ix.)+v.), x.)+ix.)+iv.)+ix.)+iv.)+iii.)+ii.)+i.), x.)+ix.)+iv.)+iii.)+ii.), x.)+ix.)+iv.)+iii.)+i.), x.)+ix.)+iv.)+ii.)+i.), x.)+ix.)+iv.)+ii.), x.)+ix.)+iv.)+i.), x.)+ix.)+iv.), x.)+ix.)+iii.)+ii.)+i.), x.)+ix.)+iii.)+ii.), x.)+ix.)+iii.)+i.), x.)+ix.)+iii.), x.)+ix.)+ii.)+i.), x.)+ix.)+ii.), x.)+ix.)+i.), x.)+ix.), x.)+viii.)+vii.)+vi.)+v.)+iv.)+iii.)+ii.)+i.), x.)+viii.)+vii.)+vi.)+v.)+iv.)+iii.)+ii.), x.)+viii.)+vii.)+vi.)+v.)+iv.)+iii.)+i.), x.)+viii.)+vii.)+vi.)+v.)+iv.)+iii.), x.)+viii.)+vii.)+vi.)+v.)+iv.)+ii.)+i.), x.)+viii.)+vii.)+vi.)+v.)+iv.)+ii.), x.)+viii.)+vii.)+vi.)+v.)+iv.)+i.), x.)+viii.)+vii.)+vi.)+v.)+iv.), x.)+viii.)+vii.)+vi.)+v.)+iii.)+ii.)+i.), x.)+viii.)+vii.)+vi.)+v.)+iii.)+ii.), x.)+viii.)+vii.)+vi.)+v.)+iii.)+i.), x.)+viii.)+vii.)+vi.)+v.)+iii.), x.)+viii.)+vii.)+vi.)+v.)+ii.)+i.), x.)+viii.)+vii.)+vi.)+v.)+ii.), x.)+viii.)+vii.)+vi.)+v.)+i.), x.)+viii.)+viii.)+vi.)+v.), x.)+viii.)+vii.)+vi.)+iv.)+iii.)+ii.)+i.), x.)+viii.)+vii.)+vi.)+iv.)+iii.)+ii.), x.)+viii.)+vii.)+vi.)+iv.)+iii.)+i.), x.)+viii.)+vii.)+vi.)+iv.)+iii.), x.)+viii.)+vii.)+vi.)+iv.)+ii.)+i.), x.)+viii.)+vii.)+vi.)+iv.)+ii.), x.)+viii.)+vii.)+vi.)+iv.)+i.), x.)+viii.)+vii.)+vi.)+iv.), x.)+viii.)+vii.)+vi.)+iii.)+ii.)+i.), x.)+viii.)+vii.)+vi.)+iii.)+ii.), x.)+viii.)+vii.)+vi.)+iii.)+i.), x.)+viii.)+vii.)+vi.)+iii.), x.)+viii.)+vii.)+vi.)+ii.)+i.), x.)+viii.)+vii.)+vi.)+ii.), x.)+viii.)+vii.)+vi.)+i.), x.)+viii.)+vii.)+vi.), x.)+viii.)+vii.)+v.)+iv.)+iii.)+ii.)+i.), x.)+viii.)+vii.)+v.)+iv.)+iii.)+ii.), x.)+viii.)+vii.)+v.)+iv.)+iii.)+i.), x.)+viii.)+vii.)+v.)+iv.)+iii.), x.)+viii.)+vii.)+v.)+iv.)+ii.)+i.), x.)+viii.)+vii.)+v.)+iv.)+ii.), x.)+viii.)+vii.)+v.)+iv.)+i.), x.)+viii.)+vii.)+v.)+iv.), x.)+viii.)+vii.)+v.)+iii.)+ii.)+i.), x.)+viii.)+vii.)+v.)+iii.)+ii.), x.)+viii.)+vii.)+v.)+iii.)+i.), x.)+viii.)+vii.)+v.)+iii.), x.)+viii.)+vii.)+v.)+ii.)+i.), x.)+viii.)+vii.)+v.)+ii.), x.)+viii.)+vii.)+v.)+i.), x.)+viii.)+vii.)+v.), x.)+viii.)+vii.)+iv.)+iii.)+ii.)+i.), x.)+viii.)+vii.)+iv.)+iii.)+ii.), x.)+viii.)+vii.)+iv.)+iii.)+i.), x.)+viii.)+vii.)+iv.)+iii.), x.)+viii.)+vii.)+iv.)+ii.)+i.), x.)+viii.)+vii.)+iv.)+ii.), x.)+viii.)+vii.)+iv.)+i.), x.)+viii.)+vii.)+iv.), x.)+viii.)+vii.)+iii.)+ii.)+i.), x.)+viii.)+vii.)+iii.)+ii.), x.)+viii.)+vii.)+iii.)+i.), x.)+viii.)+vii.)+iii.), x.)+viii.)+vii.)+ii.)+i.), x.)+viii.)+vii.)+ii.), x.)+viii.)+vii.)+i.), x.)+viii.)+vii.), x.)+viii.)+vi.)+v.)+iv.)+iii.)+ii.)+i.), x.)+viii.)+vi.)+v.)+iv.)+iii.)+ii.), x.)+viii.)+vi.)+v.)+iv.)+iii.)+i.), x.)+viii.)+vi.)+v.)+iv.)+iii.), x.)+viii.)+vi.)+v.)+iv.)+ii.)+i.), x.)+viii.)+vi.)+v.)+iv.)+ii.), x.)+viii.)+vi.)+v.)+iv.)+i.), x.)+viii.)+vi.)+v.)+iv.), x.)+viii.)+vi.)+v.)+iii.)+ii.)+i.), x.)+viii.)+vi.)+v.)+iii.)+ii.), x.)+viii.)+vi.)+v.)+iii.)+i.), x.)+viii.)+vi.)+v.)+iii.), x.)+viii.)+vi.)+v.)+ii.)+i.), x.)+viii.)+vi.)+v.)+ii.), x.)+viii.)+vi.)+v.)+i.), x.)+viii.)+vi.)+v.), x.)+viii.)+vi.)+iv.)+iii.)+ii.)+i.), x.)+viii.)+vi.)+iv.)+iii.)+ii.), x.)+viii.)+vi.)+iv.)+iii.)+i.), x.)+viii.)+vi.)+iv.)+iii.), x.)+viii.)+vi.)+iv.)+ii.)+i.), x.)+viii.)+vi.)+iv.)+ii.), x.)+viii.)+vi.)+iv.)+i.), x.)+viii.)+vi.)+iv.), x.)+viii.)+vi.)+iii.)+ii.)+i.), x.)+viii.)+vi.)+iii.)+ii.), x.)+viii.)+vi.)+iii.)+i.), x.)+viii.)+vi.)+iii.), x.)+viii.)+vi.)+ii.)+i.), x.)+viii.)+vi.)+ii.), x.)+viii.)+vi.)+i.), x.)+viii.)+vi.), x.)+viii.)+v.)+iv.)+iii.)+ii.)+i.), x.)+viii.)+v.)+iv.)+iii.)+ii.), x.)+viii.)+v.)+iv.)+iii.)+i.), x.)+viii.)+v.)+iv.)+iii.), x.)+viii.)+v.)+iv.)+ii.)+i.), x.)+viii.)+v.)+iv.)+ii.), x.)+viii.)+v.)+iv.)+i.), x.)+viii.)+v.)+iv.), x.)+viii.)+v.)+iii.)+ii.)+i.), x.)+viii.)+v.)+iii.)+ii.), x.)+viii.)+v.)+iii.)+i.), x.)+viii.)+v.)+iii.), x.)+viii.)+v.)+ii.)+i.), x.)+viii.)+v.)+ii.), x.)+viii.)+v.)+i.), x.)+viii.)+v.), x.)+viii.)+iv.)+iii.)+ii.)+i.), x.)+viii.)+iv.)+iii.)+ii.), x.)+viii.)+iv.)+iii.)+i.), x.)+viii.)+iv.)+iii.), x.)+viii.)+iv.)+ii.)+i.), x.)+viii.)+iv.)+ii.), x.)+viii.)+iv.)+i.), x.)+viii.)+iv.), x.)+viii.)+iii.)+ii.)+i.), x.)+viii.)+iii.)+ii.), x.)+viii.)+iii.)+i.), x.)+viii.)+iii.), x.)+viii.)+ii.)+i.), x.)+viii.)+ii.), x.)+viii.)+i.), x.)+viii.), x.)+vii.)+vi.)+v.)+iv.)+iii.)+ii.)+i.), x.)+vii.)+vi.)+v.)+iv.)+iii.)+ii.), x.)+vii.)+vi.)+v.)+iv.)+iii.)+i.), x.)+vii.)+vi.)+v.)+iv.)+iii.), x.)+vii.)+vi.)+v.)+iv.)+ii.)+i.), x.)+vii.)+vi.)+v.)+iv.)+ii.), x.)+vii.)+vi.)+v.)+iv.)+i.), x.)+vii.)+vi.)+v.)+iv.), x.)+vii.)+vi.)+v.)+iii.)+ii.)+i.), x.)+vii.)+vi.)+v.)+iii.)+ii.), x.)+vii.)+vi.)+v.)+iii.)+i.), x.)+vii.)+vi.)+v.)+iii.), x.)+vii.)+vi.)+v.)+ii.)+i.), x.)+vii.)+vi.)+v.)+ii.), x.)+vii.)+vi.)+v.)+i.), x.)+vii.)+vi.)+v.), x.)+vii.)+vi.)+iv.)+iii.)+ii.)+i.), x.)+vii.)+vi.)+iv.)+iii.)+ii.), x.)+vii.)+vi.)+iv.)+iii.)+i.), x.)+vii.)+vi.)+iv.)+iii.), x.)+vii.)+vi.)+iv.)+ii.)+i.), x.)+vii.)+vi.)+iv.)+ii.), x.)+vii.)+vi.)+iv.)+i.), x.)+vii.)+vi.)+iv.), x.)+vii.)+vi.)+iii.)+ii.)+i.), x.)+vii.)+vi.)+iii.)+ii.), x.)+vii.)+vi.)+iii.)+i.), x.)+vii.)+vi.)+iii.), x.)+vii.)+vi.)+ii.)+i.), x.)+vii.)+vi.)+ii.), x.)+vii.)+vi.)+i.), x.)+vii.)+vi.), x.)+vii.)+v.)+iv.)+iii.)+ii.)+i.), x.)+vii.)+v.)+iv.)+iii.)+ii.), x.)+vii.)+v.)+iv.)+iii.)+i.), x.)+vii.)+v.)+iv.)+iii.), x.)+vii.)+v.)+iv.)+ii.)+i.), x.)+vii.)+v.)+iv.)+ii.), x.)+vii.)+v.)+iv.)+i.), x.)+vii.)+v.)+iv.), x.)+vii.)+v.)+iii.)+ii.)+i.), x.)+vii.)+v.)+iii.)+ii.), x.)+vii.)+v.)+iii.)+i.), x.)+vii.)+v.)+iii.), x.)+vii.)+v.)+ii.)+i.), x.)+vii.)+v.)+ii.), x.)+vii.)+v.)+i.), x.)+vii.)+v.), x.)+vii.)+iv.)+iii.)+ii.)+i.), x.)+vii.)+iv.)+iii.)+ii.), x.)+vii.)+iv.)+iii.)+i.), x.)+vii.)+iv.)+iii.), x.)+vii.)+iv.)+ii.)+i.), x.)+vii.)+iv.)+ii.), x.)+vii.)+iv.)+i.), x.)+vii.)+iv.), x.)+vii.)+iii.)+ii.)+i.), x.)+vii.)+iii.)+ii.), x.)+vii.)+iii.)+i.), x.)+vii.)+iii.), x.)+vii.)+ii.)+i.), x.)+vii.)+ii.), x.)+vii.)+i.), x.)+vii.), x.)+vi.)+v.)+iv.)+iii.)+ii.)+i.), x.)+vi.)+v.)+iv.)+iii.)+ii.), x.)+vi.)+v.)+iv.)+iii.)+i.), x.)+vi.)+v.)+iv.)+iii.), x.)+vi.)+v.)+iv.)+ii.)+i.), x.)+vi.)+v.)+iv.)+ii.), x.)+vi.)+v.)+iv.)+i.), x.)+vi.)+v.)+iv.), x.)+vi.)+v.)+iii.)+ii.)+i.), x.)+vi.)+v.)+iii.)+ii.), x.)+vi.)+v.)+iii.)+i.), x.)+vi.)+v.)+iii.), x.)+vi.)+v.)+ii.)+i.), x.)+vi.)+v.)+ii.), x.)+vi.)+v.)+i.), x.)+vi.)+v.), x.)+vi.)+iv.)+iii.)+ii.)+i.), x.)+vi.)+iv.)+iii.)+ii.), x.)+vi.)+iv.)+iii.)+i.), x.)+vi.)+iv.)+iii.), x.)+vi.)+iv.)+ii.)+i.), x.)+vi.)+iv.)+ii.), x.)+vi.)+iv.)+i.), x.)+vi.)+iv.), x.)+vi.)+iii.)+ii.)+i.), x.)+vi.)+iii.)+ii.), x.)+vi.)+iii.)+i.), x.)+vi.)+iii.), x.)+vi.)+ii.)+i.), x.)+vi.)+ii.), x.)+vi.)+i.), x.)+vi.), x.)+v.)+iv.)+iii.)+ii.)+i.), x.)+v.)+iv.)+iii.)+ii.), x.)+v.)+iv.)+iii.)+i.), x.)+v.)+iv.)+iii.), x.)+v.)+iv.)+ii.)+i.), x.)+v.)+iv.)+ii.), x.)+v.)+iv.)+i.), x.)+v.)+iv.), x.)+v.)+iii.)+ii.)+i.), x.)+v.)+iii.)+ii.), x.)+v.)+iii.)+i.), x.)+v.)+iii.), x.)+v.)+ii.)+i.), x.)+v.)+ii.), x.)+v.)+i.), x.)+v.), x.)+iv.)+iii.)+ii.)+i.), x.)+iv.)+iii.)+ii.), x.)+iv.)+iii.)+i.), x.)+iv.)+iii.), x.)+iv.)+ii.)+i.), x.)+iv.)+ii.), x.)+iv.)+i.), x.)+iv.), x.)+iii.)+ii.)+i.), x.)+iii.)+ii.), x.)+iii.)+i.), x.)+iii.), x.)+ii.)+i.), x.)+ii.), x.)+i.), x.), xi.)+ix.)+viii.)+vii.)+vi.)+v.)+iv.)+iii.)+ii.)+i.), xi.)+ix.)+viii.)+vii.)+vi.)+v.)+iv.)+iii.)+ii.), xi.)+ix.)+viii.)+vii.)+vi.)+v.)+iv.)+iii.)+i.), xi.)+ix.)+viii.)+vii.)+vi.)+v.)+iv.)+iii.), xi.)+ix.)+viii.)+vii.)+vi.)+v.)+iv.)+ii.)+i.), xi.)+ix.)+viii.)+vii.)+vi.)+v.)+iv.)+ii.), xi.)+ix.)+viii.)+vii.)+vi.)+v.)+iv.)+i.), xi.)+ix.)+viii.)+vii.)+vi.)+v.)+iv.), xi.)+ix.)+viii.)+vii.)+vi.)+v.)+iii.)+ii.)+i.), xi.)+ix.)+viii.)+vii.)+vi.)+v.)+iii.)+ii.), xi.)+ix.)+viii.)+vii.)+vi.)+v.)+iii.)+i.), xi.)+ix.)+viii.)+vii.)+vi.)+v.)+iii.), xi.)+ix.)+viii.)+vii.)+vi.)+v.)+ii.)+i.), xi.)+ix.)+viii.)+vii.)+vi.)+v.)+ii.), xi.)+ix.)+viii.)+vii.)+vi.)+v.)+i.), xi.)+ix.)+viii.)+vii.)+vi.)+v.), xi.)+ix.)+viii.)+vii.)+vi.)+iv.)+iii.)+ii.)+i.), xi.)+ix.)+viii.)+vii.)+vi.)+iv.)+iii.)+ii.), xi.)+ix.)+viii.)+vii.)+vi.)+iv.)+iii.)+i.), xi.)+ix.)+viii.)+vii.)+vi.)+iv.)+iii.), xi.)+ix.)+viii.)+vii.)+vi.)+iv.)+ii.)+i.), xi.)+ix.)+viii.)+vii.)+vi.)+iv.)+ii.), xi.)+ix.)+viii.)+vii.)+vi.)+iv.)+i.), xi.)+ix.)+viii.)+vii.)+vi.)+iv.), xi.)+ix.)+viii.)+vii.)+vi.)+iii.)+ii.)+i.), xi.)+ix.)+viii.)+vi i.)+iii.)+ii.), xi.)+ix.)+viii.)+vii.)+vi.)+iii.)+i.), xi.)+ix.)+viii.)+vii.)+vi.)+iii.), xi.)+ix.)+viii.)+vii.)+vi.)+ii.)+i.), xi.)+ix.)+viii.)+vii.)+vi.)+ii.), xi.)+ix.)+viii.)+vii.)+vi.)+i.), xi.)+ix.)+viii.)+vii.)+vi.), xi.)+ix.)+viii.)+vii.)+v.)+iv.)+iii.)+ii.)+i.), xi.)+ix.)+viii.)+vii.)+v.)+iv.)+iii.)+ii.), xi.)+ix.)+viii.)+vii.)+v.)+iv.)+iii.)+i.), xi.)+ix.)+viii.)+vii.)+v.)+iv.)+iii.), xi.)+ix.)+viii.)+vii.)+v.)+iv.)+ii.)+i.), xi.)+ix.)+viii.)+vii.)+v.)+iv.)+ii.), xi.)+ix.)+viii.)+vii.)+v.)+iv.)+i.), xi.)+ix.)+viii.)+vii.)+v.)+iv.), xi.)+ix.)+viii.)+vii.)+v.)+iii.)+ ii.), xi.)+ix.)+viii.)+vii.)+v.)+iii.)+i.), xi.)+ix.)+viii.)+vii.)+
v.)+iii.), xi.)+ix.)+viii.)+vii.)+v.)+ii.)+i.), xi.)+ix.)+viii.)+
vii.)+v.)+ii.), xi.)+ix.)+viii.)+vii.)+v.)+i.), xi.)+ix.)+viii.)+
vii.)+v.), xi.)+ix.)+viii.)+vii.)+iii.)+ii.)+i.), xi.)+ix.)+
viii.)+vii.)+iv.)+iii.)+ii.), xi.)+ix.)+viii.)+vii.)+iv.)+iii.)+i.),
xi.)+ix.)+viii.)+vii.)+iv.)+iii.), xi.)+ix.)+viii.)+vii.)+iv.)+
ii.)+i.), xi.)+ix.)+viii.)+vii.)+iv.)+ii.), xi.)+ix.)+viii.)+vii.)+
iv.)+i.), xi.)+ix.)+viii.)+vii.)+iv.), xi.)+ix.)+viii.)+vii.)+iii.)+
ii.)+i.), xi.)+ix.)+viii.)+vii.)+iii.)+ii.), xi.)+ix.)+viii.)+vii.)+
iii.)+i.), xi.)+ix.)+viii.)+vii.)+iii.), xi.)+ix.)+viii.)+vii.)+ii.)+
i.), xi.)+ix.)+viii.)+vii.)+ii.), xi.)+ix.)+viii.)+vii.)+i.), xi.)+
ix.)+viii.)+vii.), xi.)+ix.)+viii.)+vi.)+v.)+iv.)+iii.)+ii.)+i.),
xi.)+ix.)+viii.)+vi.)+v.)+iv.)+iii.)+ii.), xi.)+ix.)+viii.)+vi.)+
v.)+iv.)+iii.)+i.), xi.)+ix.)+viii.)+vi.)+v.)+iv.)+iii.), xi.)+ix.)+
viii.)+vi.)+v.)+iv.)+ii.)+i.), xi.)+ix.)+viii.)+vi.)+v.)+iv.)+ii.),
xi.)+ix.)+viii.)+vi.)+v.)+iv.)+i.), xi.)+ix.)+viii.)+vi.)+v.)+
iv.), xi.)+ix.)+viii.)+vi.)+v.)+iii.)+ii.)+i.), xi.)+ix.)+viii.)+
vi.)+v.)+iii.)+ii.), xi.)+ix.)+viii.)+vi.)+v.)+iii.)+i.), xi.)+ix.)+
viii.)+vi.)+v.)+iii.), xi.)+ix.)+viii.)+vi.)+v.)+ii.)+i.), xi.)+
ix.)+viii.)+vi.)+v.)+ii.), xi.)+ix.)+viii.)+vi.)+v.)+i.), xi.)+
ix.)+viii.)+vi.)+v.), xi.)+ix.)+viii.)+vi.)+iv.)+iii.)+ii.)+i.),
xi.)+ix.)+viii.)+vi.)+iv.)+iii.)+ii.), xi.)+ix.)+viii.)+vi.)+iv.)+
iii.)+i.), xi.)+ix.)+viii.)+vi.)+iv.)+iii.), xi.)+ix.)+viii.)+vi.)+
iv.)+ii.)+i.), xi.)+ix.)+viii.)+vi.)+iv.)+ii.), xi.)+ix.)+viii.)+
vi.)+iv.)+i.), xi.)+ix.)+viii.)+vi.)+iv.), xi.)+ix.)+viii.)+vi.)+
iii.)+ii.)+i.), xi.)+ix.)+viii.)+vi.)+iii.)+ii.), xi.)+ix.)+viii.)+
vi.)+iii.)+i.), xi.)+ix.)+viii.)+vi.)+iii.), xi.)+ix.)+viii.)+vi.)+
ii.)+i.), xi.)+ix.)+viii.)+vi.)+ii.), xi.)+ix.)+viii.)+vi.)+i.),
xi.)+ix.)+viii.)+vi.), xi.)+ix.)+viii.)+v.)+iv.)+iii.)+ii.)+i.),
xi.)+ix.)+viii.)+v.)+iv.)+iii.)+ii.), xi.)+ix.)+viii.)+v.)+iv.)+
iii.)+i.), xi.)+ix.)+viii.)+v.)+iv.)+iii.), xi.)+ix.)+viii.)+v.)+
iv.)+ii.)+i.), xi.)+ix.)+viii.)+v.)+iv.)+ii.), xi.)+ix.)+viii.)+v.)+
iv.)+i.), xi.)+ix.)+viii.)+v.)+iv.), xi.)+ix.)+viii.)+v.)+iii.)+
ii.)+i.), xi.)+ix.)+viii.)+v.)+iii.)+ii.), xi.)+ix.)+viii.)+v.)+
iii.)+i.), xi.)+ix.)+viii.)+v.)+iii.), xi.)+ix.)+viii.)+v.)+ii.)+i.),
xi.)+ix.)+viii.)+v.)+ii.), xi.)+ix.)+viii.)+v.)+i.), xi.)+ix.)+
viii.)+v.), xi.)+ix.)+viii.)+iv.)+iii.)+ii.)+i.), xi.)+ix.)+viii.)+
iv.)+iii.)+ii.), xi.)+ix.)+viii.)+iv.)+iii.)+i.), xi.)+ix.)+viii.)+
iv.)+iii.), xi.)+ix.)+viii.)+iv.)+ii.)+i.), xi.)+ix.)+viii.)+iv.)+
ii.), xi.)+ix.)+viii.)+iv.)+i.), xi.)+ix.)+viii.)+iv.), xi.)+ix.)+
viii.)+iii.)+ii.)+i.), xi.)+ix.)+viii.)+iii.)+ii.), xi.)+ix.)+viii.)+
iii.)+i.), xi.)+ix.)+viii.)+iii.), xi.)+ix.)+viii.)+ii.)+i.), xi.)+
ix.)+viii.)+ii.), xi.)+ix.)+viii.)+i.), xi.)+ix.)+viii.), xi.)+ix.)+
vii.)+vi.)+v.)+iv.)+iii.)+ii.)+i.), xi.)+ix.)+vii.)+vi.)+v.)+iv.)+
iii.)+ii.), xi.)+ix.)+vii.)+vi.)+v.)+iv.)+iii.)+i.), xi.)+ix.)+
vii.)+vi.)+v.)+iv.)+iii.), xi.)+ix.)+vii.)+vi.)+v.)+iv.)+ii.)+i.),
xi.)+ix.)+vii.)+vi.)+v.)+iv.)+ii.), xi.)+ix.)+vii.)+vi.)+v.)+
iv.)+i.), xi.)+ix.)+vii.)+vi.)+v.)+iv.), xi.)+ix.)+vii.)+vi.)+v.)+
iii.)+ii.)+i.), xi.)+ix.)+vii.)+vi.)+v.)+iii.)+ii.), xi.)+ix.)+
vii.)+vi.)+v.)+iii.)+i.), xi.)+ix.)+vii.)+vi.)+v.)+iii.), xi.)+
ix.)+vii.)+vi.)+v.)+ii.)+i.), xi.)+ix.)+vii.)+vi.)+v.)+ii.), xi.)+
ix.)+vii.)+vi.)+v.)+i.), xi.)+ix.)+vii.)+vi.)+v.), xi.)+ix.)+
vii.)+vi.)+iv.)+iii.)+ii.)+i.), xi.)+ix.)+vii.)+vi.)+iv.)+iii.)+
ii.), xi.)+ix.)+vii.)+vi.)+iv.)+iii.)+i.), xi.)+ix.)+vii.)+vi.)+
iv.)+iii.), xi.)+ix.)+vii.)+vi.)+iv.)+ii.)+i.), xi.)+ix.)+vii.)+
vi.)+iv.)+ii.), xi.)+ix.)+vii.)+vi.)+iv.)+i.), xi.)+ix.)+vii.)+
vi.)+iv.), xi.)+ix.)+vii.)+vi.)+iii.)+ii.)+i.), xi.)+ix.)+vii.)+
vi.)+iii.)+ii.), xi.)+ix.)+vii.)+vi.)+iii.)+i.), xi.)+ix.)+vii.)+
vi.)+iii.), xi.)+ix.)+vii.)+vi.)+ii.)+i.), xi.)+ix.)+vii.)+vi.)+ii.),
xi.)+ix.)+vii.)+vi.)+i.), xi.)+ix.)+vii.)+vi.), xi.)+ix.)+vii.)+
v.)+iv.)+iii.)+ii.)+i.), xi.)+ix.)+vii.)+v.)+iv.)+iii.)+ii.), xi.)+
ix.)+vii.)+v.)+iv.)+iii.)+i.), xi.)+ix.)+vii.)+v.)+iv.)+iii.), xi.)+
ix.)+vii.)+v.)+iv.)+ii.)+i.), xi.)+ix.)+vii.)+v.)+iv.)+ii.), xi.)+
ix.)+vii.)+v.)+iv.)+i.), xi.)+ix.)+vii.)+v.)+iv.), xi.)+ix.)+vii.)+
v.)+iii.)+ii.)+i.), xi.)+ix.)+vii.)+v.)+iii.)+ii.), xi.)+ix.)+vii.)+
v.)+iii.)+i.), xi.)+ix.)+vii.)+v.)+iii.), xi.)+ix.)+vii.)+v.)+ii.)+i.), xi.)+ix.)+vii.)+v.), xi.)+ix.)+vii.)+iv.)+iii.)+ii.)+i.), xi.)+
ix.)+vii.)+iv.)+iii.)+ii.), xi.)+ix.)+vii.)+iv.)+iii.)+i.), xi.)+
ix.)+vii.)+iv.)+iii.), xi.)+ix.)+vii.)+iv.)+ii.)+i.), xi.)+ix.)+
vii.)+iv.)+ii.), xi.)+ix.)+vii.)+iv.)+i.), xi.)+ix.)+vii.)+iv.),
xi.)+ix.)+vii.)+iii.)+ii.)+i.), xi.)+ix.)+vii.)+iii.)+ii.), xi.)+
ix.)+vii.)+iii.)+i.), xi.)+ix.)+vii.)+iii.), xi.)+ix.)+vii.)+ii.)+
i.), xi.)+ix.)+vii.)+ii.), xi.)+ix.)+vii.)+i.), xi.)+ix.)+vii.),
xi.)+ix.)+vi.)+v.)+iv.)+iii.)+ii.)+i.), xi.)+ix.)+vi.)+v.)+iv.)+
iii.)+ii.), xi.)+ix.)+vi.)+v.)+iv.)+iii.)+i.), xi.)+ix.)+vi.)+v.)+
iv.)+iii.), xi.)+ix.)+vi.)+v.)+iv.)+ii.)+i.), xi.)+ix.)+vi.)+v.)+
iv.)+ii.), xi.)+ix.)+vi.)+v.)+iv.)+i.), xi.)+ix.)+vi.)+v.)+iv.),
xi.)+ix.)+vi.)+v.)+iii.)+ii.)+i.), xi.)+ix.)+vi.)+v.)+iii.)+ii.),
xi.)+ix.)+vi.)+v.)+iii.)+i.), xi.)+ix.)+vi.)+v.)+iii.), xi.)+ix.)+
vi.)+v.)+ii.)+i.), xi.)+ix.)+vi.)+v.)+ii.), xi.)+ix.)+vi.)+v.)+i.),
xi.)+ix.)+vi.)+v.), xi.)+ix.)+vi.)+iv.)+iii.)+ii.)+i.), xi.)+ix.)+
vi.)+iv.)+iii.)+ii.), xi.)+ix.)+vi.)+iv.)+iii.)+i.), xi.)+ix.)+vi.)+
iv.)+iii.), xi.)+ix.)+vi.)+iv.)+ii.)+i.), xi.)+ix.)+vi.)+iv.)+ii.),
xi.)+ix.)+vi.)+iv.)+i.), xi.)+ix.)+vi.)+iv.), xi.)+ix.)+vi.)+
iii.)+ii.)+i.), xi.)+ix.)+vi.)+iii.)+ii.), xi.)+ix.)+vi.)+iii.)+i.),
xi.)+ix.)+vi.)+iii.), xi.)+ix.)+vi.)+ii.)+i.), xi.)+ix.)+vi.)+ii.),
xi.)+ix.)+vi.)+i.), xi.)+ix.)+vi.), xi.)+ix.)+v.)+iv.)+iii.)+ii.)+
i.), xi.)+ix.)+v.)+iv.)+iii.)+ii.), xi.)+ix.)+v.)+iv.)+iii.)+i.),
xi.)+ix.)+v.)+iv.)+iii.), xi.)+ix.)+v.)+iv.)+ii.)+i.), xi.)+ix.)+
v.)+iv.)+ii.), xi.)+ix.)+v.)+iv.)+i.), xi.)+ix.)+v.)+iv.), xi.)+
ix.)+v.)+iii.)+ii.)+i.), xi.)+ix.)+v.)+iii.)+ii.), xi.)+ix.)+v.)+
iii.)+i.), xi.)+ix.)+v.)+iii.), xi.)+ix.)+v.)+ii.)+i.), xi.)+ix.)+
v.)+ii.), xi.)+ix.)+v.)+i.), xi.)+ix.)+v.), xi.)+ix.)+iv.)+iii.)+
ii.)+i.), xi.)+ix.)+iv.)+iii.)+ii.), xi.)+ix.)+iv.)+iii.)+i.), xi.)+
ix.)+iv.)+iii.), xi.)+ix.)+iv.)+ii.)+i.), xi.)+ix.)+iv.)+ii.), xi.)+
ix.)+iv.)+i.), xi.)+ix.)+iv.), xi.)+ix.)+iii.)+ii.), x.)+i.),
xi.)+ix.)+iii.)+ii.), xi.)+ix.)+iii.)+i.)., xi.)+viii.)+vi i.)+v i.)+
v.).)+i.)+ii.)+i.), xi.)+viii.)+vii.)+vi.)+ix.)+i.)+iii.)+ix.) xi.)+
viii.)+vii.)+vi.)+v.)+ii.)+i.), xi.)+viii.)+vii.)+vi.)+v.)+
iv.)+iii.)+ii.), xi.)+vi.)+vii.)+vi.)+v.)+iv.)+ii.)+i.), xi.)+
viii.)+vii.)+vi.)+v.)+iv.)+ii.), xi.) viii.)+vii.)+vi.)+iv.)+i.),
xi.)+vii.)+vi.)+vi.)+v.)+iv., xi.)+vii.)+vi.)+v.)+viii.)+iii.)+
vi.)+i.), xi.)+viii.)+vii.)+vi.)+viii.)+ii.)+v.)+iv., xi.)+
i.)+vii.)+viii.)+iii.)+ii.)+i.), xi.)+viii.)+vii.)+vi.)+v.)+iii.)+
ii.), xi.)+viii.)+vii.)+vi.)+v.)+ii.)+vi.), xi.)+vii.)+vi.)+vi.)+
v.)+iii.), xi.)+viii.)+vii.)+vi.)+v.)+ii.), xi.)+ix.)+ xi.)+viii.)+
vii.)+vi.)+v.)+ii.), xi.)+vii.)+i.)+vii.)+vi.)+vii.)+i.), xi.)+
iii.)+ii.)+vi.)+v.), xi.)+vii.)+vii.)+vi.)+iv.)+iii.)+ii.)+i.), xi.)+
viii.)+vii.)+vi.)+iv.)+iii.), xi.)+viii.)+vii.)+vi.)+iv.),
xi.)+viii.)+vii.)+vi.)+iv.)+iii.), xi.)+viii.)+vii.)+vi.)+i v.)+ii.)
ii.)+i.)+iv.), xi.)+viii.)+vii.)+vi.)+iv.)+ii.), xi.)+viii.)+vii.)+
vi.)+iv.)+i.), xi.)+vii.)+xi.)+viii.)+vii.)+iii.)+i.), xi.)+
viii.)+vii.)+vi.)+iii.), xi.)+viii.)+vii.)+vi.)+ii.)+i.), xi.)+
viii.)+vii.)+vi.)+ii.), xi.)+viii.)+vii.)+vi.)+i.), xi.)+viii.)+
vii.)+vi.), xi.)+viii.)+vii.)+v.)+iv.)+iii.)+ii.)+i.), xi.)+viii.)+
vii.)+v.)+iv.)+iii.)+ii.), xi.)+viii.)+vii.)+v.)+iv.)+iii.)+i.),
xi.)+viii.)+vii.)+v.)+iv.)+iii.), xi.)+viii.)+vii.)+v.)+iv.)+ii.)+
i.), xi.)+viii.)+vii.)+v.)+iv.)+ii.), xi.)+viii.)+vii.)+v.)+iv.)+i.),
xi.)+viii.)+vii.)+v.)+iv.), xi.)+viii.)+vii.)+v.)+iii.)+ii.)+i.),
xi.)+viii.)+vii.)+v.)+iii.)+ii.), xi.)+viii.)+vii.)+v.)+iii.)+i.),
xi.)+viii.)+vii.)+v.)+iii.), xi.)+viii.)+vii.)+v.)+ii.)+i.), xi.)+
viii.)+vii.)+v.)+ii.), xi.)+viii.)+vii.)+v.)+i.), xi.)+viii.)+vii.)+
v.), xi.)+viii.)+vii.)+iv.)+iii.)+ii.)+i.), xi.)+viii.)+vii.)+iv.)+
iii.)+ii.), xi.)+viii.)+vii.)+iv.)+iii.)+i.), xi.)+viii.)+vii.)+iv.)+
iii.), xi.)+viii.)+vii.)+iv.)+ii.)+i.), xi.)+viii.)+vii.)+iv.)+ii.),
xi.)+viii.)+vii.)+iv.)+i.), xi.)+viii.)+vii.)+iv.), xi.)+viii.)+
vii.)+iii.)+ii.)+i.), xi.)+viii.)+vii.)+iii.)+ii.), xi.)+viii.)+vii.)+
iii.)+i.), xi.)+viii.)+vii.)+iii.), xi.)+viii.)+vii.)+ii.)+i.), xi.)+
viii.)+vii.)+ii.), xi.)+viii.)+vii.)+i.), xi.)+viii.)+vii.), xi.)+
viii.)+vi.)+v.)+iv.)+iii.)+ii.)+i.), xi.)+viii.)+vi.)+v.)+iv.)+
iii.)+ii.), xi.)+viii.)+vi.)+v.)+iv.)+iii.)+i.), xi.)+viii.)+
vi.)+v.)+iv.)+iii.), xi.)+viii.)+vi.)+v.)+iv.)+ii.)+i.), xi.)+viii.)+ vi.)+v.)+iv.), xi.)+viii.)+vi.)+v.)+iii.)+ii.)+i.), xi.)+viii.)+
vi.)+v.)+iii.)+ii.), xi.)+viii.)+vi.)+v.)+iii.)+i.), xi.)+viii.)+
vi.)+v.)+iii.), xi.)+viii.)+vi.)+v.)+ii.)+i.), xi.)+viii.)+vi.)+
v.)+ii.), xi.)+viii.)+vi.)+v.)+i.), xi.)+viii.)+vi.)+v.), xi.)+
viii.)+vi.)+iv.)+iii.)+ii.)+i.), xi.)+viii.)+vi.)+iv.)+iii.)+ii.),
xi.)+viii.)+vi.)+iv.)+iii.)+i.), xi.)+viii.)+vi.)+iv.)+iii.), xi.)+
viii.)+vi.)+iv.)+ii.)+i.), xi.)+viii.)+vi.)+iv.)+ii.), xi.)+viii.)+
vi.)+iv.)+i.), xi.)+viii.)+vi.)+iv.), xi.)+viii.)+vi.)+iii.)+ii.)+
i.), xi.)+viii.)+vi.)+iii.)+ii.), xi.)+viii.)+vi.)+iii.)+i.), xi.)+
viii.)+vi.)+iii.), xi.)+viii.)+vi.)+ii.)+i.), xi.)+viii.)+vi.)+ii.),
xi.)+viii.)+vi.)+i.), xi.)+viii.)+vi.), xi.)+viii.)+v.)+iv.)+iii.)+
ii.)+i.), xi.)+viii.)+v.)+iv.)+iii.)+ii.), xi.)+viii.)+v.)+iv.)+
iii.)+i.), xi.)+viii.)+v.)+iv.)+iii.), xi.)+viii.)+v.)+iv.)+ii.)+i.),
xi.)+viii.)+v.)+iv.)+ii.), xi.)+viii.)+v.)+iv.)+i.), xi.)+viii.)+
v.)+iv.), xi.)+viii.)+v.)+iii.)+ii.)+i.), xi.)+viii.)+v.)+iii.)+ii.),
xi.)+viii.)+v.)+iii.)+i.), xi.)+viii.)+v.)+iii.), xi.)+viii.)+v.)+
ii.)+i.), xi.)+viii.)+v.)+ii.), xi.)+viii.)+v.)+i.), xi.)+viii.)+v.),
xi.)+viii.)+iv.)+iii.)+ii.)+i.), xi.)+viii.)+iv.)+iii.)+ii.), xi.)+
viii.)+iv.)+iii.)+i.), xi.)+viii.)+iv.)+iii.), xi.)+viii.)+iv.)+ii.)+
i.), xi.)+viii.)+iv.)+ii.), xi.)+viii.)+iv.)+i.), xi.)+viii.)+iv.),
xi.)+viii.)+iii.)+ii.)+i.), xi.)+viii.)+iii.)+ii.), xi.)+viii.)+iii.)+
i.), xi.)+viii.)+iii.), xi.)+viii.)+ii.)+i.), xi.)+viii.)+ii.), xi.)+
viii.)+i.), xi.)+viii.), xi.)+vii.)+vi.)+v.)+iv.)+iii.)+ii.)+i.),
xi.)+vii.)+vi.)+v.)+iv.)+iii.)+ii.), xi.)+vii.)+vi.)+v.)+iv.)+
iii.)+i.), xi.)+vii.)+vi.)+v.)+iv.)+iii.), xi.)+vii.)+vi.)+v.)+iv.)+
ii.)+i.), xi.)+vii.)+vi.)+v.)+iv.)+ii.), xi.)+vii.)+vi.)+v.)+iv.)+
i.), xi.)+vii.)+vi.)+v.)+iv.), xi.)+vii.)+vi.)+v.)+iii.)+ii.)+i.),
xi.)+vii.)+vi.)+v.)+iii.)+ii.), xi.)+vii.)+vi.)+v.)+iii.)+i.), xi.)+
vii.)+vi.)+v.)+iii.), xi.)+vii.)+vi.)+v.)+ii.)+i.), xi.)+vii.)+
vi.)+v.)+ii.), xi.)+vii.)+vi.)+v.)+i.), xi.)+vii.)+vi.)+v.), xi.)+
vii.)+vi.)+iv.)+iii.)+ii.)+i.), xi.)+vii.)+vi.)+iv.)+iii.)+ii.),
xi.)+vii.)+vi.)+iv.)+iii.)+i.), xi.)+vii.)+vi.)+iv.)+iii.), xi.)+
vii.)+vi.)+iv.)+ii.)+i.), xi.)+vii.)+vi.)+iv.)+ii.), xi.)+vii.)+
vi.)+iv.)+i.), xi.)+vii.)+vi.)+iv.), xi.)+vii.)+vi.)+iii.)+ii.)+i.),
xi.)+vii.)+vi.)+iii.)+ii.), xi.)+vii.)+vi.)+iii.)+i.), xi.)+vii.)+
vi.)+iii.), xi.)+vii.)+vi.)+ii.)+i.), xi.)+vii.)+vi.)+ii.), xi.)+
vii.)+vi.)+i.), xi.)+vii.)+vi.), xi.)+vii.)+v.)+iv.)+iii.)+ii.)+i.),
xi.)+vii.)+v.)+iv.)+iii.)+ii.), xi.)+vii.)+v.)+iv.)+iii.)+i.), xi.)+
vii.)+v.)+iv.)+iii.), xi.)+vii.)+v.)+iv.)+ii.)+i.), xi.)+vii.)+v.)+
iv.)+ii.), xi.)+vii.)+v.)+iv.)+i.), xi.)+vii.)+v.)+iv.), xi.)+vii.)+
v.)+iii.)+ii.)+i.), xi.)+vii.)+v.)+iii.)+ii.), xi.)+vii.)+v.)+iii.)+
i.), xi.)+vii.)+v.)+iii.), xi.)+vii.)+v.)+ii.)+i.), xi.)+vii.)+v.)+
ii.), xi.)+vii.)+v.)+i.), xi.)+vii.)+v.), xi.)+vii.)+iv.)+iii.)+ii.)+
i.), xi.)+vii.)+iv.)+iii.)+ii.), xi.)+vii.)+iv.)+iii.)+i.), xi.)+
vii.)+iv.)+iii.), xi.)+vii.)+iv.)+ii.)+i.), xi.)+vii.)+iv.)+ii.),
xi.)+vii.)+iv.)+i.), xi.)+vii.)+iv.), xi.)+vii.)+iii.)+ii.)+i.),
xi.)+vii.)+iii.)+ii.), xi.)+vii.)+iii.)+i.), xi.)+vii.)+iii.), xi.)+
vii.)+ii.)+i.), xi.)+vii.)+ii.), xi.)+vii.)+i.), xi.)+vii.), xi.)+
vi.)+v.)+iv.)+iii.)+ii.)+i.), xi.)+vi.)+v.)+iv.)+iii.)+ii.), xi.)+
vi.)+v.)+iv.)+iii.)+i.), xi.)+vi.)+v.)+iv.)+iii.), xi.)+vi.)+v.)+
iv.)+ii.)+i.), xi.)+vi.)+v.)+iv.)+ii.), xi.)+vi.)+v.)+iv.)+i.),
xi.)+vi.)+v.)+iv.), xi.)+vi.)+v.)+iii.)+ii.)+i.), xi.)+vi.)+v.)+
iii.)+ii.), xi.)+vi.)+v.)+iii.)+i.), xi.)+vi.)+v.)+iii.), xi.)+vi.)+
v.)+ii.)+i.), xi.)+vi.)+v.)+ii.), xi.)+vi.)+v.)+i.), xi.)+vi.)+v.),
xi.)+vi.)+iv.)+iii.)+ii.)+i.), xi.)+vi.)+iv.)+iii.)+ii.), xi.)+vi.)+
iv.)+iii.)+i.), xi.)+vi.)+iv.)+iii.), xi.)+vi.)+iv.)+ii.)+i.), xi.)+
vi.)+iv.)+ii.), xi.)+vi.)+iv.)+i.), xi.)+vi.)+iv.), xi.)+vi.)+iii.)+
ii.)+i.), xi.)+vi.)+iii.)+ii.), xi.)+vi.)+iii.)+i.), xi.)+vi.)+iii.),
xi.)+vi.)+ii.)+i.), xi.)+vi.)+ii.), xi.)+vi.)+i.), xi.)+vi.), xi.)+
v.)+iv.)+iii.)+ii.)+i.), xi.)+v.)+iv.)+iii.)+ii.), xi.)+v.)+iv.)+
iii.)+i.), xi.)+v.)+iv.)+iii.), xi.)+v.)+iv.)+ii.)+i.), xi.)+v.)+
iv.)+ii.), xi.)+v.)+iv.)+i.), xi.)+v.)+iv.), xi.)+v.)+iii.)+ii.)+i.),
xi.)+v.)+iii.)+ii.), xi.)+v.)+iii.)+i.), xi.)+v.)+iii.), xi.)+v.)+
ii.)+i.), xi.)+v.)+ii.), xi.)+v.)+i.), xi.)+v.), xi.)+iv.)+iii.)+ii.)+
i.), xi.)+iv.)+iii.)+ii.), xi.)+iv.)+iii.)+i.), xi.)+iv.)+iii.), xi.)+
iv.)+ii.)+i.), xi.)+iv.)+ii.), xi.)+iv.)+i.), xi.)+iv.), xi.)+iii.)+
ii.)+i.), xi.)+iii.)+ii.), xi.)+iii.)+i.), xi.)+iii.), xi.)+ii.)+i.),
xi.)+ii.), xi.)+i.), xi.)+x.)+ix.)+viii.)+vii.)+vi.)+v.)+iv.)+
iii.)+ii.)+i.), xi.)+x.)+ix.)+viii.)+vii.)+vi.)+v.)+iv.)+iii.)+ii.),
xi.)+x.)+ix.)+viii.)+vii.)+vi.)+v.)+iv.)+iii.)+i.), xi.)+x.)+
ix.)+viii.)+vii.)+vi.)+v.)+iv.)+iii.), xi.)+x.)+ix.)+viii.)+vii.)+
vi.)+v.)+iv.)+ii.)+i.), xi.)+x.)+ix.)+viii.)+vii.)+vi.)+v.)+iv.)+
ii.), xi.)+x.)+ix.)+viii.)+vii.)+vi.)+v.)+iv.)+i.), xi.)+x.)+ix.)+
viii.)+vii.)+vi.)+v.)+iv.), xi.)+x.)+ix.)+viii.)+vii.)+vi.)+v.)+
iii.)+ii.)+i.), xi.)+x.)+ix.)+viii.)+vii.)+vi.)+v.)+iii.)+ii.),
xi.)+x.)+ix.)+viii.)+vii.)+vi.)+v.)+iii.)+i.), xi.)+x.)+ix.)+
viii.)+vii.)+vi.)+v.)+iii.), xi.)+x.)+ix.)+viii.)+vii.)+vi.)+v.)+
ii.)+i.), xi.)+x.)+ix.)+viii.)+vii.)+vi.)+v.)+ii.), xi.)+x.)+ix.)+
viii.)+vii.)+vi.)+v.)+i.), xi.)+x.)+ix.)+viii.)+vii.)+vi.)+v.),
xi.)+x.)+ix.)+viii.)+vii.)+vi.)+iv.)+iii.)+ii.)+i.), xi.)+x.)+
ix.)+viii.)+vii.)+vi.)+iv.)+iii.)+ii.), xi.)+x.)+ix.)+viii.)+vii.)+
vi.)+iv.)+iii.)+i.), xi.)+x.)+ix.)+viii.)+vii.)+vi.)+iv.)+iii.),
xi.)+x.)+ix.)+viii.)+vii.)+vi.)+iv.)+ii.)+i.), xi.)+x.)+ix.)+
viii.)+vii.)+vi.)+iv.)+ii.), xi.)+x.)+ix.)+viii.)+vii.)+vi.)+iv.)+
i.), xi.)+x.)+ix.)+viii.)+vii.)+vi.)+iv.), xi.)+x.)+ix.)+viii.)+
vii.)+vi.)+iii.)+ii.)+i.), xi.)+x.)+ix.)+viii.)+vii.)+vi.)+iii.)+
ii.), xi.)+x.)+ix.)+viii.)+vii.)+vi.)+iii.)+i.), xi.)+x.)+ix.)+
viii.)+vii.)+vi.)+iii.), xi.)+x.)+ix.)+viii.)+vii.)+vi.)+ii.)+i.),
xi.)+x.)+ix.)+viii.)+vii.)+vi.)+ii.), xi.)+x.)+ix.)+viii.)+vii.)+
vi.)+i.), xi.)+x.)+ix.)+viii.)+vii.)+vi.), xi.)+x.)+ix.)+viii.)+
vii.)+v.)+iv.)+iii.)+ii.)+i.), xi.)+x.)+ix.)+viii.)+vii.)+v.)+iv.)+
iii.)+ii.), xi.)+x.)+ix.)+viii.)+vii.)+v.)+iv.)+iii.)+i.), xi.)+
x.)+ix.)+viii.)+vii.)+v.)+iv.)+iii.), xi.)+x.)+ix.)+viii.)+
vii.)+v.)+iv.)+ii.)+i.), xi.)+x.)+ix.)+viii.)+vii.)+v.)+iv.)+ii.),
xi.)+x.)+ix.)+viii.)+vii.)+v.)+iv.)+i.), xi.)+x.)+ix.)+viii.)+
vii.)+v.)+iv.), xi.)+x.)+ix.)+viii.)+vii.)+v.)+iii.)+ii.)+i.),
xi.)+x.)+ix.)+viii.)+vii.)+v.)+iii.)+ii.), xi.)+x.)+ix.)+viii.)+
vii.)+v.)+iii.)+i.), xi.)+x.)+ix.)+viii.)+vii.)+v.)+iii.), xi.)+
x.)+ix.)+viii.)+vii.)+v.)+ii.)+i.), xi.)+x.)+ix.)+viii.)+vii.)+
v.)+ii.), xi.)+x.)+ix.)+viii.)+vii.)+v.)+i.), xi.)+x.)+ix.)+
viii.)+vii.)+v.), xi.)+x.)+ix.)+viii.)+vii.)+iv.)+iii.)+ii.)+i.),
xi.)+x.)+ix.)+viii.)+vii.)+iv.)+iii.)+ii.), xi.)+x.)+ix.)+viii.)+
vii.)+iv.)+iii.)+i.), xi.)+x.)+ix.)+viii.)+vii.)+iv.)+iii.), xi.)+
x.)+ix.)+viii.)+vii.)+iv.)+ii.)+i.), xi.)+x.)+ix.)+viii.)+vii.)+
iv.)+ii.), xi.)+x.)+ix.)+viii.)+vii.)+iv.)+i.), xi.)+x.)+ix.)+
viii.)+vii.)+iv.), xi.)+x.)+ix.)+viii.)+vii.)+iii.)+ii.)+i.), xi.)+
x.)+ix.)+viii.)+vii.)+iii.)+ii.), xi.)+x.)+ix.)+viii.)+vii.)+iii.)+
i.), xi.)+x.)+ix.)+viii.)+vii.)+iii.), xi.)+x.)+ix.)+viii.)+vii.)+
ii.)+i.), xi.)+x.)+ix.)+viii.)+vii.)+ii.), xi.)+x.)+ix.)+viii.)+
vii.)+i.), xi.)+x.)+ix.)+viii.)+vii.), xi.)+x.)+ix.)+viii.)+vi.)+
v.)+iv.)+iii.)+ii.)+i.), xi.)+x.)+ix.)+viii.)+vi.)+v.)+iv.)+iii.)+
ii.), xi.)+x.)+ix.)+viii.)+vi.)+v.)+iv.)+iii.)+i.), xi.)+x.)+ix.)+
viii.)+vi.)+v.)+iv.)+iii.), xi.)+x.)+ix.)+viii.)+vi.)+v.)+iv.)+
ii.)+i.), xi.)+x.)+ix.)+viii.)+vi.)+v.)+iv.)+ii.), xi.)+x.)+ix.)+
viii.)+vi.)+v.)+iv.)+i.), xi.)+x.)+ix.)+viii.)+vi.)+v.)+iv.),
xi.)+x.)+ix.)+viii.)+vi.)+v.)+iii.)+ii.)+i.), xi.)+x.)+ix.)+
viii.)+vi.)+v.)+iii.)+ii.), xi.)+x.)+ix.)+viii.)+vi.)+v.)+iii.)+i.),
xi.)+x.)+ix.)+viii.)+vi.)+v.)+iii.), xi.)+x.)+ix.)+viii.)+vi.)+
v.)+ii.)+i.), xi.)+x.)+ix.)+viii.)+vi.)+v.)+ii.), xi.)+x.)+ix.)+
viii.)+vi.)+v.)+i.), xi.)+x.)+ix.)+viii.)+vi.)+v.), xi.)+x.)+ix.)+
viii.)+vi.)+iv.)+iii.)+ii.)+i.), xi.)+x.)+ix.)+viii.)+vi.)+iv.)+
iii.)+ii.), xi.)+x.)+ix.)+viii.)+vi.)+iv.)+iii.)+i.), xi.)+x.)+ix.)+
viii.)+vi.)+iv.)+iii.), xi.)+x.)+ix.)+viii.)+vi.)+iv.)+ii.)+i.),
xi.)+x.)+ix.)+viii.)+vi.)+iv.)+ii.), xi.)+x.)+ix.)+viii.)+vi.)+
iv.)+i.), xi.)+x.)+ix.)+viii.)+vi.)+iv.), xi.)+x.)+ix.)+viii.)+
vi.)+iii.)+ii.)+i.), xi.)+x.)+ix.)+viii.)+vi.)+iii.)+ii.), xi.)+x.)+
ix.)+viii.)+vi.)+iii.)+i.), xi.)+x.)+ix.)+viii.)+vi.)+iii.), xi.)+
x.)+ix.)+viii.)+vi.)+ii.)+i.), xi.)+x.)+ix.)+viii.)+vi.)+ii.),
xi.)+x.)+ix.)+viii.)+vi.)+i.), xi.)+x.)+ix.)+viii.)+vi.), xi.)+
x.)+ix.)+viii.)+v.)+iv.)+iii.)+ii.)+i.), xi.)+x.)+ix.)+viii.)+v.)+
iv.)+iii.)+ii.), xi.)+x.)+ix.)+viii.)+v.)+iv.)+iii.)+i.), xi.)+x.)+
ix.)+viii.)+v.)+iv.)+iii.), xi.)+x.)+ix.)+viii.)+v.)+iv.)+ii.)+i.),
xi.)+x.)+ix.)+viii.)+v.)+iv.)+ii.), xi.)+x.)+ix.)+viii.)+v.)+
iv.)+i.), xi.)+x.)+ix.)+viii.)+v.)+ iii.)+ii.)+i.), xi.)+x.)+ix.)+viii.)+v.)+iii.)+ii.), xi.)+x.)+ix.)+
viii.)+v.)+iii.)+i.), xi.)+x.)+ix.)+viii.)+v.)+iii.), xi.)+x.)+
ix.)+viii.)+v.)+ii.)+i.), xi.)+x.)+ix.)+viii.)+v.)+ii.), xi.)+x.)+
ix.)+viii.)+v.)+i.), xi.)+x.)+ix.)+viii.)+v.), xi.)+x.)+ix.)+
viii.)+iv.)+iii.)+ii.)+i.), xi.)+x.)+ix.)+viii.)+iv.)+iii.)+ii.),
xi.)+x.)+ix.)+viii.)+iv.)+iii.)+i.), xi.)+x.)+ix.)+viii.)+iv.)+
iii.), xi.)+x.)+ix.)+viii.)+iv.)+ii.)+i.), xi.)+x.)+ix.)+viii.)+
iv.)+ii.), xi.)+x.)+ix.)+viii.)+iv.)+i.), xi.)+x.)+ix.)+viii.)+iv.),
xi.)+x.)+ix.)+viii.)+iii.)+ii.)+i.), xi.)+x.)+ix.)+viii.)+iii.)+
ii.), xi.)+x.)+ix.)+viii.)+iii.)+i.), xi.)+x.)+ix.)+viii.)+iii.),
xi.)+x.)+ix.)+viii.)+ii.)+i.), xi.)+x.)+ix.)+viii.)+ii.), xi.)+x.)+
ix.)+viii.)+i.), xi.)+x.)+ix.)+viii.), xi.)+x.)+ix.)+vii.)+vi.)+
v.)+iv.)+iii.)+ii.)+i.), xi.)+x.)+ix.)+vii.)+vi.)+v.)+iv.)+iii.)+
ii.), xi.)+x.)+ix.)+vii.)+vi.)+v.)+iv.)+iii.)+i.), xi.)+x.)+ix.)+
vii.)+vi.)+v.)+iv.)+iii.), xi.)+x.)+ix.)+vii.)+vi.)+v.)+iv.)+
ii.)+i.), xi.)+x.)+ix.)+vii.)+vi.)+v.)+iv.)+ii.), xi.)+x.)+ix.)+
vii.)+vi.)+v.)+iv.)+i.), xi.)+x.)+ix.)+vii.)+vi.)+v.)+iv.), xi.)+
x.)+ix.)+vii.)+vi.)+v.)+iii.)+ii.)+i.), xi.)+x.)+ix.)+vii.)+vi.)+
v.)+iii.)+ii.), xi.)+x.)+ix.)+vii.)+vi.)+v.)+iii.)+i.), xi.)+x.)+
ix.)+vii.)+vi.)+v.)+iii.), xi.)+x.)+ix.)+vii.)+vi.)+v.)+ii.)+i.),
xi.)+x.)+ix.)+vii.)+vi.)+v.)+ii.), xi.)+x.)+ix.)+vii.)+vi.)+v.)+
i.), xi.)+x.)+ix.)+vii.)+vi.)+v.), xi.)+x.)+ix.)+vii.)+vi.)+iv.)+
iii.)+ii.)+i.), xi.)+x.)+ix.)+vii.)+vi.)+iv.)+iii.)+ii.), xi.)+x.)+
ix.)+vii.)+vi.)+iv.)+iii.)+i.), xi.)+x.)+ix.)+vii.)+vi.)+iv.)+
iii.), xi.)+x.)+ix.)+vii.)+vi.)+iv.)+ii.)+i.), xi.)+x.)+ix.)+vii.)+
vi.)+iv.)+ii.), xi.)+x.)+ix.)+vii.)+vi.)+iv.)+i.), xi.)+x.)+ix.)+
vii.)+vi.)+iv.), xi.)+x.)+ix.)+vii.)+vi.)+iii.)+ii.)+i.), xi.)+x.)+
ix.)+vii.)+vi.)+iii.)+ii.), xi.)+x.)+ix.)+vii.)+vi.)+iii.)+i.),
xi.)+x.)+ix.)+vii.)+vi.)+iii.), xi.)+x.)+ix.)+vii.)+vi.)+ii.)+i.),
xi.)+x.)+ix.)+vii.)+vi.)+ii.), xi.)+x.)+ix.)+vii.)+vi.)+i.), xi.)+
x.)+ix.)+vii.)+vi.), xi.)+x.)+ix.)+vii.)+v.)+iv.)+iii.)+ii.)+i.),
xi.)+x.)+ix.)+vii.)+v.)+iv.)+iii.)+ii.), xi.)+x.)+ix.)+vii.)+v.)+
iv.)+iii.)+i.), xi.)+x.)+ix.)+vii.)+v.)+iv.)+iii.), xi.)+x.)+ix.)+
vii.)+v.)+iv.)+ii.)+i.), xi.)+x.)+ix.)+vii.)+v.)+iv.)+ii.), xi.)+
x.)+ix.)+vii.)+v.)+iv.)+i.), xi.)+x.)+ix.)+vii.)+v.)+iv.), xi.)+
x.)+ix.)+vii.)+v.)+iii.)+ii.)+i.), xi.)+x.)+ix.)+vii.)+v.)+iii.)+
ii.), xi.)+x.)+ix.)+vii.)+v.)+iii.)+i.), xi.)+x.)+ix.)+vii.)+v.)+
iii.), xi.)+x.)+ix.)+vii.)+v.)+ii.)+i.), xi.)+x.)+ix.)+vii.)+v.)+
ii.), xi.)+x.)+ix.)+vii.)+v.)+i.), xi.)+x.)+ix.)+vii.)+v.), xi.)+
x.)+ix.)+vii.)+iv.)+iii.)+ii.)+i.), xi.)+x.)+ix.)+vii.)+iv.)+iii.)+
ii.), xi.)+x.)+ix.)+vii.)+iv.)+iii.)+i.), xi.)+x.)+ix.)+vii.)+iv.)+
iii.), xi.)+x.)+ix.)+vii.)+iv.)+ii.)+i.), xi.)+x.)+ix.)+vii.)+iv.)+
ii.), xi.)+x.)+ix.)+vii.)+iv.)+i.), xi.)+x.)+ix.)+vii.)+iv.), xi.)+
x.)+ix.)+vii.)+iii.)+ii.)+i.), xi.)+x.)+ix.)+vii.)+iii.)+ii.), xi.)+
x.)+ix.)+vii.)+iii.)+i.), xi.)+x.)+ix.)+vii.)+iii.), xi.)+x.)+ix.)+
vii.)+ii.)+i.), xi.)+x.)+ix.)+vii.)+ii.), xi.)+x.)+ix.)+vii.)+i.),
xi.)+x.)+ix.)+vii.), xi.)+x.)+ix.)+vi.)+v.)+iv.)+iii.)+ii.)+i.),
xi.)+x.)+ix.)+vi.)+v.)+iv.)+iii.)+ii.), xi.)+x.)+ix.)+vi.)+v.)+
iv.)+iii.)+i.), xi.)+x.)+ix.)+vi.)+v.)+iv.)+iii.), xi.)+x.)+ix.)+
vi.)+v.)+iv.)+ii.)+i.), xi.)+x.)+ix.)+vi.)+v.)+iv.)+ii.), xi.)+
x.)+ix.)+vi.)+v.)+iv.)+i.), xi.)+x.)+ix.)+vi.)+v.)+iv.), xi.)+
x.)+ix.)+vi.)+v.)+iii.)+ii.)+i.), xi.)+x.)+ix.)+vi.)+v.)+iii.)+
ii.), xi.)+x.)+ix.)+vi.)+v.)+iii.)+i.), xi.)+x.)+ix.)+vi.)+v.)+
iii.), xi.)+x.)+ix.)+vi.)+v.)+ii.)+i.), xi.)+x.)+ix.)+vi.)+v.)+
ii.), xi.)+x.)+ix.)+vi.)+v.)+i.), xi.)+x.)+ix.)+vi.)+v.), xi.)+
x.)+ix.)+vi.)+iv.)+iii.)+ii.)+i.), xi.)+x.)+ix.)+vi.)+iv.)+iii.)+
ii.), xi.)+x.)+ix.)+vi.)+iv.)+iii.)+i.), xi.)+x.)+ix.)+vi.)+iv.)+
iii.), xi.)+x.)+ix.)+vi.)+iv.)+ii.)+i.), xi.)+x.)+ix.)+vi.)+iv.)+
ii.), xi.)+x.)+ix.)+vi.)+iv.)+i.), xi.)+x.)+ix.)+vi.)+iv.), xi.)+
x.)+ix.)+vi.)+iii.)+ii.)+i.), xi.)+x.)+ix.)+vi.)+iii.)+ii.), xi.)+
x.)+ix.)+vi.)+iii.)+i.), xi.)+x.)+ix.)+vi.)+iii.), xi.)+x.)+ix.)+
vi.)+ii.)+i.), xi.)+x.)+ix.)+vi.)+ii.), xi.)+x.)+ix.)+vi.)+i.),
xi.)+x.)+ix.)+vi.), xi.)+x.)+ix.)+v.)+iv.)+iii.)+ii.)+i.), xi.)+
x.)+ix.)+v.)+iv.)+iii.)+ii.), xi.)+x.)+ix.)+v.)+iv.)+iii.)+i.),
xi.)+x.)+ix.)+v.)+iv.)+iii.), xi.)+x.)+ix.)+v.)+iv.)+ii.)+i.), xi.)+
x.)+ix.)+v.)+iv.)+ii.), xi.)+x.)+ix.)+v.)+iv.)+i.), xi.)+x.)+
ix.)+v.)+iv.), xi.)+x.)+ix.)+v.)+iii.)+ii.)+i.), xi.)+x.)+ ix.)+v.)+iii.)+ii.), xi.)+x.)+ix.)+v.)+iii.)+i.), xi.)+x.)+ix.)+
v.)+iii.), xi.)+x.)+ix.)+v.)+ii.)+i.), xi.)+x.)+ix.)+v.)+ii.), xi.)+
x.)+ix.)+v.)+i.), xi.)+x.)+ix.)+v.), xi.)+x.)+ix.)+iv.)+iii.)+
ii.)+i.), xi.)+x.)+ix.)+iv.)+iii.)+ii.), xi.)+x.)+ix.)+iv.)+iii.)+
i.), xi.)+x.)+ix.)+iv.)+iii.), xi.)+x.)+ix.)+iv.)+ii.)+i.), xi.)+
x.)+ix.)+iv.)+ii.), xi.)+x.)+ix.)+iv.)+i.), xi.)+x.)+ix.)+iv.),
xi.)+x.)+ix.)+iii.)+ii.)+i.), xi.)+x.)+ix.)+iii.)+ii.), xi.)+x.)+
ix.)+iii.)+i.), xi.)+x.)+ix.)+iii.), xi.)+x.)+ix.)+ii.)+i.), xi.)+
x.)+ix.)+ii.), xi.)+x.)+ix.)+i.), xi.)+x.)+ix.), xi.)+x.)+viii.)+
vii.)+vi.)+v.)+iv.)+iii.)+ii.)+i.), xi.)+x.)+viii.)+vii.)+vi.)+
v.)+iv.)+iii.)+ii.), xi.)+x.)+viii.)+vii.)+vi.)+v.)+iv.)+iii.)+i.),
xi.)+x.)+viii.)+vii.)+vi.)+v.)+iv.)+iii.), xi.)+x.)+viii.)+vii.)+
vi.)+v.)+iv.)+ii.)+i.), xi.)+x.)+viii.)+vii.)+vi.)+v.)+iv.)+ii.),
xi.)+x.)+viii.)+vii.)+vi.)+v.)+iv.)+i.), xi.)+x.)+viii.)+vii.)+
vi.)+v.)+iv.), xi.)+x.)+viii.)+vii.)+vi.)+v.)+iii.)+ii.)+i.), xi.)+
x.)+viii.)+vii.)+vi.)+v.)+iii.)+ii.), xi.)+x.)+viii.)+vii.)+vi.)+
v.)+iii.)+i.), xi.)+x.)+viii.)+vii.)+vi.)+v.)+iii.), xi.)+x.)+
viii.)+vii.)+vi.)+v.)+ii.)+i.), xi.)+x.)+viii.)+vii.)+vi.)+v.)+
ii.), xi.)+x.)+viii.)+vii.)+vi.)+v.)+i.), xi.)+x.)+viii.)+vii.)+
vi.)+v.), xi.)+x.)+viii.)+vii.)+vi.)+iv.)+iii.)+ii.)+i.), xi.)+x.)+
viii.)+vii.)+vi.)+iv.)+iii.)+ii.), xi.)+x.)+viii.)+vii.)+vi.)+iv.)+
iii.)+i.), xi.)+x.)+viii.)+vii.)+vi.)+iv.)+iii.), xi.)+x.)+viii.)+
vii.)+vi.)+iv.)+ii.)+i.), xi.)+x.)+viii.)+vii.)+vi.)+iv.)+ii.),
xi.)+x.)+viii.)+vii.)+vi.)+iv.)+i.), xi.)+x.)+viii.)+vii.)+vi.)+
iv.), xi.)+x.)+viii.)+vii.)+vi.)+iii.)+ii.)+i.), xi.)+x.)+viii.)+
vii.)+vi.)+iii.)+ii.), xi.)+x.)+viii.)+vii.)+vi.)+iii.)+i.), xi.)+
x.)+viii.)+vii.)+vi.)+iii.), xi.)+x.)+viii.)+vii.)+vi.)+ii.)+i.),
xi.)+x.)+viii.)+vii.)+vi.)+ii.), xi.)+x.)+viii.)+vii.)+vi.)+i.),
xi.)+x.)+viii.)+vii.)+vi.), xi.)+x.)+viii.)+vii.)+v.)+iv.)+iii.)+
ii.)+i.), xi.)+x.)+viii.)+vii.)+v.)+iv.)+iii.)+ii.), xi.)+x.)+
viii.)+vii.)+v.)+iv.)+iii.)+i.), xi.)+x.)+viii.)+vii.)+v.)+iv.)+
iii.), xi.)+x.)+viii.)+vii.)+v.)+iv.)+ii.)+i.), xi.)+x.)+viii.)+
vii.)+v.)+iv.)+ii.), xi.)+x.)+viii.)+vii.)+v.)+iv.)+i.), xi.)+x.)+
viii.)+vii.)+v.)+iv.), xi.)+x.)+viii.)+vii.)+v.)+iii.)+ii.)+i.),
xi.)+x.)+viii.)+vii.)+v.)+iii.)+ii.), xi.)+x.)+viii.)+vii.)+v.)+
iii.)+i.), xi.)+x.)+viii.)+vii.)+v.)+iii.), xi.)+x.)+viii.)+vii.)+
v.)+ii.)+i.), xi.)+x.)+viii.)+vii.)+v.)+ii.), xi.)+x.)+viii.)+
vii.)+v.)+i.), xi.)+x.)+viii.)+vii.)+v.), xi.)+x.)+viii.)+vii.)+
iv.)+iii.)+ii.)+i.), xi.)+x.)+viii.)+vii.)+iv.)+iii.)+ii.), xi.)+x.)+
viii.)+vii.)+iv.)+iii.)+i.), xi.)+x.)+viii.)+vii.)+iv.)+iii.), xi.)+
x.)+viii.)+vii.)+iv.)+ii.)+i.), xi.)+x.)+viii.)+vii.)+iv.)+ii.),
xi.)+x.)+viii.)+vii.)+iv.)+i.), xi.)+x.)+viii.)+vii.)+iv.), xi.)+
x.)+viii.)+vii.)+iii.)+ii.)+i.), xi.)+x.)+viii.)+vii.)+iii.)+ii.),
xi.)+x.)+viii.)+vii.)+iii.)+i.), xi.)+x.)+viii.)+vii.)+iii.), xi.)+
x.)+viii.)+vii.)+ii.)+i.), xi.)+x.)+viii.)+vii.)+ii.), xi.)+x.)+
viii.)+vii.)+i.), xi.)+x.)+viii.)+vii.), xi.)+x.)+viii.)+vi.)+v.)+
iv.)+iii.)+ii.)+i.), xi.)+x.)+viii.)+vi.)+v.)+iv.)+iii.)+ii.), xi.)+
x.)+viii.)+vi.)+v.)+iv.)+iii.)+i.), xi.)+x.)+viii.)+vi.)+v.)+
iv.)+iii.), xi.)+x.)+viii.)+vi.)+v.)+iv.)+ii.)+i.), xi.)+x.)+
viii.)+vi.)+v.)+iv.)+ii.), xi.)+x.)+viii.)+vi.)+v.)+iv.)+i.), xi.)+
x.)+viii.)+vi.)+v.)+iv.), xi.)+x.)+viii.)+vi.)+v.)+iii.)+ii.)+i.),
xi.)+x.)+viii.)+vi.)+v.)+iii.)+ii.), xi.)+x.)+viii.)+vi.)+v.)+
iii.)+i.), xi.)+x.)+viii.)+vi.)+v.)+iii.), xi.)+x.)+viii.)+vi.)+
v.)+ii.)+i.), xi.)+x.)+viii.)+vi.)+v.)+ii.), xi.)+x.)+viii.)+vi.)+
v.)+i.), xi.)+x.)+viii.)+vi.)+v.), xi.)+x.)+viii.)+vi.)+iv.)+iii.)+
ii.)+i.), xi.)+x.)+viii.)+vi.)+iv.)+iii.)+ii.), xi.)+x.)+viii.)+
vi.)+iv.)+iii.)+i.), xi.)+x.)+viii.)+vi.)+iv.)+iii.), xi.)+x.)+
viii.)+vi.)+iv.)+ii.)+i.), xi.)+x.)+viii.)+vi.)+iv.)+ii.), xi.)+
x.)+viii.)+vi.)+iv.)+i.), xi.)+x.)+viii.)+vi.)+iv.), xi.)+x.)+
viii.)+vi.)+iii.)+ii.)+i.), xi.)+x.)+viii.)+vi.)+iii.)+ii.), xi.)+
x.)+viii.)+vi.)+iii.)+i.), xi.)+x.)+viii.)+vi.)+iii.), xi.)+x.)+
viii.)+vi.)+ii.)+i.), xi.)+x.)+viii.)+vi.)+ii.), xi.)+x.)+viii.)+
vi.)+i.), xi.)+x.)+viii.)+vi.), xi.)+x.)+viii.)+v.)+iv.)+iii.)+
ii.)+i.), xi.)+x.)+viii.)+v.)+iv.)+iii.)+ii.), xi.)+x.)+viii.)+v.)+
iv.)+iii.)+i.), xi.)+x.)+viii.)+v.)+iv.)+iii.), xi.)+x.)+viii.)+v.)+
iv.)+ii.)+i.), xi.)+x.)+viii.)+v.)+iv.)+ii.), xi.)+x.)+viii.)+v.)+
iv.)+i.), xi.)+x.)+viii.)+v.)+iv.), xi.)+x.)+viii.)+v.)+iii.)+ii.)+ i.), xi.)+x.)+viii.)+v.)+iii.)+ii.), xi.)+x.)+viii.)+v.)+iii.)+i.), xi.)+x.)+viii.)+v.)+iii.), xi.)+x.)+viii.)+v.)+ii.)+i.), xi.)+x.)+viii.)+v.)+ii.), xi.)+x.)+viii.)+v.)+i.), xi.)+x.)+viii.)+v.), xi.)+x.)+viii.)+iv.)+iii.)+ii.)+i.), xi.)+x.)+viii.)+iv.)+iii.)+ii.), xi.)+x.)+viii.)+iv.)+iii.)+i.), xi.)+x.)+viii.)+iv.)+iii.), xi.)+x.)+viii.)+iv.)+ii.)+i.), xi.)+x.)+viii.)+iv.)+ii.), xi.)+x.)+viii.)+iv.)+i.), xi.)+x.)+viii.)+iv.), xi.)+x.)+viii.)+iii.)+ii.)+i.), xi.)+x.)+viii.)+iii.)+ii.), xi.)+x.)+viii.)+iii.)+i.), xi.)+x.)+viii.)+iii.), xi.)+x.)+viii.)+ii.)+i.), xi.)+x.)+viii.)+ii.), xi.)+x.)+viii.)+i.), xi.)+x.)+viii.), xi.)+x.)+vii.)+vi.)+v.)+iv.)+iii.)+ii.)+i.), xi.)+x.)+vii.)+vi.)+v.)+iv.)+iii.)+ii.), xi.)+x.)+vii.)+vi.)+v.)+iv.)+iii.)+i.), xi.)+x.)+vii.)+vi.)+v.)+iv.)+iii.), xiv.)+.)+vii.)+vi.)+v.)+vi.)+i.), xiv.)+x.)+vii.)+vi.)+v.)+iv.)+ii.), xi.)+x.)+vii.)+vi.)+v.)+iv.)+i.), xi.)+x.)+vii.)+vi.)+v.)+iv.), xi.)+x.)+vii.)+vi.)+v.)+iii.)+ii.)+i.), xi.)+x.)+vii.)+vi.)+v.)+iii.)+ii.), xi.)+x.)+vii.)+vi.)+v.)+iii.)+i.), xi.)+x.)+vii.)+vi.)+v.)+iii.), xi.)+x.)+vii.)+vi.)+v.)+ii.)+i.), xi.)+x.)+vii.)+vi.)+v.)+ii.), xi.)+x.)+vii.)+vi.)+v.)+i.), xi.)+x.)+vii.)+vi.)+v.), xi.)+x.)+vii.)+vi.)+iv.)+iii.)+ii.)+i.), xi.)+x.)+vii.)+vi.)+iv.)+iii.)+ii.), xi.)+x.)+vii.)+vi.)+iv.)+iii.)+i.), xi.)+x.)+vii.)+vi.)+iv.)+iii.), xi.)+x.)+vii.)+vi.)+iv.)+ii.)+i.), xi.)+x.)+vii.)+vi.)+iv.)+ii.), xi.)+x.)+vii.)+vi.)+iv.)+i.), xi.)+x.)+vii.)+vi.)+iv.), xi.)+x.)+vii.)+vi.)+iii.)+ii.)+i.), xi.)+x.)+vii.)+vi.)+iii.)+ii.), xi.)+x.)+vii.)+vi.)+iii.)+i.), xi.)+x.)+vii.)+vi.)+iii.), xi.)+x.)+vii.)+vi.)+ii.)+i.), xi.)+x.)+vii.)+vi.)+ii.), xi.)+x.)+vii.)+vi.)+i.), xi.)+x.)+vii.)+vi.), xi.)+x.)+vii.)+v.)+iv.)+iii.)+ii.)+i.), xi.)+x.)+vii.)+v.)+iv.)+iii.)+ii.), xi.)+x.)+vii.)+v.)+iv.)+iii.)+i.), xi.)+x.)+vii.)+v.)+iv.)+iii.), xi.)+x.)+vii.)+v.)+iv.)+ii.)+i.), xi.)+x.)+vii.)+v.)+iv.)+ii.), xi.)+x.)+vii.)+v.)+iv.)+i.), xi.)+x.)+vii.)+v.)+iv.), xi.)+x.)+vii.)+v.)+iii.)+ii.)+i.), xi.)+x.)+vii.)+v.)+iii.)+ii.), xi.)+x.)+vii.)+v.)+iii.)+i.), xi.)+x.)+vii.)+v.)+iii.), xi.)+x.)+vii.)+v.)+ii.)+i.), xi.)+x.)+vii.)+v.)+ii.), xi.)+x.)+vii.)+v.)+i.), xi.)+x.)+vii.)+v.), xi.)+x.)+vii.)+iv.)+iii.)+ii.)+i.), xi.)+x.)+vii.)+iv.)+iii.)+ii.), xi.)+x.)+vii.)+iv.)+iii.)+i.), xi.)+x.)+vii.)+iv.)+iii.), xi.)+x.)+vii.)+iv.)+ii.)+i.), xi.)+x.)+vii.)+iv.)+ii.), xi.)+x.)+vii.)+iv.)+i.), xi.)+x.)+vii.)+iv.), xi.)+x.)+vii.)+iii.)+ii.)+i.), xi.)+x.)+vii.)+iii.)+ii.), xi.)+x.)+vii.)+iii.)+i.), xi.)+x.)+vii.)+iii.), xi.)+x.)+vii.)+ii.)+i.), xi.)+x.)+vii.)+ii.), xi.)+x.)+vii.)+i.), xi.)+x.)+vii.), xi.)+x.)+vi.)+v.)+iv.)+iii.)+ii.)+i.), xi.)+x.)+vi.)+v.)+iv.)+iii.)+ii.), xi.)+x.)+vi.)+v.)+iv.)+iii.)+i.), xi.)+x.)+vi.)+v.)+iv.)+iii.), xi.)+x.)+vi.)+v.)+iv.)+ii.)+i.), xi.)+x.)+vi.)+v.)+iv.)+ii.), xi.)+x.)+vi.)+v.)+iv.)+i.), xi.)+x.)+vi.)+v.)+iv.), xi.)+x.)+vi.)+v.)+iii.)+ii.)+i.), xi.)+x.)+vi.)+v.)+iii.)+ii.), xi.)+x.)+vi.)+v.)+iii.)+i.), xi.)+x.)+vi.)+v.)+iii.), xi.)+x.)+vi.)+v.)+ii.)+i.), xi.)+x.)+vi.)+v.)+ii.), xi.)+x.)+vi.)+v.)+i.), xi.)+x.)+vi.)+v.), xi.)+x.)+vi.)+iv.)+iii.)+ii.)+i.), xi.)+x.)+vi.)+iv.)+iii.)+ii.), xi.)+x.)+vi.)+iv.)+iii.)+i.), xi.)+x.)+vi.)+iv.)+iii.), xi.)+x.)+vi.)+iv.)+ii.)+i.), xi.)+x.)+vi.)+iv.)+ii.), xi.)+x.)+vi.)+iv.)+i.), xi.)+x.)+vi.)+iv.), xi.)+x.)+vi.)+iii.)+ii.)+i.), xi.)+x.)+vi.)+iii.)+ii.), xi.)+x.)+vi.)+iii.)+i.), xi.)+x.)+vi.)+iii.), xi.)+x.)+vi.)+ii.)+i.), xi.)+x.)+vi.)+ii.), xi.)+x.)+vi.)+i.), xi.)+x.)+vi.), xi.)+x.)+v.)+iv.)+iii.)+ii.)+i.), xi.)+x.)+v.)+iv.)+iii.)+ii.), xi.)+x.)+v.)+iv.)+iii.)+i.), xi.)+x.)+v.)+iv.)+iii.), xi.)+x.)+v.)+iv.)+ii.)+i.), xi.)+x.)+v.)+iv.)+ii.), xi.)+x.)+v.)+iv.)+i.), xi.)+x.)+v.)+iv.), xi.)+x.)+v.)+iii.)+ii.)+i.), xi.)+x.)+v.)+iii.)+ii.), xi.)+x.)+v.)+iii.)+i.), xi.)+x.)+v.)+iii.), xi.)+x.)+v.)+ii.)+i.), xi.)+x.)+v.)+ii.), xi.)+x.)+v.)+i.), xi.)+x.)+v.), xi.)+x.)+iv.)+iii.)+ii.)+i.), xi.)+x.)+iv.)+iii.)+ii.), xi.)+x.)+iv.)+iii.)+i.), xi.)+x.)+iv.)+iii.), xi.)+x.)+iv.)+ii.)+i.), xi.)+x.)+iv.)+ii.), xi.)+x.)+iv.)+i.), xi.)+x.)+iv.), xi.)+x.)+iii.)+ii.)+i.), xi.)+x.)+iii.)+ii.), xi.)+x.)+iii.)+i.), xi.)+x.)+iii.), xi.)+x.)+ii.)+i.), xi.)+x.)+ii.), xi.)+x.)+i.), xi.)+x.), xi.).

In some embodiments, a further coating is applied to the back face.

In some exemplary embodiments provided according to the present invention, a device comprises one or more previously described layered composites provided according to the present invention. Exemplary devices are augmented reality devices. Exemplary devices are visors, glasses or head-up displays.

In some embodiments, the device comprises a grouping of x layered composites I, x being an integer at least 2. The x layered composites are arranged in a stack, their front faces being parallel and oriented in the same direction and a spacer region made of a material having a refractive index below 1.3 is present between each pairing of front face with adjacent back face. In some embodiments, the spacer region is made of a gas, such as air. In some embodiments, x may be in the range from 2 to 20, such as in the range from 2 to 15 or in the range from 2 to 10. In some embodiments, x may be at least 2. In some embodiments, x is up to 20, such as up to 15 or up to 10. An exemplary value of x is 3.

In some embodiments, the device comprises a light source arranged and adapted to introduce light into the optical layered composite.

In some exemplary embodiments provided according to the present invention, a process for preparing an optical layered composite comprises the following process steps:
 providing a substrate having a front face and a back face; and
 applying one or more coating layers to the front face by physical vapor deposition, such as by oxidative physical vapor deposition.

In some exemplary embodiments provided according to the present invention, a process for making an augmented reality device comprises the following steps:
 providing a previously described wafer provided according to the present invention;
 reducing the surface area of the front face to obtain a portion; and
 providing the portion as a viewing screen in the augmented reality device.

In some exemplary embodiments provided according to the present invention, an optical layered composite is used in an augmented reality device. Exemplary devices are visors, glasses or head-up displays.

Refractive Indices

In the case of a body of homogeneous refractive index, the refractive index of the body may be the refractive index of the material from which it is made.

In the case of a body of heterogeneous refractive index, the effective refractive index of the body may be the refractive index required of a body of the same thickness having homogeneous refractive index to bring about the same level of refraction for light passing through it in the direction of the normal to the front face. Where there is heterogeneity across the transverse extension, the effective refractive index is an arithmetic mean over the transverse extension.

Thickness

The thickness of the substrate, of substrate layers, of the coating and of coating layers may be measured in a direction perpendicular to the front face. The thickness of the substrate, of substrate layers, of the coating and of coating layers may be measured in a direction normal to the front face.

In the case of a body having a thickness varying across its transverse extension, the thickness may be the arithmetic mean of the thickness over the transverse extension.

Optical Layered Composite

Exemplary optical layered composites are adapted and adjusted to propagate light, such as an image. An exemplary optical layered composite is suitable for propagating light perpendicular to its front face, such as an image, which may be a real world image. An exemplary optical layered composite is suitable for propagating light transverse to its front face, such as an image, which may be an overlaid image.

In some embodiments, a real world image and an overlaid image may overlap at least partially. This overlapping may be observed at an observation surface displaced from the back face of the optical layered composite, for example at an eye.

An overlaid image may be a generated image. An overlaid image may be generated by the device provided according to the present invention. The overlaid image may be generated by a controlled light source.

The optical layered composite comprises a substrate and a coating. The thickness of the substrate may be at least 20 times the thickness of the coating, such as at least 50 times or at least 100 times. The thickness of the substrate may be up to 15,000 times the thickness of the coating, such as up to 5,000 times the thickness of the coating or up to 2,000 times the thickness of the coating. The ratio of the thickness of the coating to the thickness of the substrate may be in the range from 1:20 to 1:15,000, such as in the range from 1:50 to 1:5,000 or in the range from 1:100 to 1:2,000.

Exemplary optical layered composites are laminar. Exemplary optical layered composites have a smallest Cartesian dimension which less than half the width of the next smallest Cartesian dimension. The ratio of the smallest Cartesian dimension to the next smallest Cartesian dimension may be in the range from 1:1000 to 1:2, such as in the range from 1:1000 to 1:10 or in the range from 1:1000 to 1:100. The next smallest Cartesian dimension may be at least 2 times the smallest Cartesian dimension, such as at least 10 times or at least 100 times. The next smallest Cartesian dimension may be up to 1000 times the smallest Cartesian dimension. The next smallest Cartesian dimension might be as large as 10000 times the smallest Cartesian dimension.

In some embodiments, an exemplary optical layered composite has an aspect ratio in the range from 2 to 1000, such as in the range from 10 to 1000 or in the range from 100 to 1000. In some embodiments, an exemplary optical layered composite has an aspect ratio of up to 1000. In some embodiments, an exemplary optical layered composite has an aspect ratio of at least 2, such as at least 10 or at least 100. The aspect ratio might be as high as 10000.

Exemplary laminar optical layered composites are suitable for transverse propagation of light, such as of an overlaid image. Exemplary laminar optical layered composites are suitable for transverse propagation of light.

An exemplary thickness of the optical layered composite is in the range from 10 to 1500 µm, such as in the range from 10 to 1000 µm, in the range from 10 to 500 µm, in the range from 20 to 450 µm, or in the range from 30 to 400 µm.

An exemplary thickness of the optical layered composite is up to 1500 µm, such as up to 1000 µm, up to 500 µm, up to 450 µm, or up to 400 µm.

An exemplary thickness of the optical layered composite is at least 10 µm, such as at least 20 µm or at least 30 µm.

The optical layered composite may be suitable for use in a device, such as an augmented reality device. A device can comprise one or more optical layered composites.

Orientations

The substrate has a front face and a back face. The front face and the back face may be parallel, having a normal varying by less than 15°, such as by less than 10° or by less than 5°. The normal of the back face is measured at the point on the back face through which the normal to the front face passes.

The front face of the substrate defines a principal direction. The principal direction may be the normal to the front face at the geometric center of the front face. The principal is variously referred to herein as "normal to the front face" and "perpendicular to the front face". As used herein, the term "longitudinal" refers to a direction either parallel or anti-parallel to the principal direction. A direction parallel to the normal or longitudinal may be less than 45°, such as less than 30°, less than 10°, or less than 5° from the normal. In the case of a laminar or planar substrate, longitudinal propagation corresponds to travel across the smallest Cartesian dimension.

The front face defines a plane. The plane may be perpendicular to the normal to the front face. The terms "transverse", "lateral" or "in plane" as used herein refer to a direction perpendicular to the normal to the front face, parallel to the plane. A direction perpendicular to the normal, transverse, lateral or in plane may be more than 45°, such as more than 60°, less than 80°, or less than 85° from the normal. In the case of a laminar or planar substrate, transverse, lateral or in plane propagation corresponds to travel within the laminar or planar extension.

In the context of a device, such as an augmented reality device, the optical layered composite may be be oriented with the back face towards the user and the front face towards the real world.

In some embodiments, a coating is applied not only to the front face, but also to the back face. In that case, the principal direction relevant to coating on the back face is the defined analogously in terms of the back face.

Substrate

Exemplary substrates are suitable for propagation of an image, such as more than one image simultaneously. An exemplary substrate is suitable for propagation of a real world image.

An exemplary substrate is suitable for propagation of an overlaid image.

Exemplary substrates are laminar. Exemplary substrates have a smallest Cartesian dimension which is less than half the width of the next smallest Cartesian dimension. The ratio of the smallest Cartesian dimension to the next smallest Cartesian dimension may be in the range from 1:1000 to 1:2, such as in the range from 1:1000 to 1:10 or in the range from 1:1000 to 1:100. The next smallest Cartesian dimension may be at least 2 times the smallest Cartesian dimension, such as at least 10 times or at least 100 times. The next smallest Cartesian dimension may be up to 1000 times the smallest Cartesian dimension. The next smallest Cartesian dimension might be as large as 10000 times the smallest Cartesian dimension.

In some embodiments, an exemplary substrate has an aspect ratio in the range from 2 to 1000, such as in the range from 10 to 1000 or in the range from 100 to 1000. In some embodiments, an exemplary substrate has an aspect ratio of up to 1000. In some embodiments, an exemplary substrate has an aspect ratio of at least 2, such as at least 10 or at least 100. The aspect ratio might be as high as 10000.

Exemplary laminar substrates are suitable for transverse propagation of light, such as of an overlaid image. Exemplary laminar substrates are suitable for transverse propagation of light.

An exemplary thickness of the substrate is in the range from 10 to 1500 µm, such as in the range from 10 to 1000

μm, in the range from 10 to 500 μm, in the range from 20 to 450 μm, or in the range from 30 to 400 μm.

An exemplary thickness of the substrate is up to 1500 μm, such as up to 1000 μm, up to 500 μm, up to 450 μm, or up to 400 μm.

An exemplary thickness of the substrate is at least 10 μm, such as at least 20 μm or at least 30 μm.

In some embodiments, the substrate has a refractive index of at least 1.60, such as at least 1.65 or at least 1.70. In some embodiments, the substrate has a refractive index measured at 550 nm of at least 1.60, such as at least 1.65 or at least 1.70. In some embodiments, the substrate has a refractive index measured at 589 nm of at least 1.60, such as at least 1.65 or at least 1.70.

In some embodiments, the substrate has a refractive index in the range from 1.60 to 2.40, such as in the range from 1.65 to 2.35 or in the range from 1.70 to 2.30. In some embodiments, the substrate has a refractive index measured at 550 nm in the range from 1.60 to 2.40, such as in the range from 1.65 to 2.35 or in the range from 1.70 to 2.30. In some embodiments, the substrate has a refractive index measured at 589 nm in the range from 1.60 to 2.40, such as in the range from 1.65 to 2.35 or in the range from 1.70 to 2.30.

In some embodiments, the substrate has a refractive index of up to 2.40, such as up to 2.35 or up to 2.30. In some embodiments, the substrate has a refractive index measured at 550 nm of up to 2.40, such as up to 2.35 or up to 2.30. In some embodiments, the substrate has a refractive index measured at 589 nm of up to 2.40, such as up to 2.35 or up to 2.30.

In some embodiments, the substrate has a refractive index in the range from 1.65 to 1.75.

In some embodiments, the substrate has a refractive index in the range from 1.70 to 1.80.

In some embodiments, the substrate has a refractive index in the range from 1.75 to 1.85.

In some embodiments, the substrate has a refractive index in the range from 1.80 to 1.90.

In some embodiments, the substrate has a refractive index in the range from 1.85 to 1.95.

In some embodiments, the substrate has a refractive index in the range from 1.90 to 2.00.

In some embodiments, the substrate has a refractive index in the range from 1.95 to 2.05.

In some embodiments, the substrate has a refractive index in the range from 2.00 to 2.10.

In some embodiments, the substrate has a refractive index in the range from 2.05 to 2.15.

In some embodiments, the substrate has a refractive index in the range from 2.10 to 2.20.

In some embodiments, the substrate has a refractive index in the range from 2.15 to 2.25.

In some embodiments, the substrate has a refractive index measured at 550 nm in the range from 1.65 to 1.75.

In some embodiments, the substrate has a refractive index measured at 550 nm in the range from 1.70 to 1.80.

In some embodiments, the substrate has a refractive index measured at 550 nm in the range from 1.75 to 1.85.

In some embodiments, the substrate has a refractive index measured at 550 nm in the range from 1.80 to 1.90.

In some embodiments, the substrate has a refractive index measured at 550 nm in the range from 1.85 to 1.95.

In some embodiments, the substrate has a refractive index measured at 550 nm in the range from 1.90 to 2.00.

In some embodiments, the substrate has a refractive index measured at 550 nm in the range from 1.95 to 2.05.

In some embodiments, the substrate has a refractive index measured at 550 nm in the range from 2.00 to 2.10.

In some embodiments, the substrate has a refractive index measured at 550 nm in the range from 2.05 to 2.15.

In some embodiments, the substrate has a refractive index measured at 550 nm in the range from 2.10 to 2.20.

In some embodiments, the substrate has a refractive index measured at 550 nm in the range from 2.15 to 2.25.

In some embodiments, the substrate has a refractive index measured at 589 nm in the range from 1.65 to 1.75.

In some embodiments, the substrate has a refractive index measured at 589 nm in the range from 1.70 to 1.80.

In some embodiments, the substrate has a refractive index measured at 589 nm in the range from 1.75 to 1.85.

In some embodiments, the substrate has a refractive index measured at 589 nm in the range from 1.80 to 1.90.

In some embodiments, the substrate has a refractive index measured at 589 nm in the range from 1.85 to 1.95.

In some embodiments, the substrate has a refractive index measured at 589 nm in the range from 1.90 to 2.00.

In some embodiments, the substrate has a refractive index measured at 589 nm in the range from 1.95 to 2.05.

In some embodiments, the substrate has a refractive index measured at 589 nm in the range from 2.00 to 2.10.

In some embodiments, the substrate has a refractive index measured at 589 nm in the range from 2.05 to 2.15.

In some embodiments, the substrate has a refractive index measured at 589 nm in the range from 2.10 to 2.20.

In some embodiments, the substrate has a refractive index measured at 589 nm in the range from 2.15 to 2.25.

An exemplary substrate may consist of a single substrate layer or may consist of two or more substrate layers.

In the case of a single substrate layer, the substrate may have a homogeneous chemical composition or a heterogeneous chemical composition. In the case of a single substrate layer, the substrate may have a homogeneous refractive index or a heterogeneous refractive index. In the case of a heterogeneous refractive index, the exemplary ranges disclosed previously may hold for the effective refractive index.

In the case of more than one substrate layer, each substrate layer may have a homogeneous chemical composition or a heterogeneous chemical composition. In the case of more than one substrate layer, the exemplary ranges disclosed previously may hold for the mean refractive index of the substrate as a whole. In the case of more than one substrate layer, each substrate layer may have a homogeneous refractive index or a heterogeneous refractive index. In the case of a heterogeneous refractive index, the exemplary ranges disclosed previously may hold for the mean refractive index of each layer.

The chemical composition of exemplary materials for the substrate may be selected to fulfil one or more of the previously described physical requirements.

Exemplary materials for the substrate are glass or polymer.

Exemplary glasses as categorized by the Abbe diagram are glasses having a refractive index of 1.6 or more such as dense flint glasses, lanthanum flint glasses, dense lanthanum flint glasses, barium flint glasses, dense barium flint glasses, dense crown glasses, lanthanum crown glasses, extra dense crown glasses.

In some embodiments, an exemplary glass for the substrate is a niobium phosphate glass.

In some embodiments, an exemplary glass for the substrate is a lanthanum borate glass.

In some embodiments, an exemplary glass for the substrate is a bismuth oxide glass.

In some embodiments, an exemplary glass for the substrate is a silicate based glass.

An exemplary glass group comprises one or more selected from the group consisting of: niobium phosphate glasses, lanthanum borate glasses, bismuth oxide glasses, silicate glasses whereas silicate glasses may contain one or more of $TiO_2$, $La_2O_3$, $Bi_2O_3$, $Gd_2O_3$, $Nb_2O_5$, $Y_2O_3$, $Yb_2O_3$, $Ta_2O_5$, $WO_3$, $GeO_2$, $Ga_2O_3$, $ZrO_2$, BaO, SrO, ZnO, $Cs_2O$ and PbO.

An exemplary silicate based glass comprises at least 30 wt. % $SiO_2$, such as at least 40 wt. % $SiO_2$ or at least 50 wt. % $SiO_2$. An exemplary silicate glass comprises at most 80 wt. % $SiO_2$, such as at most 70 wt. % or at most 60 wt. %. An exemplary silicate based glass comprises $SiO_2$ in a range from 30 to 80 wt. %, such as in a range from 40 to 70 wt. % or in a range from 50 to 60 wt. %. An exemplary silicate based glass comprises one or more selected from the group consisting of: $TiO_2$, $La_2O_3$, $Bi_2O_3$, $Gd_2O_3$, $Nb_2O_5$, $Y_2O_3$, $Yb_2O_3$, $Ta_2O_5$, $WO_3$, $GeO_2$, $Ga_2O_3$, $ZrO_2$, BaO, SrO, ZnO, $Cs_2O$ and PbO, which may be in a total amount of at least 20 wt. %, such as at least 30 wt. %, at least 40 wt. %, or at least 50 wt. %. An exemplary silicate based glass might comprise one or more selected from the group consisting of: $TiO_2$, $La_2O_3$, $Bi_2O_3$, $Gd_2O_3$, $Nb_2O_5$, $Y_2O_3$, $Yb_2O_3$, $Ta_2O_5$, $WO_3$, $GeO_2$, $Ga_2O_3$, $ZrO_2$, BaO, SrO, ZnO, $Cs_2O$ and PbO in a total amount of as much as 70 wt. %.

In some embodiments, an exemplary glass is commercially available from SCHOTT under one of the following names: N-SF66, P-SF67, P-SF68, N-BASF64, N-SF1, N-SF6, N-SF8, N-SF15 and N-SF57, from Sumita under the name K-PSFn214, from OHARA under the name L-BBH1, and HOYA TaFD55.

An exemplary polymer in this context is a plastic.

Exemplary polymers in this context are polycarbonates (PC) such as Lexan® or Merlon®, polystyrenes (PS) such as Styron® or Lustrex®, acrylic polymers (PMMA) such as Lucite®, Plexiglass® or Polycast®, polyetherimides (PEI) such as Ultem® or Extem®, polyurethanes (PU) such as Isoplast®, cyclic olefin copolymers (COC) such as Topas®, cyclic olefin polymer (COP) such as Zeonex® or Zeonor®, polyesters, such as OKP4 and OKP4HP, polyethersulfones (PES) such as Radel®, and HTLT®. One exemplary polymer material is allyl diglycol carbonate (such as CR-39). One exemplary polymer material is urethane based.

Exemplary optoceramics are yttrium aluminium granate (YAG, $Y_3Al_5O_{12}$) and variants thereof, luthetium aluminium granate (LuAG), optoceramics with cubic pyrochloric structure or fluorite structure as described in DE 10 2007 022 048 A1 or zinc sulfide.

Exemplary crystals are sapphire, anatas, rutile, diamond, zinc sulfide and spinell.

Coating

An exemplary coating is suitable for reducing reflection of light incident on the optical layered composite. In the case of a coating applied to the front face, the coating is suitable for reducing reflection of light at the front face. In the case of a coating applied to the back face, the coating is suitable for reducing reflection of light at the back face.

An exemplary coating reduces impairment of light propagation in the substrate, such as reduces impairment of transverse propagation of light in the substrate.

An exemplary coating layer is laminar or planar. The coating may extend in a plane parallel to that of the substrate.

The coating may coat at least 80% of the front face by area, such as at least 90%, at least 95%, at least 99%, or all of the front face.

A coating comprises one or more coating layers. The coating may be made as a stack of coating layers, which may be arranged as a stack of co-planar laminas.

The thickness of the coating may be determined normal to the front face.

An exemplary coating produces a low reflectance region.

An exemplary low reflectance region is over the range from 450 to 650 nm. The maximum reflectance in the range from 450 to 650 nm may be not more than 50% of the maximum reflectance in the range from 450 to 650 nm for the uncoated substrate, such as not more than 40% or not more than 30%.

The maximum reflectance in the range from 450 to 650 nm may be less than 5%, such as less than 4%, less than 3%, less than 2%, less than 1.5%, or less than 1.1%.

An exemplary low reflectance region covers a broad wavelength range. There may be a region of width of at least 175 nm, such as at least 200 nm, at least 225 nm, or at least 250 nm, in which the maximum reflectance minus the minimum reflectance is less than 1%.

An exemplary low reflectance region is flat. The maximum reflectance in the range from 450 to 650 nm minus the minimum reflectance in the range from 450 to 650 nm may be less than 1.5%, such as less than 1.0% or less than 0.8%.

Exemplary coatings are amorphous. Exemplary coatings are made of amorphous materials. Exemplary coatings are non-crystalline. Exemplary coatings do not have long-range order. Exemplary coatings do not exhibit columnar growths. Exemplary coatings do not exhibit porous growths. Exemplary coatings do not exhibit textured growths. An exemplary coating has not more than 25 vol. %, such as not more than 10 vol. % or not more than 5 vol. % crystalline content. In some embodiments, the coating does not contain crystalline material. In some embodiments, the coating does not contain any columnar growths. In some embodiments, the coating does not contain any porous growths. In some embodiments, the coating does not contain any textured growths. The presence of columnar growths and the presence of textured growths may each be determined by inspection of a cross-sectional cut surface using a scanning electron microscope. The presence of crystalline material may be determined by Raman spectroscopy.

Coating Layers

The coating comprises one or more coating layers. Coating layers may be arranged in a stack with each coating layer parallel to the front face.

An exemplary coating layer has a chemical composition which either does not vary through its interior or varies smoothly and continuously through its interior. An exemplary coating layer either has a homogeneous chemical composition or a smoothly and continuously varying chemical composition. An exemplary coating layer has a chemical composition in which the maximum local wt. % of an element is less than 1.2 times the minimum local wt. % of the element, such as less than 1.1 or less than 1.05. This may apply for each element.

An exemplary coating layer has a refractive index which either does not vary through its interior or varies smoothly and continuously through its interior. An exemplary coating layer either has a homogeneous refractive index or a smoothly and continuously varying refractive index. An exemplary coating layer has a maximum local refractive index which is less than 1.2 times the minimum local refractive index, such as less than 1.1 or less than 1.05.

An exemplary coating layer has a constant thickness across its transverse extension.

An exemplary coating layer has a ratio of smallest thickness to largest thickness in the range from 1:1 to 1:1.1, such as in the range from 1:1 to 1:1.05 or in the range from 1:1 to 1:1.01.

In some embodiments, the coating comprises one or more coating layers of group A. Coating layers of group A have a refractive index of at least 1.7. An exemplary coating layer of group A has a refractive index in the range from 1.70 to 2.60, such as in the range from 1.80 to 2.60, from 1.90 to 2.50, or from 1.95 to 2.45. An exemplary coating layer of group A has a refractive index of at least 1.80, such as at least 1.90 or at least 1.95. An exemplary coating layer of group A has a refractive index up to 2.60, such as up to 2.50 or up to 2.45. An exemplary coating layer of group A is made of a material selected from the group consisting of: $Si_3N_4$, $ZrO_2$, $Ta_2O_5$, $HfO_2$, $Nb_2O_5$, $TiO_2$, $SnO_2$, indium tin oxide, $ZnO_2$, AlN, a mixed oxide comprising at least one thereof, a mixed nitride comprising at least one thereof and a mixed oxynitride comprising at least one thereof; which may be made of a material selected from the group consisting of $ZrO_2$, $Ta_2O_5$, $HfO_2$, $Nb_2O_5$, $TiO_2$. and a mixed oxide comprising at least one thereof. In some embodiments, the coating layer is made of $ZrO_2$, or $HfO_2$. In some embodiments, the coating layer is made of $ZrO_2$, $TiO_2$ or $Nb_2O_5$. Exemplary mixed oxides are $TiO_2/SiO_2$; $Nb_2O_5/SiO_2$ and $ZrO_2/Y_2O_3$. An exemplary mixed nitride is AlSiN. An exemplary mixed oxynitride is AlSiON.

In some embodiments, the optical layered composite comprises two or more layers of group A, wherein at least one pair of the group A layers are of different materials. In some embodiments, the optical layered composite comprises two or more layers of group A, wherein all of the group A layers are of the same material.

In some embodiments, the coating comprises one or more coating layers of group B. Coating layers of group B have a refractive index less than 1.7. An exemplary coating layer of group B has a refractive index in the range from 1.37 to 1.60, such as from 1.37 to 1.55 or from 1.38 to 1.50. An exemplary coating layer of group B has a refractive index of at least 1.37, such as at least 1.38. An exemplary coating layer of group B has a refractive index of up to 1.60, such as up to 1.55 or up to 1.50.

An exemplary coating layer of group B is made of a material selected from the group consisting of: $SiO_2$, $MgF_2$ and a mixed oxide comprising $SiO_2$ and a further oxide, such as $SiO_2$ or $MgF_2$. An exemplary mixed oxide in this context comprises $SiO_2$ and $Al_2O_3$. An exemplary mixed oxide in this context comprises $SiO_2$ in the range from 50 to 98 wt. %, such as from 60 to 95 wt. % or from 70 to 93 wt. %. An exemplary mixed oxide in this context comprises $SiO_2$ up to 98 wt. %, such as up to 95 wt. % or up to 93 wt. %. An exemplary mixed oxide in this context comprises at least 50 wt. % $SiO_2$, such as at least 60 wt. % or at least 70 wt. %. An exemplary mixed oxide in this context comprises $SiO_2$ in the range from 50 to 98 wt. %, such as from 60 to 95 wt. % or from 70 to 93 wt. % and $Al_2O_3$ in the range from 2 to 50 wt. %, such as from 5 to 40 wt. % or from 7 to 30 wt. %.

In some embodiments, the optical layered composite comprises two or more layers of group B, wherein at least one pair of the group B layers are of different materials. In some embodiments, the optical layered composite comprises two or more layers of group B, wherein all of the group B layers are of the same material.

In some embodiments, the coating structure is described in terms of regions of type A and type B, wherein regions of type A have a higher refractive index and regions of type B have a lower refractive index. So-called needle layers having a thickness of 5 nm or less do not influence the nature of a region as type A or B. Regions are characterized based on coating layers having a thickness of above 5 nm.

So-called needle layers might have a thickness of as low as 1 nm. A so-called needle layer could be as thin as an atomic mono-layer.

Layer Arrangements

Some exemplary layer arrangements are the following:

S-b having a substrate followed by a coating layer of group B. The coating layer has a thickness of more than 5 nm. Optionally, further layers of thickness 5 nm or less are present.

S-B having a substrate followed by a region of group B. The region is as defined elsewhere herein.

S-a-b having a substrate followed by a coating layer of group A, followed by a coating layer of group B. Each of the two coating layers have a thickness of more than 5 nm. Optionally, further layers of thickness 5 nm or less are present.

S-A-B having a substrate followed by a region of group A, followed by a region of group B. The regions are as defined elsewhere herein.

S-b-a-b having a substrate followed by a coating layer of group B, followed by a coating layer of group A, followed by a coating layer of group B. Each of the three coating layers have a thickness of more than 5 nm. Optionally, further layers of thickness 5 nm or less are present.

S-B-A-B having a substrate followed by a region of group B, followed by a region of group A, followed by a region of group B. The regions are as defined elsewhere herein.

S-a-b-a-b having a substrate followed by a coating layer of group A, followed by a coating layer of group B, followed by a coating layer of group A, followed by a coating layer of group B. Each of the four coating layers have a thickness of more than 5 nm. Optionally, further layers of thickness 5 nm or less are present.

S-A-B-A-B having a substrate followed by a region of group A, followed by a region of group B, followed by a region of group A, followed by a region of group B. The regions are as defined elsewhere herein.

S-b-a-b-a-b having a substrate followed by a coating layer of group B, followed by a coating layer of group A, followed by a coating layer of group B, followed by a coating layer of group A, followed by a coating layer of group B. Each of the five coating layers have a thickness of more than 5 nm. Optionally, further layers of thickness 5 nm or less are present.

S-A-B-A-B having a substrate followed by a region of group B, followed by a region of group A, followed by a region of group B, followed by a region of group A, followed by a region of group B. The regions are as defined elsewhere herein.

S-a-b-a-b-a-b having a substrate followed by a coating layer of group A, followed by a coating layer of group B, followed by a coating layer of group A, followed by a coating layer of group B, followed by a coating layer of group A, followed by a coating layer of group B. Each of the six coating layers have a thickness of more than 5 nm. Optionally, further layers of thickness 5 nm or less are present.

S-A-B-A-B-A-B having a substrate followed by a region of group A, followed by a region of group B, followed by a region of group A, followed by a region of group B, followed by a region of group A, followed by a region of group B. The regions are as defined elsewhere herein.

S-b-a-b-a-b-a-b having a substrate followed by a coating layer of group B, followed by a coating layer of group A, followed by a coating layer of group B, followed by a coating layer of group A, followed by a coating layer of group B, followed by a coating layer of group A, followed by a coating layer of group B. Each of the seven coating layers have a thickness of more than 5 nm. Optionally, further layers of thickness 5 nm or less are present.

S-B-A-B-A-B-A-B having a substrate followed by a region of group B, followed by a region of group A, followed by a region of group B, followed by a region of group A, followed by a region of group B, followed by a region of group A, followed by a region of group B. The regions are as defined elsewhere herein.

S-a-b-a-b-a-b-a-b having a substrate followed by a coating layer of group A, followed by a coating layer of group B, followed by a coating layer of group A, followed by a coating layer of group B, followed by a coating layer of group A, followed by a coating layer of group B, followed by a coating layer of group A, followed by a coating layer of group B. Each of the eight coating layers have a thickness of more than 5 nm. Optionally, further layers of thickness 5 nm or less are present.

S-A-B-A-B-A-B-A-B having a substrate followed by a region of group A, followed by a region of group B, followed by a region of group A, followed by a region of group B, followed by a region of group A, followed by a region of group B, followed by a region of group A, followed by a region of group B. The regions are as defined elsewhere herein.

Coupling and Decoupling

An exemplary coupling device is suitable for introducing light into the optical layered composite, such as for introducing an image into the optical layered composite, which may be an overlaid image. An exemplary decoupling device is suitable for removing light from the optical layered composite, such as for removing an image from the optical layered composite, which may be an overlaid image.

In some embodiments, a coupling device is provided for introducing an overlaid image into the optical layered composite. In some embodiments, a coupling device is provided for introducing an image into the optical layered composite for transverse propagation.

In some embodiments, a decoupling device is provided for removing an overlaid image from the optical layered composite, such as out of the back face. In some embodiments, a decoupling device is provided for removing an image from the optical layered composite, wherein the image is propagating in a transverse direction.

In some embodiments, no coupling or decoupling device is provided for the real world image.

In some embodiments, a coupling device is provided for introducing light into the optical layered composite.

In some embodiments, a de-coupling device is provided for taking light out of the optical layered composite.

Exemplary coupling device are a prism or a diffraction grating.

Coupling and decoupling device may be integrated into the optical layered composite or provide externally to it, such as attached to it.

In some embodiments the optical layered composite comprises more decoupling device than coupling device.

In some embodiments light coupled in by a single coupling device is decoupled by two or more decoupling device.

In some embodiments, the optical layered composite comprises two or more decoupling device and each decoupling device corresponds to a pixel of an image.

A coupling device may be present at the front, side or rear of the optical layered composite, such as at the rear or at the side.

A decoupling device may be present on the back side of the optical layered composite.

Coupling may comprise deviation of light by an angle in the range from 30 to 180°, such as in the range from 45 to 180°, in the range from 90 to 180°, or in the range from 135 to 180°. Coupling may comprise deviation of light by an angle of at least 30°, such as at least 45°, at least 90°, or at least 135°.

Decoupling may comprise deviation of light by an angle in the range from 30 to 180°, such as in the range from 45 to 135°, in the range from 60 to 120°, or in the range from 70 to 110°. Decoupling may comprise deviation of light by an angle of at least 30°, such as at least 45°, at least 60°, or at least 70°. Decoupling may comprise deviation of light by an angle up to 180°, such as up to 135°, up to 120°, or up to 110°.

Process

The optical layered composite can be prepared by any method known to the skilled person and which is considered suitable. Exemplary methods comprise physical vapor deposition. Exemplary physical vapor deposition is sputtering or evaporation. An exemplary physical vapor deposition is oxidative physical vapor deposition.

The process may comprise a cleaning step, such as of the front face. An exemplary cleaning step may comprise ultrasound. An exemplary cleaning step may involve water; an alkaline cleaner, such as one having a pH in the range from 7.5 to 9; or a pH neutral cleaner other than water.

Coating layers may be deposited at a rate in the range from 0.5 to 10 Å/s, such as in the range from 0.75 to 8 Å/s or in the range from 1 to 5 Å/s. Coating layers may be deposited at a rate of at least 0.5 Å/s, such as at least 0.75 Å/s or at least 1 Å/s. Coating layers may be deposited at a rate of up to 10 Å/s, such as up to 8 Å/s or up to 5 Å/s.

Physical vapor deposition may be performed with a substrate temperature in the range from 110 to 250° C., such as in the range from 120 to 230° C. or in the range from 140 to 210° C. Physical vapor deposition may be performed with a substrate temperature of at least 110° C., such as at least 120° C. or at least 140° C. Physical vapor deposition may be performed with a substrate temperature up to 250° C., such as up to 230° C. or up to 210° C.

In the case of polymer substrates, lower deposition ranges may be used such as from 100 to 150° C.

Physical vapor deposition may be performed under a pressure of less than $1 \times 10^{-2}$ Pa, such as less than $5 \times 10^{-3}$ Pa or less than $3 \times 10^{-3}$ Pa.

Device

In some exemplary embodiments provided according to the present invention, a device comprises one or more optical layered composites provided according to the present invention.

A device may comprise 2 or more optical layered composites provided according to the present invention. Optical layered composites may be spaced. An exemplary spacing is in the range from 600 nm to 1 mm, such as in the range from 5 μm to 500 μm or in the range from 50 μm to 400 nm. An exemplary spacing is at least 600 nm, such as at least 5 μm or at least 50 μm. An exemplary spacing is up to 1 mm, such as up to 500 μm or up to 400 nm. In a device comprising 2 or more optical layered composites, the optical layered composites may be adapted and arranged for different wavelengths of light.

In some embodiments, three optical layered composites are provided for propagating red, green and blue light respectively. In some embodiments, an optical layered composite is provided for propagating light having a wavelength in the range from 564 to 580 nm. In some embodiments, an optical layered composite is provided for propagating light having a wavelength in the range from 534 to 545 nm. In some embodiments, an optical layered composite is provided for propagating light having a wavelength in the range from 420 to 440 nm.

The device may comprise a projector for projecting an image into the optical layered composite via a coupling device.

In-Plane Optical Losses

Some aspects of the present invention relates to a method for determining in-plane optical loss through target. The method may comprise passing light through the target and measuring intensity of scattered light, such as at a position perpendicularly displaced from the path of the light through the target. The method may comprise fitting an exponential decay to the intensity of scattered light with respect to path length through the target. A light trap may be located at the end of the path length through the target.

In some exemplary embodiments provided according to the present invention, a process for selecting an optical layered composite comprises the following steps:
  providing two or more optical layered composites;
  determining the in-plane optical loss of the optical layered composites according to the method described herein; and
  selecting one or more of the optical layered composites.

Referring now to the drawings, FIG. 1 illustrates an exemplary embodiment of an optical layered composite provided according to the present invention having a substrate and 4 coating layers. The optical layered composite 100 comprises a substrate 101 having a front face and a back face. The direction 107 emanates from the front face and the direction 106 emanates from the back face. On the front face is applied a coating consisting of a first coating layer 102, a second coating layer 103, a third coating layer 104 and a fourth coating layer 105.

Figure 2:
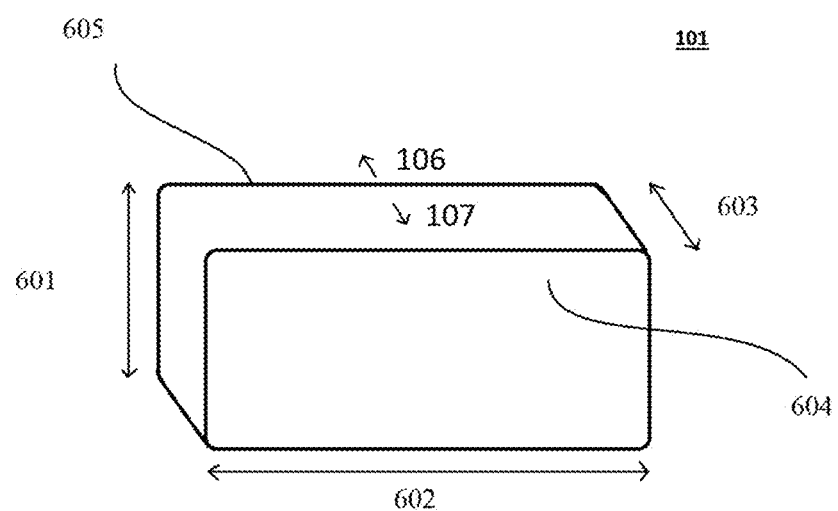
FIG. 2 illustrates an exemplary embodiment of a substrate employed according to the present invention.

FIG. 2 illustrates an exemplary embodiment of a substrate employed in the present invention. The substrate 101 has a front face 604, a back face 605. The direction 107 emanates from the front face 604 and is perpendicular to it. The direction 106 emanates from the back face 605 and is perpendicular to it. The substrate has a length 602 and width 601, each parallel to the front face. The substrate has a thickness 603 determined perpendicular to the front face 604.

Figure 3:
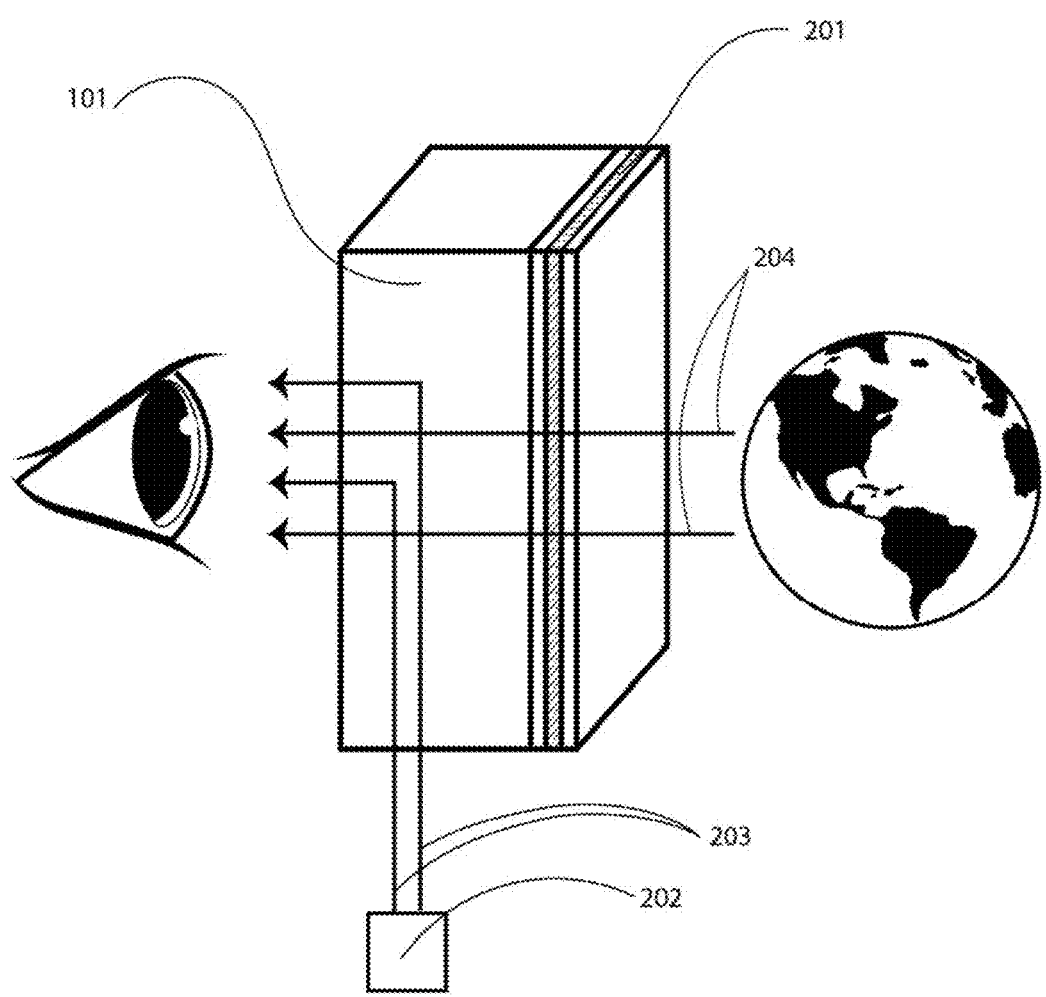
FIG. 3 illustrates an exemplary embodiment of an optical layered composite provided according to the present invention with side coupling of an overlaid image.

FIG. 3 illustrates an exemplary embodiment of an optical layered composite provided according to the present invention with side coupling of an overlaid image. The optical layered composite has a substrate 101 having a front face and a back face. On the front face of the substrate 101 is applied a coating 201. A real world image 204 enters the optical layered composite through the front face, piercing the coating 201 and the substrate 101, to pass out of the back face. An overlaid image 203 is generated at a projector 202, positioned to the side of the optical layered composite, and passes through the optical layered composite transverse to the front face to then exit through the back face. The real world image 204 and the overlaid image 203 are both viewed by a viewer located behind the back face. In some embodiments, the coating 201 may be applied to the back face rather than the front face. In some embodiments, coatings 201 are applied to both the back face and the front face. Not shown are decoupling device on the back face, for example diffraction gratings. Where a coating is present on the back face, the decoupling device may be located between the substrate and the coating.

Figure 4:
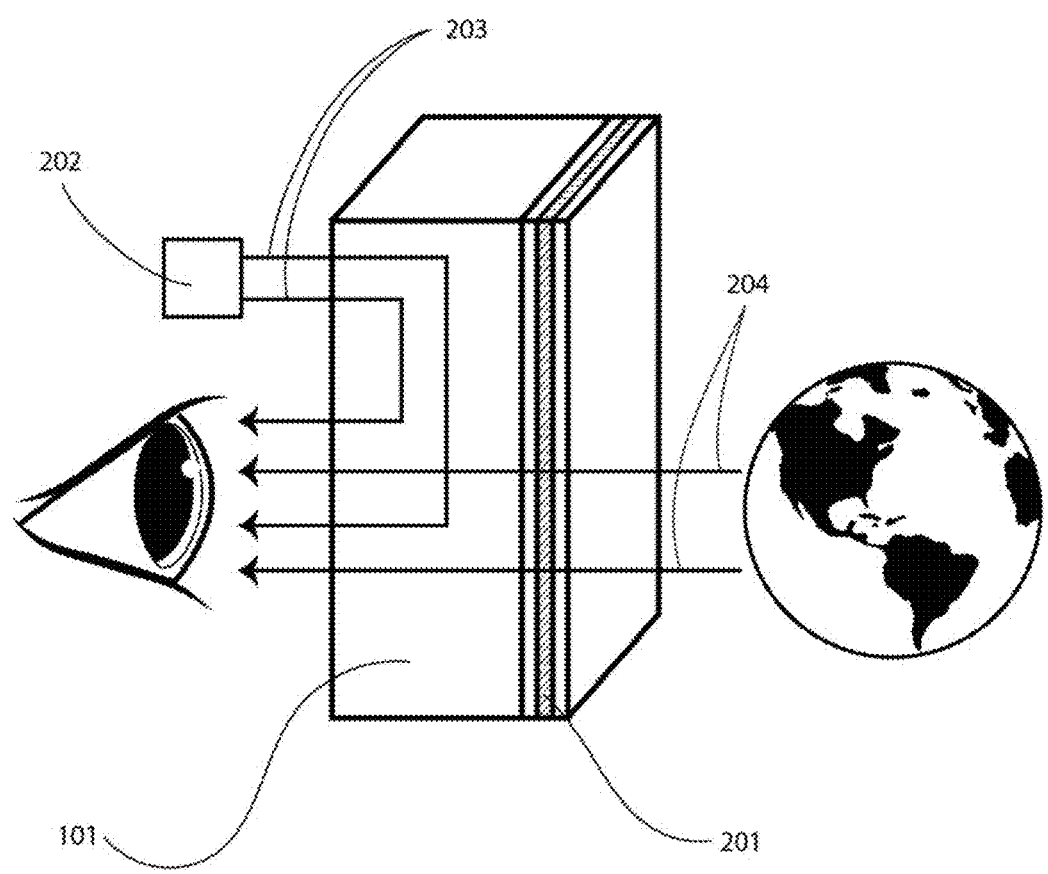
FIG. 4 illustrates an exemplary embodiment of an optical layered composite provided according to the present invention with back side coupling of an overlaid image.

FIG. 4 illustrates an exemplary embodiment of an optical layered composite provided according to the present invention with back side coupling of an overlaid image. The optical layered composite has a substrate 101 having a front face and a back face. On the front face of the substrate 101 is applied a coating 201. A real world image 204 enters the optical layered composite through the front face, piercing the coating 201 and the substrate 101, to pass out of the back face. An overlaid image 203 is generated at a projector 202, positioned at the back of the optical layered composite, and passes through the optical layered composite transverse to the front face to then exit through the back face. The real world image 204 and the overlaid image 203 are both viewed by a viewer located behind the back face. In some embodiments, the coating 201 may be applied to the back face rather than the front face. In some embodiments, coatings 201 are applied to both the back face and the front face. Not shown are decoupling device on the back face, for example diffraction gratings. Where a coating is present on the back face, the decoupling device may be located between the substrate and the coating.

Figure 5:
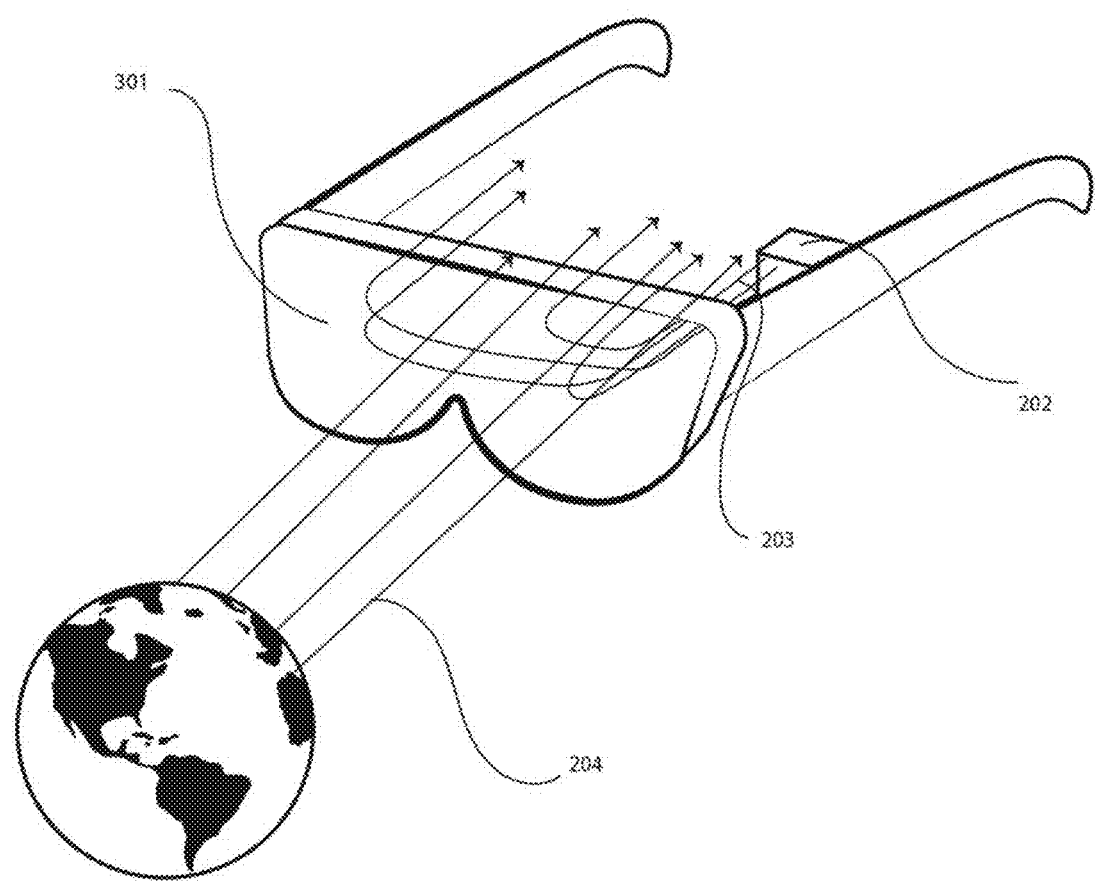
FIG. 5 illustrates an exemplary embodiment of an AR device provided according to the pre-sent invention.

FIG. 5 illustrates an exemplary embodiment of an AR device provided according to the present invention. A set of glasses/visor has a screen 301 comprising the optical layered composite provided according to the present invention. A real world image 204 penetrates the screen 301 from the front side to reach the back side. An overlaid image 203 is projected from a projector 202 located behind the screen 301. The overlaid image 203 propagates within the plane of the screen 301 and exits through its back face. Both the real world image 204 and the overlaid image 203 are received behind the back face.

Figure 6:
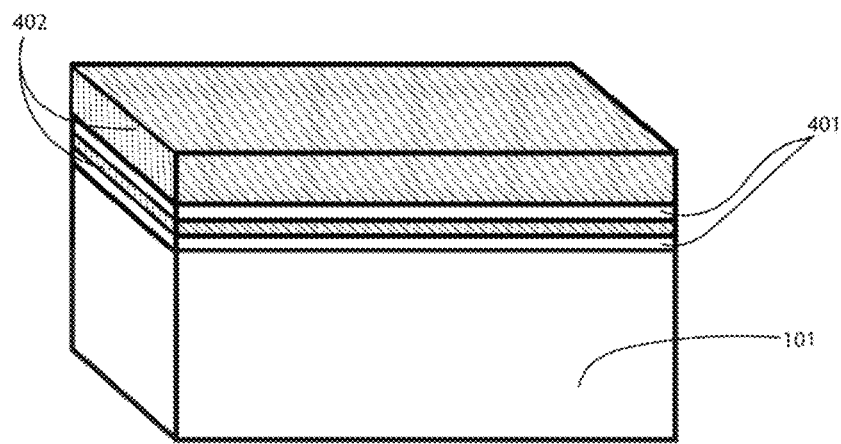
FIG. 6 illustrates an exemplary embodiment of an optical layered composite provided according to the present invention having a 4 layer coating.

FIG. 6 illustrates an exemplary embodiment of an optical layered composite provided according to the present invention having a 4 layer coating. The optical layered composite has a substrate 101 having a front face being directed upwards in the diagram and an opposite back face. To the front face is applied in order a high refractive index layer 401, a low refractive index layer 402, a high refractive index layer 401 and a low refractive index layer 402. In this case, the final layer 402 is thicker than the other layers. From another perspective, the final layer 402 is thicker than the preceding layer 401. Each of the layers 401 or 402 in this case is thicker than 5 nm. Optionally, further needle layers having a thickness of 5 nm or less could be located between or within the layers. FIG. 6 can also depict an optical layered composite comprising high refractive index regions of type A 401 and low refractive regions of type B 402.

Figure 7:
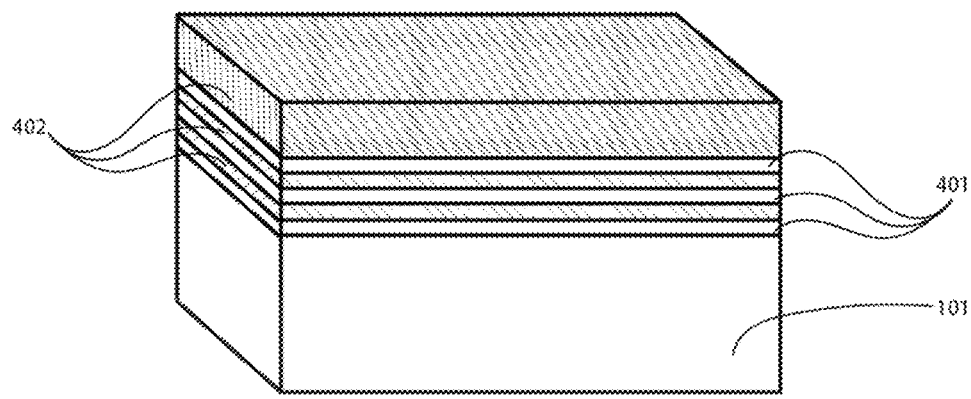
FIG. 7 illustrates an exemplary embodiment of an optical layered composite provided according to the present invention having a 6 layer coating.

FIG. 7 illustrates an exemplary embodiment of an optical layered composite provided according to the present invention having a 6 layer coating. The optical layered composite has a substrate 101 having a front face being directed upwards in the diagram and an opposite back face. To the front face is applied in order a high refractive index layer 401, a low refractive index layer 402, a high refractive index layer 401, a low refractive index layer 402, a high refractive index layer 401 and a low refractive index layer 402. In this case, the final layer 402 is thicker than the other layers. Each of the layers 401 or 402 in this case is thicker than 5 nm. Optionally, further needle layers having a thickness of 5 nm or less could be located between or within the layers. FIG.

7 can also depict an optical layered composite comprising high refractive index regions of type A 401 and low refractive regions of type B 402.

Figure 8:
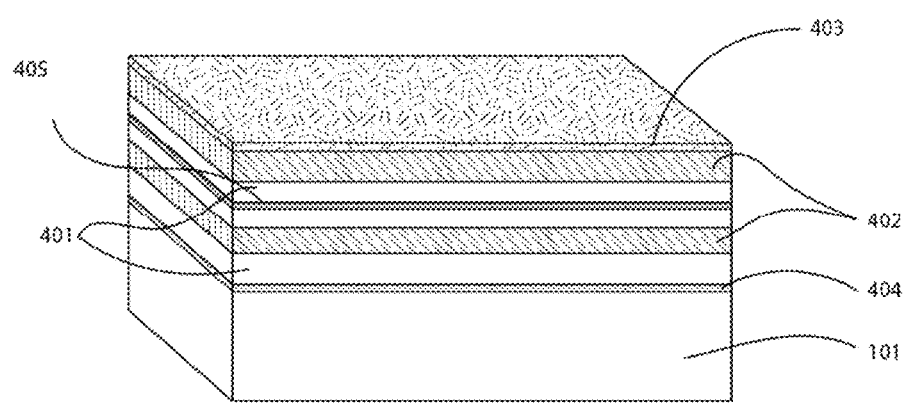
FIG. 8 illustrates an exemplary embodiment of an optical layered composite provided according to the present invention having a coating comprising so-called needle layers.

FIG. 8 illustrates an exemplary embodiment of an optical layered composite provided according to the present invention having a coating comprising so-called needle layers. The optical layered composite has a substrate 101 having a front face being directed upwards in the diagram and an opposite back face. To the front face is applied in order a needle layer having low refractive index 404, a high refractive index layer 401, a low refractive index layer 402, a high refractive layer 401 having within it a needle layer of low refractive index 405, a low refractive index layer 402 and finally a needle layer 403 having a high refractive index. FIG. 8 can also depict an optical layered composite comprising high refractive index regions of type A 401 and low refractive regions of type B 402.

Figure 9:
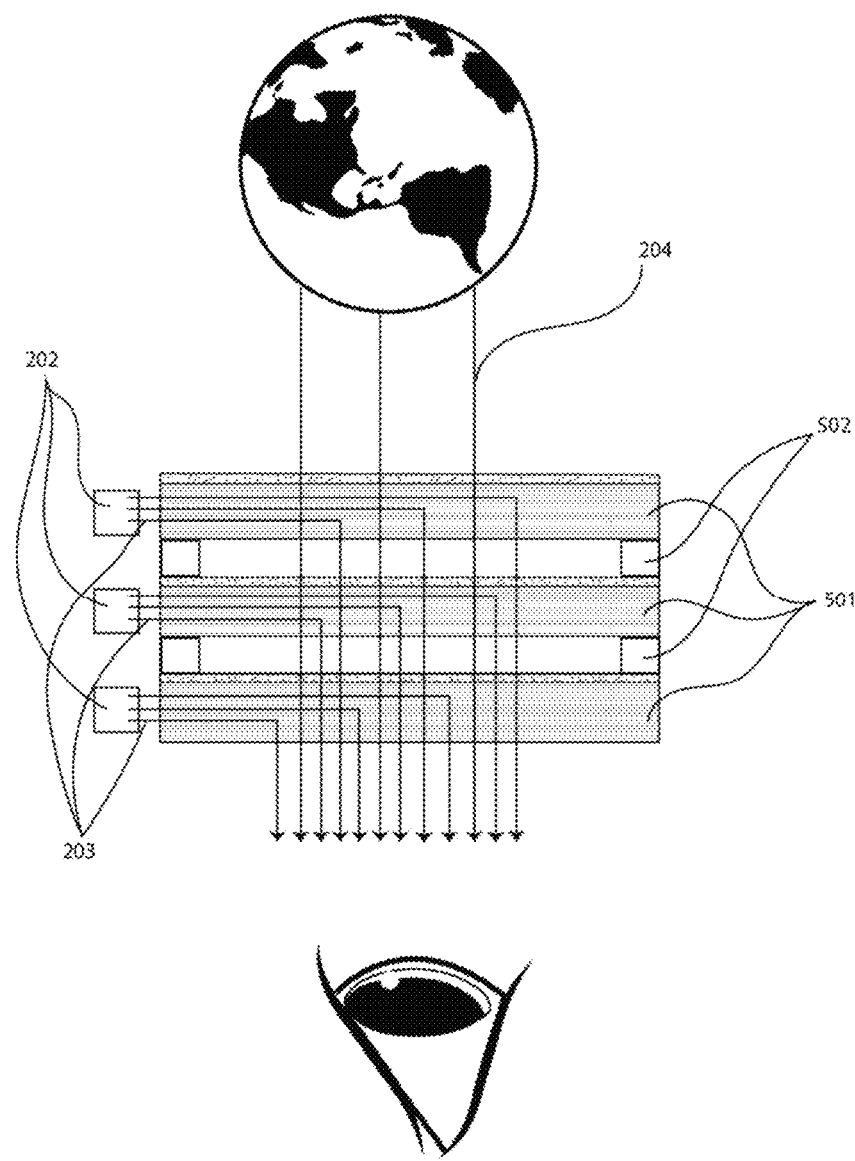
FIG. 9 illustrates an exemplary embodiment of a device comprising three optical layered composites provided according to the present invention arranged in a stack.

FIG. 9 illustrates an exemplary embodiment of a device comprising three optical layered composites provided according to the present invention arranged in a stack. The optical layered composites 501 are oriented parallel, overlapping as a stack, with their front faces in the same direction. The optical layered composites 501 are spaced by spacers 502 to leave an air gap betwixt. A real world image 204 penetrates through the optical layered composites sequentially exit through the back face of the last thereof. A separate projector 202 injects an overlaid image 203 into each of the optical layered composites. In each case, the overlaid image 203 exits the optical layered composite through the back face and combines with the real world image behind the back faces to give the augmented reality.

Figure 10:
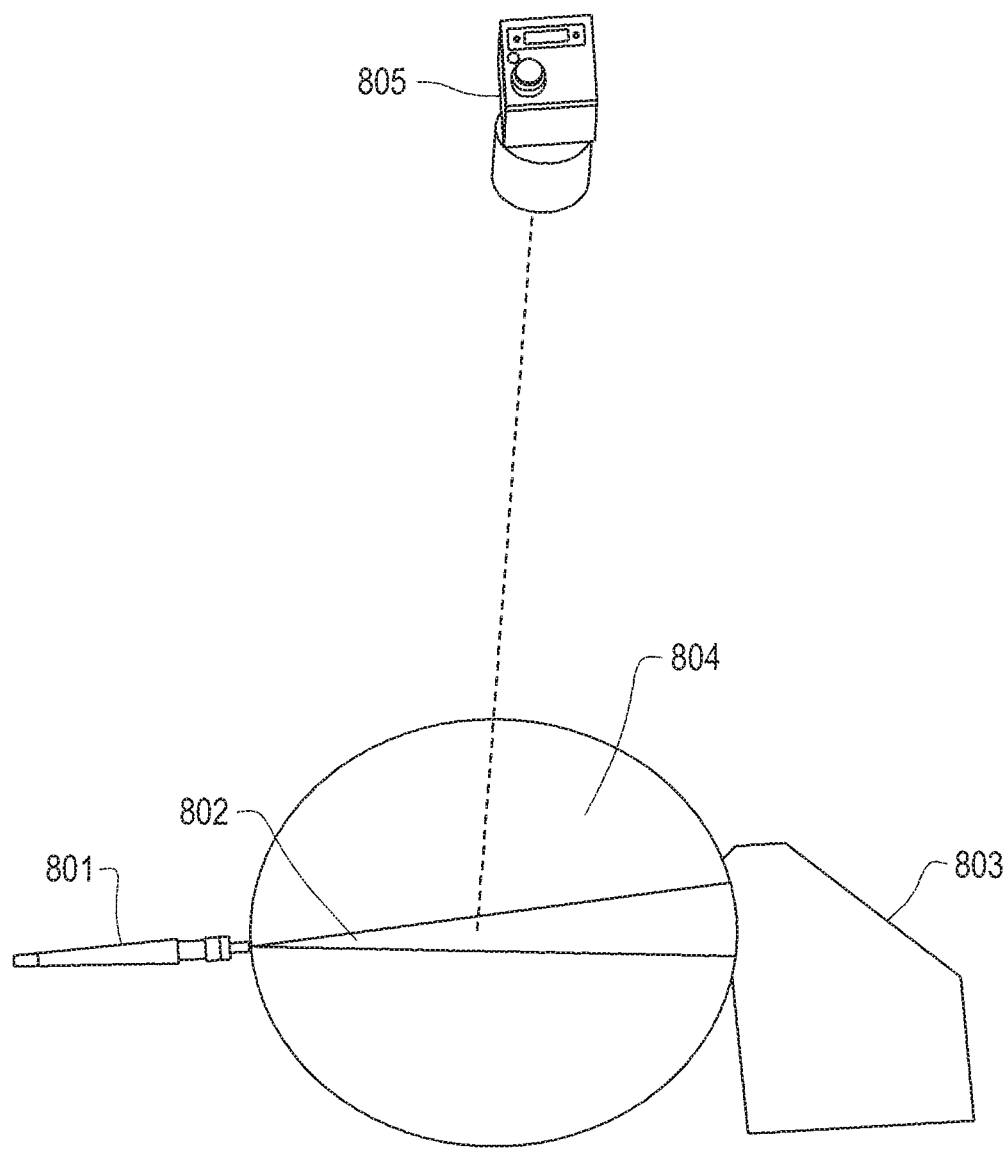
FIG. 10 illustrates an arrangement for determining in-plane optical loss of a target.

FIG. 10 illustrates an arrangement for determining in-plane optical loss of a target. The target 804 is of circular cross-section, having a diameter of 20 cm. Light is introduced into the target 804 from a light guiding FIG. 801 and follows a path 802 through the target 804. On the opposite side of the target 804 is located a light trap 803. Intensity of scattered light is measured using a camera located 50 cm above the geometric center of the target.

Figure 11:
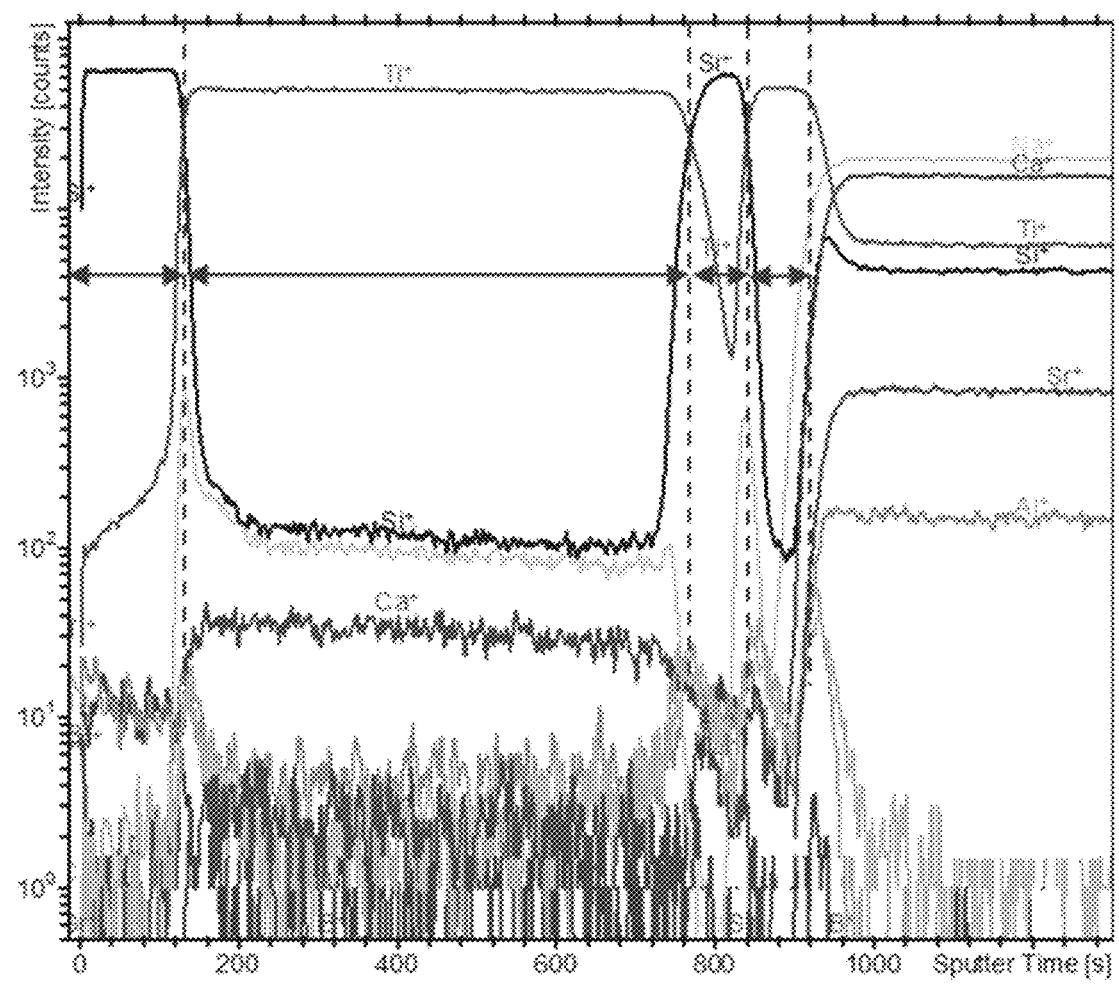
FIG. 11 illustrates a sample depth positive ion profile in the ToF SIMS test method.

FIG. 11 illustrates a sample depth positive ion profile in the ToF SIMS test method. This data is for a sample having the following coating: 14 nm $TiO_2$, 32 nm $SiO_2$, 124 nm $TiO_2$, 100 nm $SiO_2$.

Figure 12:
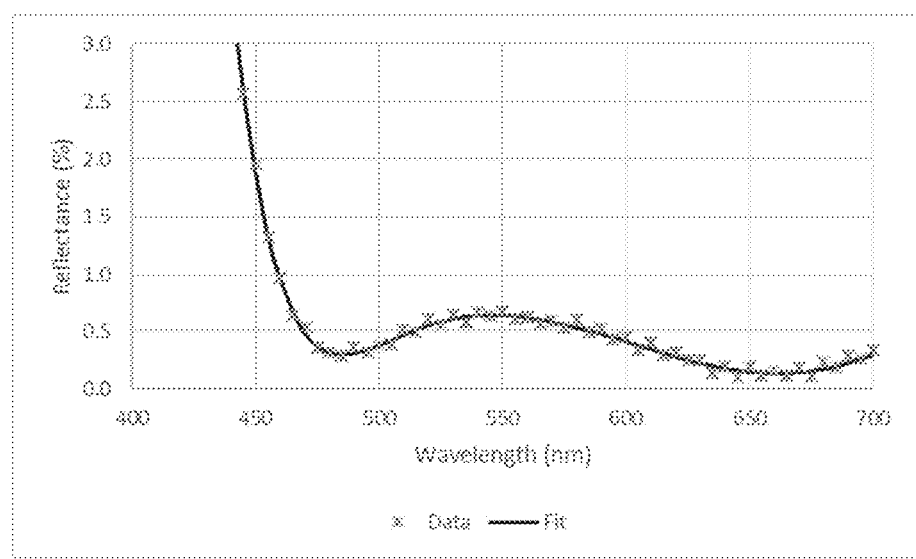
FIG. 12 illustrates sample reflectance data with a numerical fit according to the reflectance test method.

FIG. 12 illustrates sample reflectance data with a numerical fit according to the reflectance test method. This data is for a sample having the following coating: 14 nm $TiO_2$, 32 nm $SiO_2$, 124 nm $TiO_2$, 100 nm $SiO_2$.

Test Methods

Unless otherwise stated, all test methods are performed at a temperature of 25° C. and a pressure of 101,325 Pa. Unless otherwise stated, optical measurements are made using a 550 nm wavelength source.

Bow

Bow is measured according to ASTM F534

Warp

Warp is measured according to ASTM F657

In-Plane Optical Loss

The target substrate or optical layered composite is provided as a circular disk of diameter 15 cm. In the case of the optical layered composite, the front face (with the coating) is oriented upwards. A light guiding fiber having a numerical aperture of 0.15 is arranged to inject light into the target by polishing a 3 mm flat area at one side of the target and arranging the outlet face of the fiber parallel to and in physical contact with it. An immersion oil selected from the following list is deployed between the fiber and the target: Cargille Labs Series A (1.460≤n≤1.640), Cargille Labs Series B (1.642≤n≤1.700), Cargille Labs Series M (1.705≤n≤1.800), Cargille Labs Series H (1.81≤n≤2.00), Cargille Labs Series EH (2.01≤n≤2.11), Cargille Labs Series FH (2.12≤n≤2.21), Cargille Labs Series GH (2.22≤n≤2.31). The immersion oil having a refractive index closest to that of the target is selected. The light from the fiber is injected towards the geometric center of the target and travels through the target to the opposite side. The spreading is determined by the numerical aperture of 0.15. A light trap is arranged at the opposite side to reduce reflection. A CCD (charge coupled device) camera is located 50 cm above the geometric center of the target, directed towards the target. The camera takes a grey scale picture of the target. The intensity of scattered light is measured at 0.8 cm intervals along the line between the point of injection and the opposite side. Intensity of scattered light is fitted to an exponential decay curve, normalised and the value at the opposite side extrapolated to give the in-plane optical loss. Unless otherwise stated, in-plane optical loss is measured using a 450 nm wavelength light source.

The apparatus is calibrated by measuring photo current using an integrating sphere at the target's center. The image processing algorithm generates a circular region of the same size and position as the sphere's input port. The grey scale signal within this region is cumulated in order to calibrate the camera's grey scale signal to the radiometric world.

Layer Thickness and Chemical Composition

Layer thickness and chemical composition of an optical layered composite is determined using a combination of time of flight secondary ion spectroscopy (ToF-SIMS) to determine the layer arrangement and reflectometry to determine layer thicknesses. The surface is first cleaned using isopropanol and de-ionized water. Following the cleaning, clean conditions are used to avoid contamination of the sample. The ToF-SIMS measurement is conducted on the cleaned sample. ToF-SIMS depth profiles were performed using a TOF-SIMS IV-100 obtainable from ION-TOF GmbH equipped with 25 keV Ga+ primary ions. Positively and negatively charged ions were analysed in 2 consecutive analysis steps. The analysis of the positively charged ions was performed on an area of 50×50 $\mu m^2$ with a primary ion current of 2.0 pA. The sputter treatment was performed in alternating mode by an $O_2$ sputter ion gun for positive ion detection on an area of 300×300 $\mu m^2$ with an energy of 1.0 keV and a sputter current of 350 nA. For charge compensation, an electron flood gun was used. The analysis of the negatively charged ions was performed on an area of 50×50 $\mu m^2$ with a primary ion current of 1.0 pA. The sputter treatment was performed in alternating mode by a Cs+ sputter ion gun for negative ion detection on an area of 300×300 $\mu m^2$ with an energy of 0.5 keV and a sputter current of 40 nA. For charge compensation an electron flood gun was used. For data processing the software SurfaceLab 6.7 was used. An example plot in the case of 4 layer $SiO_2/TiO_2$ system is shown in FIG. 11.

Once the layer identities and ordering has been determined using ToF-SIMS, layer thicknesses are determined using surface reflectance. First, the uncoated back face surface of the sample is roughened using sand paper to get a milky appearance on the back face to avoid specular back face reflectance. A black permanent marker of the type "Edding 8750" is then used to blacken the back face. The reflectance measurement is performed using the reflectometer Lambda900 from Perkin Elmer. The tool measures the specular reflectance versus the wavelength. A spectrum is measured over the range 400 to 700 nm. A set of thickness and refractive index values for the individual layers is fit to the measured reflective curve using the TFCalc optic design software.

An example plot in the case of 4 layer SiO$_2$/TiO$_2$ system is shown in FIG. 12.

Refractive Index

The refractive index is measured by ellipsometry. First, the uncoated back face surface of the sample is roughened using sand paper to get a milky appearance on the back face to avoid specular back face reflectance. A black permanent marker of the type "Edding 8750" is then used to blacken the back face. The measurement is performed with a Woollam M-2000 under several angle of incidences: 60°, 65°, and 70°. Modelling the layers of SiO$_2$ was done by using the dispersion model after "Sellmeier", modelling the layers of TiO$_2$ was done using the dispersion model after "Cody-Lorentz". Substrate data was taken from the database.

Roughness

Surface roughness is measured using an atomic force microscope, model DI nanoscope D3100-S1 from Digital Instruments. An area of the sample of 2 μm by 2 μm is scanned in tapping mode, scanning the area with 256 lines per picture and 256 dots per line. The scan rate is 0.7 Hz. The cantilever has a tip with a tip radius of ≤10 nm. The sample's topography is measured by evaluating the change of the amplitude of the oscillating cantilever when scanning the surface. The raw data is leveled by a line fit, using a 3$^{rd}$ order polynomial fit. The root mean squared roughness R$_{rms}$ is calculated by the AFM's software using the formula $$R_{rms} = \sqrt{\frac{1}{n}\sum_{i=1}^{n} y_i^2},$$

where n=256*256=65536 and y$_i$ is the height value at each of the 65536 measured positions.

EXAMPLES

Exemplary embodiments provided according to the present invention are described further herein.

Example 1

Optical layered composites having a coating of 1 layer (Table 2), 2 layers (Table 3), 3 layers (Table 4), 4 layers (Table 5), 5 layers (Table 6), 6 layers (Table 7), 7 layers (Table 8) or 8 layers (Table 9) were prepared as follows: Firstly, a 300 μm thick circular wafer of diameter 150 mm wafer was provided. The material is according to the table and is available from Schott AG. A front face of the wafer was cleaned in a bath of de-ionised water at 40° C. with ultrasound at 130 kHz for 200 seconds. The wafer was then dried with air at 60° C. for 500 seconds. A surface almost entirely devoid of impurity particles thereon was obtained. The wafer was mounted on the evaporation dome in the vacuum chamber of a Leybold APS 1104 and the evaporation machine was charged with the appropriate coating materials. The pressure of the evacuation chamber was lowered to 1×10$^{-3}$ Pa. Layers according to Table 1 where deposited at a rate of 2.5 Å/s with an ion energy 60 eV. Refractive indices for the layer materials are given in Table 1. For each example, it was assessed whether there was a field of view obstruction and the reflectivity was determined. Results are shown in Table 10.

TABLE 1

| Material | n @450 nm | n @550 nm | n @650 nm |
| --- | --- | --- | --- |
| SiO$_2$ | 1.463 | 1.460 | 1.450 |
| MgF$_2$ | 1.382 | 1.379 | 1.377 |
| N—SF1 | 1.744 | 1.723 | 1.711 |
| N—SF6 | 1.841 | 1.812 | 1.797 |
| N—SF66 | 1.974 | 1.932 | 1.911 |
| Si$_3$N$_4$ | 2.079 | 2.050 | 2.037 |
| ZrO$_2$ | 2.197 | 2.160 | 2.149 |
| Ta$_2$O$_5$ | 2.183 | 2.141 | 2.117 |
| HfO$_2$ | 2.140 | 2.117 | 2.104 |
| Nb$_2$O$_5$ | 2.452 | 2.360 | 2.316 |
| TiO$_2$ | 2.518 | 2.410 | 2.370 |
| P—SF68 | 2.060 | 2.015 | 1.993 |
| MX1 | 2.130 | 2.065 | 2.030 |

*MX1: TiO$_2$/SiO$_2$ mixed 60/40

TABLE 2

Substrate: N—SF6

| Example | SiO$_2$ d [nm] | d$_c$ [nm] | n$_c$ (450 nm) | n$_c$ (550 nm) | n$_c$ (650 nm) |
| --- | --- | --- | --- | --- | --- |
| 1A | 96 | 96 | 1.463 | 1.460 | 1.450 |
| 1F | 65 | 65 | 1.463 | 1.460 | 1.450 |
| 1G | 55 | 55 | 1.463 | 1.460 | 1.450 |

TABLE 3a

Substrate: N-SF6

| Example | Nb$_2$O$_5$ d [nm] | SiO$_2$ d [nm] | d$_c$ [nm] | n$_c$ (450 nm) | n$_c$ (550 nm) | n$_c$ (650 nm) |
| --- | --- | --- | --- | --- | --- | --- |
| 3A | 16 | 111 | 128 | 1.590 | 1.576 | 1.562 |
| 3F | 16 | 90 | 106 | 1.616 | 1.599 | 1.584 |
| 3G | 16 | 80 | 96 | 1.632 | 1.613 | 1.598 |

TABLE 3b

Substrate: N-SF6

| Example | MX1 d [nm] | SiO$_2$ d [nm] | d$_c$ [nm] | n$_c$ (450 nm) | n$_c$ (550 nm) | n$_c$ (650 nm) | d$_{crit}$ (450 nm) | d$_{crit}$ (550 nm) | d$_{crit}$ (650 nm) |
| --- | --- | --- | --- | --- | --- | --- | --- | --- | --- |
| 3bA | 130 | 93 | 223 | 1.852 | 1.813 | 1.788 | 258 | 1027 | |
| 3bF | 130 | 65 | 195 | 1.908 | 1.863 | 1.837 | 90 | 106 | 124 |
| 3bG | 130 | 55 | 185 | 1.932 | 1.885 | 1.858 | 74 | 85 | 96 |

TABLE 4

Substrate: N-SF6

| Example | SiO$_2$ d [nm] | HfO$_2$ d [nm] | SiO$_2$ d [nm] | d$_c$ [nm] | n$_c$ (450 nm) | n$_c$ (550 nm) | n$_c$ (650 nm) |
|---|---|---|---|---|---|---|---|
| 5A | 13 | 27 | 104 | 144 | 1.588 | 1.581 | 1.571 |
| 5B | 39 | 13 | 10 | 62 | 1.608 | 1.601 | 1.590 |
| 5F | 12 | 25 | 80 | 117 | 1.608 | 1.600 | 1.590 |
| 5G | 13 | 27 | 70 | 110 | 1.627 | 1.619 | 1.608 |

TABLE 5a

Substrate: N-SF66

| Example | TiO$_2$ d [nm] | MgF$_2$ d [nm] | TiO$_2$ d [nm] | SiO$_2$ d [nm] | d$_c$ [nm] | n$_c$ (450 nm) | n$_c$ (550 nm) | n$_c$ (650 nm) | d$_{crit}$ (450 nm) | d$_{crit}$ (550 nm) | d$_{crit}$ (650 nm) |
|---|---|---|---|---|---|---|---|---|---|---|---|
| 8A  | 33 | 20 | 34 | 101 | 188 | 1.833 | 1.792 | 1.772 |  |  |  |
| 8A2 | 65 | 13 | 14 | 70  | 162 | 1.971 | 1.917 | 1.893 |  |  |  |
| 8B  | 67 | 14 | 16 | 64  | 161 | 1.997 | 1.941 | 1.916 | 162 | 287 | 399 |
| 8D  | 74 | 17 | 12 | 58  | 161 | 2.019 | 1.960 | 1.935 | 111 | 148 | 164 |
| 8E  | 92 | 12 | 5  | 65  | 175 | 2.042 | 1.981 | 1.955 | 87  | 107 | 115 |
| 8F  | 33 | 20 | 34 | 75  | 162 | 1.892 | 1.845 | 1.824 |  |  |  |
| 8G  | 33 | 20 | 34 | 65  | 152 | 1.920 | 1.871 | 1.848 |  |  |  |

TABLE 5b

Substrate: N-SF6

| Example | TiO$_2$ d [nm] | SiO$_2$ d [nm] | TiO$_2$ d [nm] | SiO$_2$ d [nm] | d$_c$ [nm] | n$_c$ (450 nm) | n$_c$ (550 nm) | n$_c$ (650 nm) | d$_{crit}$ (450 nm) | d$_{crit}$ (550 nm) | d$_{crit}$ (650 nm) |
|---|---|---|---|---|---|---|---|---|---|---|---|
| 8bA | 27  | 27 | 32 | 103 | 189 | 1.794 | 1.758 | 1.739 |  |  |  |
| 8bB | 41  | 19 | 17 | 74  | 151 | 1.869 | 1.826 | 1.804 | 151 | 225 | 316 |
| 8bE | 101 | 8  | 5  | 82  | 196 | 2.033 | 1.974 | 1.947 | 44  | 50  | 53  |
| 8bF | 25  | 25 | 30 | 80  | 160 | 1.825 | 1.787 | 1.766 |  |  |  |
| 8bG | 25  | 25 | 30 | 70  | 150 | 1.850 | 1.808 | 1.787 | 292 |  |  |

TABLE 6

Substrate: P-SF68

| Example | SiO$_2$ d [nm] | Ta$_2$O$_5$ d [nm] | SiO$_2$ d [nm] | Ta$_2$O$_5$ d [nm] | SiO$_2$ d [nm] | d$_c$ [nm] | n$_c$ (450 nm) | n$_c$ (550 nm) | n$_c$ (650 nm) | d$_{crit}$ (450 nm) | d$_{crit}$ (550 nm) | d$_{crit}$ (650 nm) |
|---|---|---|---|---|---|---|---|---|---|---|---|---|
| 11A | 11 | 135 | 5  | 5  | 86 | 242 | 1.880 | 1.854 | 1.836 |  |  |  |
| 11B | 7  | 235 | 44 | 14 | 5  | 305 | 2.051 | 2.016 | 1.994 |  | 970 | 645 |
| 11C | 6  | 236 | 43 | 14 | 5  | 304 | 2.056 | 2.021 | 1.999 |  | 349 | 325 |
| 11D | 6  | 237 | 42 | 15 | 5  | 304 | 2.058 | 2.023 | 2.001 |  | 299 | 284 |
| 11E | 5  | 236 | 41 | 15 | 5  | 302 | 2.061 | 2.026 | 2.004 | 904 | 251 | 242 |
| 11F | 11 | 135 | 5  | 5  | 60 | 216 | 1.930 | 1.902 | 1.883 |  |  |  |
| 11G | 11 | 135 | 5  | 5  | 50 | 206 | 1.953 | 1.924 | 1.904 |  |  |  |

TABLE 7

Substrate: N-SF66

| Example | Ta$_2$O$_5$ d [nm] | MgF$_2$ d [nm] | Ta$_2$O$_5$ d [nm] | MgF$_2$ d [nm] | Ta$_2$O$_5$ d [nm] | SiO$_2$ d [nm] | d$_c$ [nm] | n$_c$ (450 nm) | n$_c$ (550 nm) | n$_c$ (650 nm) | d$_{crit}$ (450 nm) | d$_{crit}$ (550 nm) | d$_{crit}$ (650 nm) |
|---|---|---|---|---|---|---|---|---|---|---|---|---|---|
| 12A | 20 | 5 | 12 | 5  | 43 | 97 | 181 | 1.755 | 1.736 | 1.721 |     |     |     |
| 12B | 94 | 5 | 5  | 31 | 16 | 5  | 156 | 1.975 | 1.943 | 1.925 | 710 | 247 | 224 |
| 12C | 15 | 5 | 25 | 5  | 25 | 5  | 80  | 2.038 | 2.003 | 1.983 | 90  | 85  | 85  |
| 12D | 48 | 5 | 5  | 8  | 24 | 5  | 95  | 2.038 | 2.004 | 1.983 | 90  | 85  | 85  |

TABLE 7-continued

Substrate: N-SF66

| Example | Ta$_2$O$_5$ d [nm] | MgF$_2$ d [nm] | Ta$_2$O$_5$ d [nm] | MgF$_2$ d [nm] | Ta$_2$O$_5$ d [nm] | SiO$_2$ d [nm] | d$_c$ [nm] | n$_c$ (450 nm) | n$_c$ (550 nm) | n$_c$ (650 nm) | d$_{crit}$ (450 nm) | d$_{crit}$ (550 nm) | d$_{crit}$ (650 nm) |
|---|---|---|---|---|---|---|---|---|---|---|---|---|---|
| 12E | 145 | 5 | 5 | 40 | 13 | 5 | 213 | 1.997 | 1.965 | 1.945 | 163 | 137 | 133 |
| 12F | 49 | 9 | 5 | 9 | 42 | 75 | 189 | 1.821 | 1.799 | 1.782 | | | |
| 12G | 49 | 9 | 5 | 9 | 42 | 65 | 178 | 1.842 | 1.818 | 1.801 | | | |

TABLE 8

Sub: N-SF6

| Example | SiO$_2$ d [nm] | ZrO$_2$ d [nm] | SiO$_2$ d [nm] | ZrO$_2$ d [nm] | SiO$_2$ d [nm] | ZrO$_2$ d [nm] | SiO$_2$ d [nm] | d$_c$ [nm] | n$_c$ (450 nm) | n$_c$ (550 nm) | n$_c$ (650 nm) | d$_{crit}$ (450 nm) | d$_{crit}$ (550 nm) | d$_{crit}$ (650 nm) |
|---|---|---|---|---|---|---|---|---|---|---|---|---|---|---|
| 14A | 52 | 8 | 115 | 30 | 20 | 71 | 94 | 390 | 1.668 | 1.656 | 1.645 | | | |
| 14B | 5 | 74 | 5 | 10 | 5 | 10 | 72 | 180 | 1.841 | 1.821 | 1.810 | 3 · 10$^8$ | 291 | 230 |
| 14B2 | 6 | 19 | 6 | 73 | 6 | 12 | 78 | 199 | 1.844 | 1.824 | 1.813 | 493 | 247 | 206 |
| 14C | 6 | 19 | 6 | 86 | 6 | 11 | 92 | 225 | 1.841 | 1.821 | 1.810 | | 291 | 230 |
| 14D | 6 | 19 | 6 | 86 | 6 | 11 | 92 | 225 | 1.841 | 1.821 | 1.810 | | 291 | 230 |
| 14E | 15 | 5 | 5 | 105 | 5 | 5 | 69 | 208 | 1.867 | 1.845 | 1.835 | 158 | 137 | 127 |
| 14F | 6 | 19 | 6 | 73 | 6 | 10 | 70 | 189 | 1.858 | 1.837 | 1.826 | 203 | 163 | 148 |
| 14G | 6 | 19 | 6 | 73 | 6 | 10 | 60 | 179 | 1.880 | 1.858 | 1.847 | 125 | 114 | 108 |

TABLE 9

Substrate: N-SF1

| Example | TiO$_2$ d [nm] | SiO$_2$ d [nm] | TiO$_2$ d [nm] | SiO$_2$ d [nm] | TiO$_2$ d [nm] | SiO$_2$ d [nm] | TiO$_2$ d [nm] | SiO$_2$ d [nm] | d$_c$ [nm] | n$_c$ (450 nm) | n$_c$ (550 nm) | n$_c$ (650 nm) | d$_{crit}$ (450 nm) | d$_{crit}$ (550 nm) | d$_{crit}$ (650 nm) |
|---|---|---|---|---|---|---|---|---|---|---|---|---|---|---|---|
| 17A | 5 | 38 | 14 | 220 | 32 | 21 | 48 | 99 | 476 | 1.680 | 1.656 | 1.639 | | | |
| 17B | 28 | 27 | 5 | 5 | 20 | 5 | 5 | 109 | 203 | 1.762 | 1.729 | 1.711 | 204 | 349 | |
| 17C | 28 | 27 | 5 | 5 | 19 | 5 | 5 | 109 | 203 | 1.761 | 1.728 | 1.710 | 208 | 366 | |
| 17D | 29 | 26 | 5 | 5 | 20 | 5 | 5 | 109 | 203 | 1.766 | 1.733 | 1.715 | 178 | 266 | 472 |
| 17E | 16 | 30 | 47 | 5 | 39 | 6 | 23 | 93 | 258 | 1.972 | 1.918 | 1.894 | 39 | 44 | 46 |
| 17F | 5 | 38 | 14 | 220 | 32 | 21 | 48 | 75 | 452 | 1.692 | 1.666 | 1.649 | | | |
| 17G | 5 | 38 | 14 | 220 | 32 | 21 | 48 | 65 | 442 | 1.697 | 1.671 | 1.654 | | | |

TABLE 10

| Example | n$_c$ < n$_s$ (450 nm) | n$_c$ < n$_s$ (550 nm) | n$_c$ < n$_s$ (650 nm) | d$_c$-dcrit (450 nm) [nm] | d$_c$-dcrit (550 nm) [nm] | d$_c$-dcrit (650 nm) [nm] | no FOV Obstruction (450 nm) | no FOV Obstruction (550 nm) | no FOV Obstruction (650 nm) | Mean R [%] | Mean R [%] |
|---|---|---|---|---|---|---|---|---|---|---|---|
| 1A | Yes | Yes | Yes | NA | NA | NA | Yes | Yes | Yes | 0.9 | 1.9 |
| 1F | Yes | Yes | Yes | NA | NA | NA | Yes | Yes | Yes | 2.4 | 3.6 |
| 1G | Yes | Yes | Yes | NA | NA | NA | Yes | Yes | Yes | 3.6 | 4.6 |
| 3A | Yes | Yes | Yes | NA | NA | NA | Yes | Yes | Yes | 0.8 | 3.3 |
| 3F | Yes | Yes | Yes | NA | NA | NA | Yes | Yes | Yes | 1.8 | 3.7 |
| 3G | Yes | Yes | Yes | NA | NA | NA | Yes | Yes | Yes | 3.4 | 5.3 |
| 3bA | No | No | Yes | 35 | 804 | NA | Yes | Yes | Yes | 0.4 | 0.6 |
| 3bF | No | No | No | −105 | −89 | −71 | No | No | No | 2.4 | 2.9 |
| 3bG | No | No | No | −111 | −100 | −89 | No | No | No | 3.9 | 5.2 |
| 5A | Yes | Yes | Yes | NA | NA | NA | Yes | Yes | Yes | 0.7 | 1.5 |
| 5B | Yes | Yes | Yes | NA | NA | NA | Yes | Yes | Yes | 3.7 | 4.0 |
| 5F | Yes | Yes | Yes | NA | NA | NA | Yes | Yes | Yes | 2.5 | 3.9 |
| 5G | Yes | Yes | Yes | NA | NA | NA | Yes | Yes | Yes | 4.1 | 5.3 |
| 8A | Yes | Yes | Yes | NA | NA | NA | Yes | Yes | Yes | 0.2 | 0.5 |
| 8A2 | Yes | Yes | Yes | NA | NA | NA | Yes | Yes | Yes | 1.4 | 3.3 |
| 8B | No | No | No | 1 | 126 | 238 | Yes | Yes | Yes | 1.5 | 4.0 |
| 8D | No | No | No | −50 | −13 | 3 | Yes | Yes | Yes | 1.5 | 4.0 |
| 8E | No | No | No | −50 | −13 | 3 | No | No | Yes | 1.5 | 4.0 |
| 8F | No | No | No | −88 | −67 | −59 | No | No | No | 0.7 | 2.6 |
| 8G | Yes | Yes | Yes | NA | NA | NA | Yes | Yes | Yes | 2.2 | 3.5 |
| 8bA | Yes | Yes | Yes | NA | NA | NA | Yes | Yes | Yes | 0.2 | 0.5 |

TABLE 10-continued

| Example | $n_c < n_s$ (450 nm) | $n_c < n_s$ (550 nm) | $n_c < n_s$ (650 nm) | $d_c$-dcrit (450 nm) [nm] | $d_c$-dcrit (550 nm) [nm] | $d_c$-dcrit (650 nm) [nm] | no FOV Obstruction (450 nm) | no FOV Obstruction (550 nm) | no FOV Obstruction (650 nm) | Mean R [%] | Mean R [%] |
|---|---|---|---|---|---|---|---|---|---|---|---|
| 8bB | No | No | No | 0 | 74 | 165 | Yes | Yes | Yes | 1.8 | 4.0 |
| 8bE | No | No | No | −152 | −146 | −144 | No | No | No | 0.5 | 1.1 |
| 8bF | Yes | Yes | Yes | NA | NA | NA | Yes | Yes | Yes | 1.5 | 3.4 |
| 8bG | No | Yes | Yes | 142 | NA | NA | Yes | Yes | Yes | 2.9 | 5.3 |
| 11A | Yes | Yes | Yes | NA | NA | NA | Yes | Yes | Yes | 0.3 | 0.6 |
| 11B | Yes | No | No | NA | 665 | 340 | Yes | Yes | Yes | 2.0 | 4.0 |
| 11C | Yes | No | No | NA | 45 | 21 | Yes | Yes | Yes | 2.0 | 4.0 |
| 11D | Yes | No | No | NA | −5 | −20 | Yes | No | No | 2.1 | 4.0 |
| 11E | No | No | No | 602 | −51 | −60 | Yes | No | No | 2.2 | 4.0 |
| 11F | Yes | Yes | Yes | NA | NA | NA | Yes | Yes | Yes | 2.4 | 3.2 |
| 11G | Yes | Yes | Yes | NA | NA | NA | Yes | Yes | Yes | 3.9 | 5.4 |
| 12A | Yes | Yes | Yes | NA | NA | NA | Yes | Yes | Yes | 0.5 | 1.5 |
| 12B | No | No | No | 554 | 91 | 68 | Yes | Yes | Yes | 1.9 | 3.3 |
| 12C | No | No | No | 10 | 5 | 5 | Yes | Yes | Yes | 12.9 | 13.1 |
| 12D | No | No | No | −5 | −10 | −10 | No | No | No | 9.1 | 11.4 |
| 12E | No | No | No | −50 | −76 | −79 | No | No | No | 1.7 | 2.5 |
| 12F | Yes | Yes | Yes | NA | NA | NA | Yes | Yes | Yes | 3.1 | 3.6 |
| 12G | Yes | Yes | Yes | NA | NA | NA | Yes | Yes | Yes | 4.7 | 6.3 |
| 14A | Yes | Yes | Yes | NA | NA | NA | Yes | Yes | Yes | 0.2 | 0.4 |
| 14B | No | No | No | 3E+08 | 111 | 50 | Yes | Yes | Yes | 0.9 | 2.4 |
| 14B2 | No | No | No | 294 | 48 | 7 | Yes | Yes | Yes | 0.6 | 1.8 |
| 14C | Yes | No | No | NA | 66 | 5 | Yes | Yes | Yes | 0.8 | 1.4 |
| 14D | Yes | No | No | NA | 66 | 5 | Yes | Yes | Yes | 0.8 | 1.4 |
| 14E | No | No | No | −50 | −71 | −81 | No | No | No | 1.0 | 2.9 |
| 14F | No | No | No | 13 | −26 | −41 | Yes | No | No | 1.0 | 3.4 |
| 14G | No | No | No | −54 | −65 | −72 | No | No | No | 2.1 | 5.4 |
| 17A | Yes | Yes | Yes | NA | NA | NA | Yes | Yes | Yes | 0.1 | 0.5 |
| 17B | No | No | Yes | 1 | 146 | NA | Yes | Yes | Yes | 1.1 | 2.1 |
| 17C | No | No | Yes | 5 | 162 | NA | Yes | Yes | Yes | 1.1 | 2.1 |
| 17D | No | No | No | −25 | 63 | 269 | No | Yes | Yes | 1.2 | 2.2 |
| 17E | No | No | No | −219 | −215 | −212 | No | No | No | 0.1 | 0.3 |
| 17F | Yes | Yes | Yes | NA | NA | NA | Yes | Yes | Yes | 1.9 | 3.3 |
| 17G | Yes | Yes | Yes | NA | NA | NA | Yes | Yes | Yes | 3.6 | 5.9 |

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An optical layered composite, comprising:
a substrate having a front face, a back face, a thickness $d_s$ between the front face and the back face and a refractive index $n_s$; and
a coating applied to the front face, the coating comprising one or more coating layers, wherein, for at least one wavelength $\lambda_g$ in the range from 390 nm to 700 nm, the coating satisfies one of the following criterion:

$$n_c < n_s; \text{ or}$$

$$n_c > n_s, \text{ and } d_c < \frac{k}{\sqrt{n_c^2 - n_s^2}} \cdot \arctan\sqrt{\frac{n_s^2 - 1}{n_c^2 - n_s^2}};$$

wherein $n_c$ is a mean refractive index of the coating layers, weighted by thickness, wherein $d_c$ is a total thickness of the coating, wherein thicknesses are determined in a direction perpendicular to the front face, and wherein $k = \lambda_g / 4\pi$, wherein a total thickness variation is less than 2 μm, wherein the optical layered composite is configured to transversely propagate light introduced into the optical layered composite.

2. The optical layered composite of claim 1, wherein the coating comprises a group A of one or more coating layers having a refractive index of at least 1.7 and a group B of one or more coating layers having a refractive index below 1.7.

3. The optical layered composite of claim 1, wherein the substrate has a refractive index of 1.6 or more.

4. The optical layered composite of claim 1, wherein at least one of the following is satisfied:
the thickness $d_s$ is in the range from 10 to 1500 μm;
a radius of curvature is greater than 600 mm;
an in-plane optical loss measured perpendicular to the front face is at most 20%;
a surface roughness of the substrate is less than 5 nm;
a surface roughness of the coating is less than 5 nm;
a maximum local thickness variation over 75% of the front face is less than 5 μm;
a warp is less than 350 μm; or
a bow is less than 300 μm.

5. The optical layered composite of claim 1, wherein the coating comprises a coating layer having a refractive index in the range from 1.70 to 2.60.

6. The optical layered composite of claim 1, wherein the coating comprises a coating layer having a refractive index in the range from 1.37 to 1.60.

7. The optical layered composite of claim 1, wherein the substrate is selected from glass, polymer, optoceramics or crystals.

8. The optical layered composite of claim 1, further comprising a device for coupling light into or decoupling light out of the optical layered composite.

9. The optical layered composite of claim 1, wherein the optical layered composite is a wafer.

10. The optical layered composite of claim 9, wherein at least one of the following criteria is satisfied:
the front face has a surface area in the range from 0.010 to 0.500 m$^2$;
the thickness $d_s$ is in the range from 10 to 1500 µm;
a radius of curvature is greater than 600 mm;
an in-plane optical loss measured perpendicular to the front face is at most 20%;
a surface roughness of the substrate is less than 5 nm;
a surface roughness of the coating is less than 5 nm;
a total thickness variation is less than 5 µm;
a maximum local thickness variation over 75% of the front face is less than 5 µm;
a warp is less than 350 µm;
a bow is less than 300 µm; or
a circular shape.

11. A device, comprising:
one or more layered composites, the one or more layered composites comprising:
a substrate having a front face, a back face, a thickness $d_s$ between the front face and the back face and a refractive index $n_s$; and
a coating applied to the front face, the coating comprising one or more coating layers, wherein, for at least one wavelength $\lambda_g$ in the range from 390 nm to 700 nm, the coating satisfies one of the following criterion:

$$n_c < n_s; \text{ or}$$

$$n_c > n_s, \text{ and } d_c < \frac{k}{\sqrt{n_c^2 - n_s^2}} \cdot \arctan\sqrt{\frac{n_s^2 - 1}{n_c^2 - n_s^2}};$$

wherein $n_c$ is a mean refractive index of the coating layers, weighted by thickness, wherein $d_c$ is a total thickness of the coating, wherein thicknesses are determined in a direction perpendicular to the front face, and wherein $k=\lambda_g/4\pi$, wherein a total thickness variation is less than 2 µm; and
a coupling device configured to introduce an image into the one or more layered composites, the one or more layered composites being configured to propagate the image in a transverse direction.

12. The device of claim 11, wherein the one or more layered composites comprises a grouping of x layered, x being an integer of at least 2, wherein the x layered composites are arranged in a stack, their front faces being parallel and oriented in a same direction and a spacer region made of a material having a refractive index below 1.3 is present between each pairing of front face with adjacent back face.

13. A process for making an augmented reality device, comprising the following steps:
providing a wafer, the wafer comprising:
a layered composite, the layered composite comprising:
a substrate having a front face, a back face, a thickness $d_s$ between the front face and the back face and a refractive index $n_s$; and
a coating applied to the front face, the coating comprising one or more coating layers, wherein, for at least one wavelength $\lambda_g$ in the range from 390 nm to 700 nm, the coating satisfies one of the following criterion:
$n_c < n_s$; or
$n_c > n_s$, and $dc < k/(\sqrt{n_c^2 - n_s^2})*\arctan(\sqrt{(n_s^2-1)/(n_c^2-n_s^2)})$;
wherein $n_c$ is a mean refractive index of the coating layers, weighted by thickness,
wherein dc is a total thickness of the coating, wherein thicknesses are determined in a direction perpendicular to the front face, and wherein $k=\lambda_g/4\pi$;
reducing a surface area of the front face to obtain a portion; and
providing the portion as a viewing screen in the augmented reality device;
wherein the layered composite is configured to transversely propagate light introduced into the layered composite.

* * * * *